United States Patent
Bauer et al.

(10) Patent No.: US 11,380,107 B2
(45) Date of Patent: Jul. 5, 2022

(54) POWER AND DATA CENTER (PDC) FOR AUTOMOTIVE APPLICATIONS

(71) Applicant: Aptiv Technologies Limited, St. Michael (BB)

(72) Inventors: Lee Bauer, Birmingham, MI (US); Martin Bornemann, Nuremberg (DE); Christian Schäfer, Bochum (DE)

(73) Assignee: Aptiv Technologies Limited, St. Michael (BB)

(*) Notice: Subject to any disclaimer, the term of this patent is extended or adjusted under 35 U.S.C. 154(b) by 289 days.

(21) Appl. No.: 16/457,869

(22) Filed: Jun. 28, 2019

(65) Prior Publication Data
US 2020/0125858 A1 Apr. 23, 2020

Related U.S. Application Data

(60) Provisional application No. 62/864,921, filed on Jun. 21, 2019, provisional application No. 62/728,692, (Continued)

(51) Int. Cl.
*G06V 20/56* (2022.01)
*G05D 1/00* (2006.01)
(Continued)

(52) U.S. Cl.
CPC ............ *G06V 20/56* (2022.01); *G05D 1/0088* (2013.01); *G06K 9/6289* (2013.01);
(Continued)

(58) Field of Classification Search
CPC ............ G06K 9/00791; G06K 9/6289; G05D 1/0088; G05D 2201/0213; H04L 12/422; H04L 67/12
(Continued)

(56) References Cited

U.S. PATENT DOCUMENTS

2006/0261843 A1* 11/2006 Kraft .................. H02J 1/14
701/36
2009/0034540 A1* 2/2009 Law .................. H04N 21/6402
370/400
(Continued)

FOREIGN PATENT DOCUMENTS

CN 110654398 1/2020
DE 4014561 11/1991
(Continued)

OTHER PUBLICATIONS

"European Search Report", EP Application No. 19182798.9, dated Dec. 12, 2019, 6 pages.
(Continued)

*Primary Examiner* — Yazan A Soofi
(74) *Attorney, Agent, or Firm* — Sawtooth Patent Group PLLC

(57) ABSTRACT

A power and data center (PDC) can serve as a combined data concentrator and power distributor that delivers scalable and affordable network/power redundancy into an automotive electrical/electronic architecture (E/EA) that supports partially or fully autonomous vehicles. In some embodiments, a vehicle that includes the smart E/EA is divided into zones, where each zone includes one or more PDCs and one or more sensors, actuators, controllers, loudspeakers or other devices that are coupled to and powered by their zone PDC(s). Each PDC collects and processes (or passes through) raw or pre-processed sensor data from the one or more sensors in its zone. The sensors provide their data to the PDC by way of cost efficient, short-range data links. In some embodiments, one or more actuators in each zone are coupled to their respective zone PDC, and receive their control data from the PDC over a high-speed data bus or data link.

58 Claims, 49 Drawing Sheets

Related U.S. Application Data filed on Sep. 7, 2018, provisional application No. 62/765,348, filed on Aug. 20, 2018, provisional application No. 62/695,695, filed on Jul. 9, 2018, provisional application No. 62/692,603, filed on Jun. 29, 2018.

(51) Int. Cl.
  *G06K 9/62* (2022.01)
  *H04L 12/42* (2006.01)
  *H04L 67/12* (2022.01)

(52) U.S. Cl.
  CPC ............ *H04L 12/422* (2013.01); *H04L 67/12* (2013.01); *G05D 2201/0213* (2013.01)

(58) Field of Classification Search
  USPC .......................................................... 701/36
  See application file for complete search history.

(56) References Cited

U.S. PATENT DOCUMENTS

| | | | | |
|---|---|---|---|---|
| 2015/0138954 | A1* | 5/2015 | Ross | H04L 41/0654 370/225 |
| 2015/0256034 | A1* | 9/2015 | Stone | H01L 35/30 307/9.1 |
| 2015/0271019 | A1* | 9/2015 | Reich | H04L 12/4637 709/221 |
| 2017/0210376 | A1 | 7/2017 | Jain et al. | |
| 2017/0289323 | A1 | 10/2017 | Gelvin et al. | |
| 2017/0291560 | A1* | 10/2017 | Schroeder | B60W 50/12 |
| 2018/0001847 | A1* | 1/2018 | Shiratori | B60R 16/023 |
| 2018/0086210 | A1* | 3/2018 | Berels | G05D 1/0088 |
| 2018/0131898 | A1* | 5/2018 | Guzik | H04L 63/30 |
| 2018/0281816 | A1* | 10/2018 | Otsuka | B60W 50/0205 |
| 2019/0306880 | A1* | 10/2019 | Ribeiro Blard | H04W 52/265 |
| 2019/0364492 | A1* | 11/2019 | Azizi | H04W 48/16 |

FOREIGN PATENT DOCUMENTS

| | | |
|---|---|---|
| DE | 10110046 | 9/2002 |
| DE | 102016222173 | 5/2018 |
| EP | 1359056 | 11/2003 |
| EP | 3192704 | 7/2017 |
| EP | 3587194 | 1/2020 |
| JP | 2005510398 | 4/2005 |
| JP | 2011151864 | 8/2011 |
| JP | 2017092835 | 5/2017 |
| JP | 2018500220 | 1/2018 |
| JP | 2020037387 | 3/2020 |
| KR | 20020094545 | 12/2002 |
| KR | 20120099952 | 9/2012 |
| KR | 20160067507 | 6/2016 |
| KR | 20200002706 | 1/2020 |

OTHER PUBLICATIONS

"Foreign Office Action", KR Application No. 10-2019-0078894, dated May 29, 2020, 11 pages.
"Foreign Office Action", EP Application No. 19182798.9, dated Aug. 18, 2020, 4 pages.
"Foreign Office Action", KR Application No. 2019-0078894, dated Aug. 25, 2020, 17 pages.
"Foreign Office Action", JP Application No. 2019120958, dated Aug. 31, 2020, 21 pages.
"Foreign Office Action", JP Application No. 2019-120958, dated Sep. 2, 2021, 4 pages.
"Foreign Notice of Allowance", EP Application No. 19182798.9, dated Feb. 23, 2022, 5 pages.
"Foreign Office Action", CN Application No. 201910585550.7, dated Apr. 19, 2022, 13 pages.

* cited by examiner

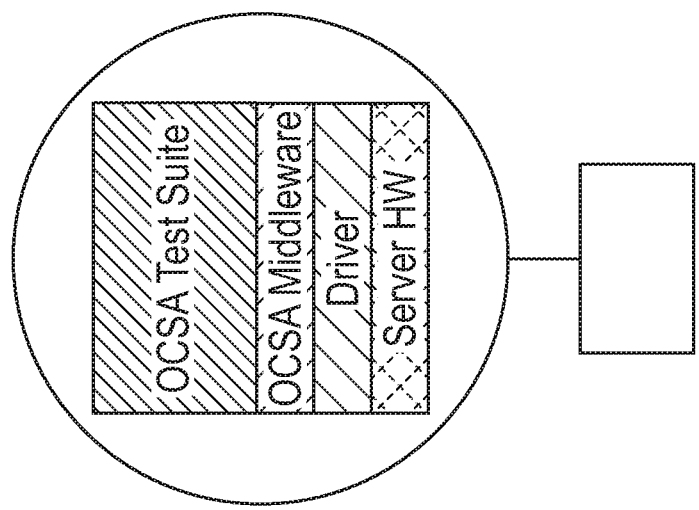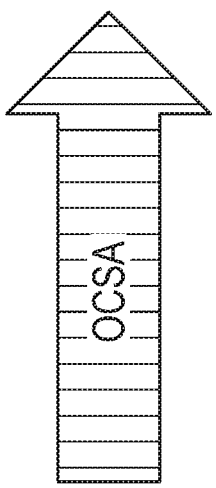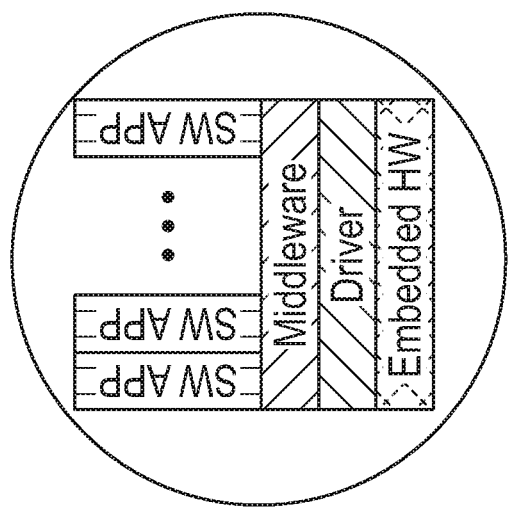
FIG. 14A

POWER AND DATA CENTER (PDC) FOR AUTOMOTIVE APPLICATIONS

CROSS-RELATED APPLICATIONS

This application claims the benefit of priority from U.S. Provisional Application Nos. 62/692,603 filed Jun. 29, 2018, 62/695,695 filed Jul. 9, 2018, 62/765,348 filed Aug. 20, 2018, 62/728,692 filed Sep. 7, 2018, and 62/864,921 filed Jun. 21, 2019. Each provisional application is incorporated by reference herein in its entirety.

TECHNICAL FIELD

This disclosure relates generally to an automotive electrical/electronic architecture (E/EA), and in particular to an E/EA for autonomous driving.

BACKGROUND

The Society of Automotive Engineers (SAE) International has outlined progressive levels of autonomy for automobiles. These levels include: Level 0: No automation; Level 1: Driver assistance required; Level 2: Partial automation options available; Level 3: Conditional Automation; Level 4: High automation; and Level 5: Full automation. Automobiles at Level 3 and above require a fail-safe or fail-operational E/EA.

One way to design a fail-safe or fail-operational E/EA is to introduce redundancy into the E/EA by doubling critical components, such as power supplies, data networks, controllers, and diagnostic devices. Many of today's premium automobiles, however, have limited packaging space for redundant components, making the doubling of critical components not feasible. The doubling of critical components would also add weight to the automobile and increase the complexity of the wiring harnesses.

Another solution is to equip (e.g., with fuses and relays) conventional automotive electrical centers with diagnostics and integrate switching capabilities into every power and data path of the vehicle. Such a design, however, would be impracticable and expensive.

SUMMARY

The disclosed PDC includes a combined data concentrator and power distributor that delivers scalable and affordable network/power redundancy into an automotive E/EA that supports partially or fully autonomous vehicles. In some embodiments, a vehicle that includes the smart E/EA is divided into zones, where each zone includes one or more PDCs and one or more sensors, actuators, controllers, loudspeakers, or other devices that are coupled to and powered by their zone PDC(s). Each PDC collects and processes (or passes through) raw or pre-processed sensor data from the one or more sensors in its zone. The sensors provide their data to the PDC by way of cost efficient, short-range data links. In some embodiments, one or more actuators in each zone are coupled to their respective zone PDC, and receive their control data from the PDC over a high-speed data bus or data link.

In some embodiments, an automotive electrical and electronic system comprises: a plurality of computing platforms coupled together in a multi-ring, self-healing network, wherein at least one computing platform provides autonomous driving functionality for a vehicle; a plurality of PDCs coupled to the multi-ring, self-healing network, the PDCs each including a data interface, a power interface and a sensor interface, the sensor interface receiving sensor data from one or more sensors, the data interface feeding the sensor data into the multi-ring, self-healing network and the power interface distributing power to the one or more sensors; and a plurality of power supply rings each coupled to a different power source or source system, the plurality of power supply rings coupled to the computing platforms and PDCs.

In some embodiments, a method comprises: distributing, through a power interface of a PDC included in a vehicle, power to one or more sensors of the vehicle; receiving, through a sensor interface of the PDC, sensor data from the one or more sensors; feeding, by output ports of the PDC, the sensor data into a multi-ring data network coupled to the PDC and to at least one computing platform, the at least one computing platform providing autonomous driving functionality for the vehicle; determining, by the at least one computing platform, at least one operation associated with autonomous driving of the vehicle, the at least one operation determined at least in part on the received sensor data; and causing, by the at least one computing platform, the vehicle to perform the at least one operation associated with autonomous driving of the vehicle.

In some embodiments, a PDC comprises: a sensor interface including redundant sensor data ports; a data network interface including redundant network data ports; a processor coupled to the sensor interface and the data network interface, the data processor configured to receive sensor data from the redundant sensor data ports, configured to process the sensor data and outputting the processed sensor data on the redundant network data ports; and a power switch coupled to redundant network power supply rails, redundant sensor power supply rails and the processor, the processor configured to cause the power switch to disconnect a first network power supply rail and to connect a second network power supply rail.

In some embodiments, an automotive electrical and electronic system comprises a first PDC, a first computing platform, and a first data platform. The first PDC includes a first sensor interface configured to receive sensor data from one or more sensors and a first data interface configured to transmit the sensor data. The first PDC is connected to the first computing platform via a first path that includes the first data platform; the first PDC is connected to the first computing platform via a second path, different from the first path, that does not include the first data platform; and the first data interface of the first PDC is configured to transmit the sensor data to the first computing platform via the first path and the second path.

One or more embodiments of the disclosed PDC provide one or more of the following advantages. The PDC reduces the average wire length in the E/EA, which optimizes the overall weight and cable bundle diameters of the wiring harnesses. The integration of smaller Electronic Control Units (ECUs) into the PDC reduces the number of power supply wires, the number of network connections, and the needed packaging space. The PDC reduces the cost and weight of the vehicle. The PDC allows the vehicle to be divided into zones so that smaller wiring harnesses ("kits") can be used in the zones to connect loads, sensors and actuators to the PDC. These "kits" support an automated manufacturing process (as opposed to handmade) for wiring harnesses, which fulfills the traceability required in International Standardization Organization (ISO) 26262. Because the PDC has multiple power and network connections that use different topologies (and in some embodiments also different physical layers), the reliability of the vehicle E/EA is increased, thus providing a benefit to Level 3/4/5 vehicles.

The details of the disclosed implementations are set forth in the accompanying drawings and the description below. Other features, objects, and advantages are apparent from the description, drawings and claims.

DESCRIPTION OF DRAWINGS

FIG. 14A illustrates an open car server alliance (OCSA) server system concept, according to some embodiments.

The same reference symbol used in various drawings indicates like elements.

DETAILED DESCRIPTION

Figure 1A:
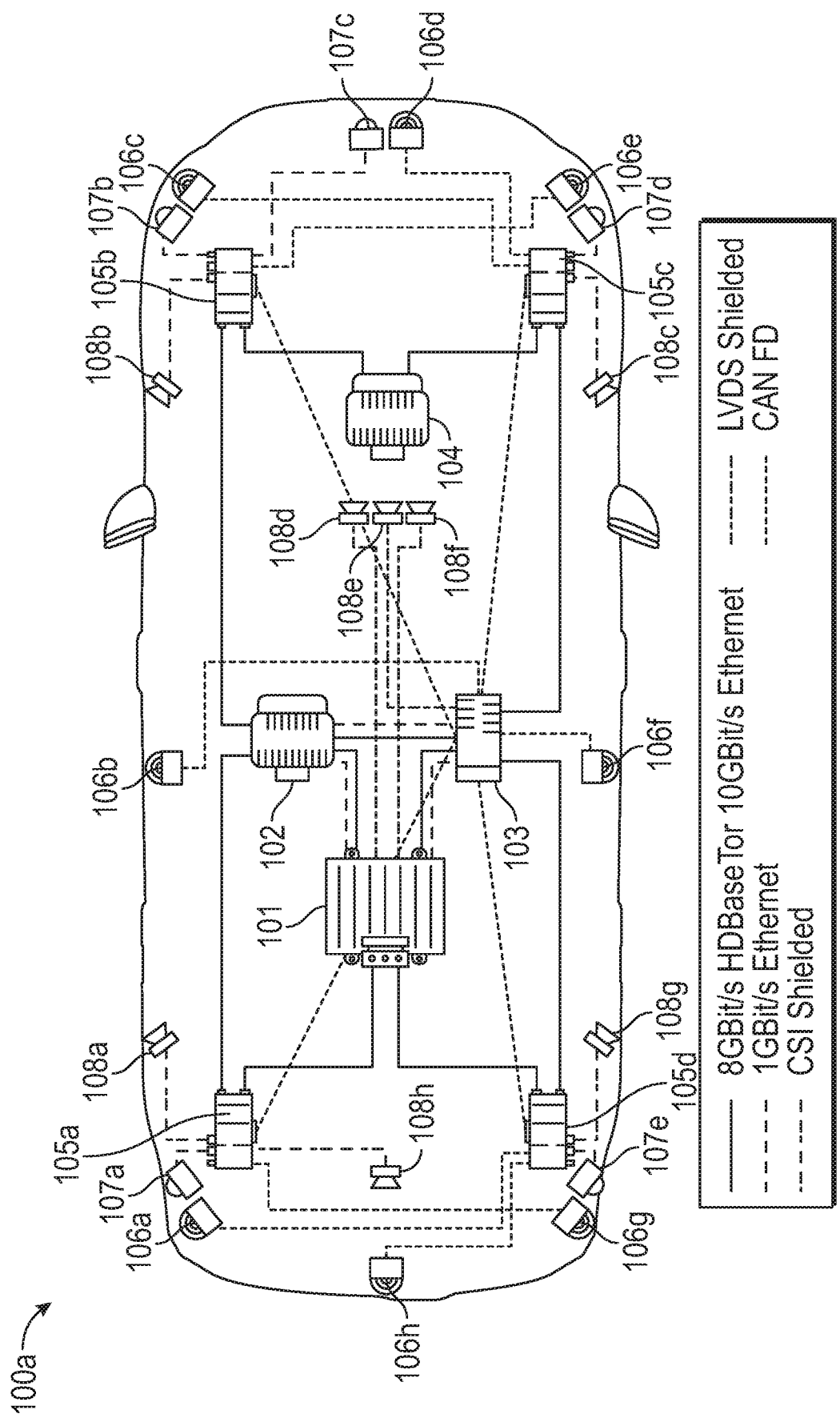
FIG. 1A illustrates an E/EA system architecture for data distribution in a vehicle with autonomous driving capability that uses four PDCs, according to some embodiments.

Reference will now be made in detail to embodiments illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first processor could be termed a second processor, and, similarly, a second processor could be termed a first processor, without departing from the scope of the various described embodiments. The first processor and the second processor are both processors, but they are not the same processor.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]." depending on the context.

Overview

The disclosed PDC is a combined data concentrator, router, and power distributor that delivers scalable and affordable network/power redundancy into an automotive E/EA that supports partially or fully autonomous vehicles. The PDC communicates bi-directionally with other PDCs and computing nodes over a vehicle network, bus, or datalink. In some embodiments, the PDC includes circuitry and/or one or more processors that are configured to distribute power and receive, process, and/or send digital signals, analog signals, and/or data.

In some embodiments, a vehicle that includes the smart E/EA is divided into zones (e.g., placed at each corner of the vehicle chassis), where each zone includes one or more PDCs and one or more sensors (e.g., radar, LIDAR, stereo/ mono cameras, sonars) that are coupled to and powered by their zone PDC(s). Each PDC collects and processes (or passes through) raw or pre-processed sensor data from the one or more sensors in its zone. The sensors provide their data to the PDC by way of cost efficient, short-range data links, including but not limited to: a Controller Area Network (CAN) bus, CAN Flexible Data Rate (CAN-FD) bus, Camera Serial Interface (CSI), and Low-Voltage Differential Signaling (LVDS). In some embodiments, one or more actuators in each zone are coupled to their respective zone PDC, and receive their control data from the PDC over a high-speed data bus or data link.

In some embodiments, the PDC(s) for each zone feed or transmit their collected sensor data (e.g., data packets) into a ring network. In some embodiments, the ring network is a multi-ring (e.g., dual-ring), self-healing data network. The ring network includes the PDCs and one or more computing platforms for performing various vehicle functions (e.g., computing platform for providing autonomous driving functionality). Data traffic can travel in different directions on the same ring or different rings. For example, data packets can travel around a first ring in a clockwise direction and around a second ring in a counterclockwise direction, or both rings can transmit in the same clockwise or counterclockwise direction. The data traffic can be the same data (e.g., redundant data traffic) or it can be different data traffic. In some embodiments, data packets can be sent bi-directionally from one PDC to another PDC, bi-directionally from one computing platform to another computing platform, bi-directionally from a PDC to a computing platform, and bi-directionally from a PDC to a sensor or any other device. In some embodiments, one or more PDCs or computing platforms can broadcast data packets to other PDCs and computing platforms over the ring network.

Figure 10:
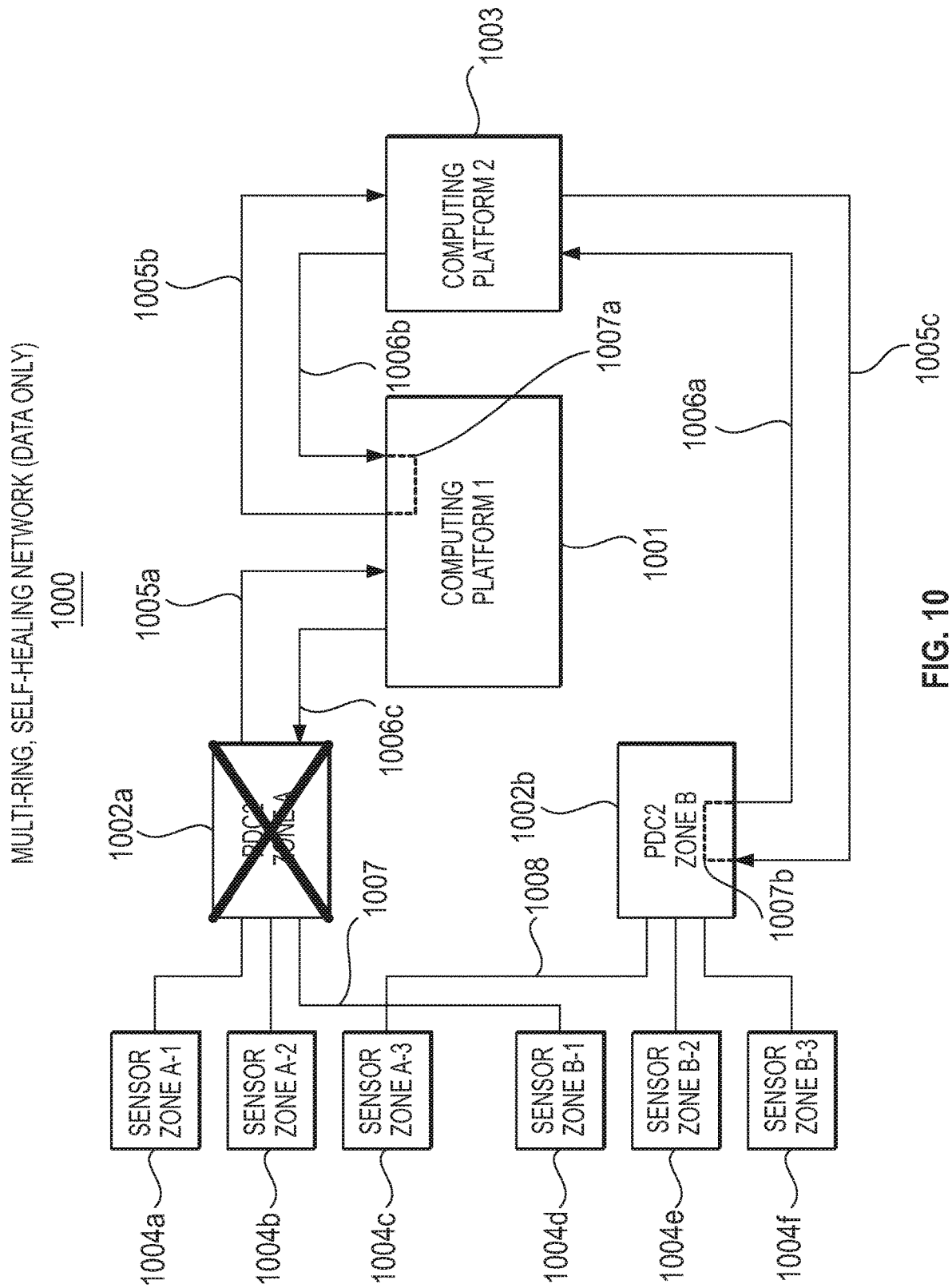
FIG. 10 is conceptual block diagram illustrating fail-safe operation of a dual-ring, self-healing network topology when a PDC fails, according to some embodiments.

As used herein, the term "self-healing" means that the multi-ring data network can automatically bypass failed sections of the ring to allow data to continue to flow or be routed to other PDCs and computing platforms, as described more fully in reference to FIG. 10. As used herein, the term "failure" includes a degradation of a ring below an acceptable level, such as below a quality of service (QoS) threshold variance.

If a PDC or ring section fails, the functioning PDCs can lower their respective output data frame rates, or command the sensors to lower the output data frame rates to compensate for the data latency resulting from, e.g., longer data paths. In some embodiments, link degradation is detected by the PDC. In response to this detection, the PDC can retransmit data (e.g., packets) and/or reduce the bandwidth and/or transmission rate of the data stream (e.g., using compression) to a computing platform or tele-operator. If a PDC fails, the PDC can send data on a redundant ring as described in reference to FIG. 10. The PDC can also instruct/request other sensors coupled to the PDC, or to another PDC, to reduce their respective bandwidths and/or transmission rates. In some embodiments, both the sensor and PDC can reduce bandwidth or transmission rate to ensure delivery to a computing platform.

In some embodiments, crossing sensors provide a minimum level of sensor coverage for a zone should the zone PDC fail (e.g., the PDC is damaged as a result of a collision). As used herein, "crossing" or "crisscrossing" sensors refers to the coupling of at least one sensor in a first zone to at least one PDC in a second zone, and coupling at least one sensor in the second zone to at least one PDC in the first zone. By crossing sensors, the vehicle will have limited sensor coverage (e.g., limited radar data) in the impaired zone that allows the vehicle to perform a safe-mode maneuver (e.g., "limp home" mode) at the cost of reduced functionality of the vehicle (e.g., reduced speed of the vehicle). In some embodiments that follow, various types of sensor can be "crisscrossed," including LIDARs, cameras, sonars, etc.

In some embodiments, redundant high-speed data links are used to couple the PDCs to the computing platforms. For example, two HDBaseT data links can be used to couple each PDC to a neighbor PDC and/or to one or more computing platforms. In this configuration, a single HDBaseT link failure will not lead to sensor data loss. Latency can be compensated for by increasing camera data compression or frame rate reduction. In some embodiments, CAN-FD links can be used as backup to the HDBaseT links. In some embodiments, a single HDBaseT data link and a single Ethernet data link are used to couple the computing platforms together. In this configuration, the failure of all HDBaseT data links may lead to a functional failure but not to a total system failure. In some embodiments, different protocols on a number of different physical layers are used to achieve redundancy.

In some embodiments, the PDC operates as a data router and/or performs processing. When operating as a router (e.g., when in a failure mode), the PDC passes raw sensor data unprocessed to one or more computing platforms and other PDCs. In some embodiments, the PDC performs sensor data fusion and other data processing (e.g., lossless or lossy data compression, data formatting, and data transformations) locally by processing the raw sensor data in the PDC hardware using various filters, algorithms, transforms, and processes before feeding the sensor data to the multi-ring network. In this embodiment, the PDC is essentially operating as a distributed computing node and provides a clock for fusing data. For example, the PDC could generate an object list by fusing stereo camera output data and LIDAR output data, and then send the object list over the ring network to a computing platform that performs perception functions for autonomous driving. This reduces the load on the computing platform so that it can perform other functions. In some embodiments, the PDC includes circuitry in the data interface that measures the network link performance to detect any degradation of QoS.

In some embodiments, the PDC performs lossy or lossless data compression on raw or processed sensor data before transmitting the data to a data network. Lossy compression may be desirable if the data is being transmitted for remote teleoperation applications. The PDC can also transmit lossless data to a computing platform in the vehicle and lossy data to a tele operator simultaneously.

In some embodiments, the PDC is configured to monitor for sensor drift or other sensor calibration parameters and initiate a recalibration of the parameters. If the PDC detects that sensor drift or offset is above a desired threshold, the PDC can proactively decide not to transmit data from the impaired sensor to the ring network. In some embodiments, the detection of sensor drift or offset is used by the PDC to predict sensor failure so that proactive steps can be taken by the PDC or one or more computing platforms in the vehicle to prevent sensor failure or to initiate a work around solution prior to sensor failure.

In addition to data redundancy, some embodiments of the disclosed PDC deliver power redundancy to the E/EA by operating as a power distributor to one or more sensors and actuators in a zone. PDCs can be coupled to one or more power rails, each with its own backup battery. Moving power distribution from a centralized power source or supply system (e.g., a vehicle electrical center) to each PDC allows first stage power electronics (e.g., a filtering stage) to be moved from the sensor hardware into the PDC hardware, with the benefit that less expensive sensors (due to fewer electronic components) can be used in the E/EA. Additionally, coupling the batteries to the PDCs reduces or eliminates the need for fuses on the batteries (which could burn the ring segment that the battery is coupled to), since the PDCs will handle short-circuit protection using, for example, smart power switches, as described in reference to FIGS. 7-9.

In some embodiments, the E/EA includes two or more power rings that supply power from two or more redundant power sources (e.g., batteries) or supply systems (e.g., vehicle electrical centers) to the PDCs and the computing platforms. In the embodiments that follow, each PDC has two power inputs each coupled to one of two power rings. The power inputs can be coupled (e.g., a galvanic connection) inside of the PDC hardware and isolated against each other quickly in response to a failure of one of the power sources or supply systems. In some embodiments, the PDC power inputs can support connected sensors and actuators using switching paths that include diagnostics. For example, the PDCs can include smart switching devices that measure a rate of change of input/output voltage and/or current of the PDCs and temperature, and perform fast switching in response to the changes to ensure that the computing platforms and PDCs receive power in the event of a power source or supply system failure. Smart switching can be used on any load connected to the PDC, and allows for lower diameter cables, thus saving vehicle manufacturing costs. Smart switching also allows the power cables to be thinner and removes the need for a fuse box.

In some embodiments, small Electronic Control Units (ECUs) that control single vehicle functions (e.g., power lift gate, electrical driven trailer hook, electric sun shutter) or multiple vehicle functions (e.g., headlamp or rear lamp control, seat control, trailer module) can be integrated in the PDC hardware. For example, the loads, sensors, and actuators in a zone that are controlled and supplied by a PDC, and which do not have to fulfill the requirements of the ISO 26262 (e.g., comfort functions), can be supplied by the PDC hardware and software. The benefits of embedding small ECU functionality into the PDC hardware include fewer total ECUs per vehicle and smaller wiring harnesses between the PDCs and the loads, sensors, and actuators. The smaller wiring harnesses can be more affordably produced through automated manufacturing.

System Architectures

FIG. 1A illustrates an E/EA system architecture 100*a* for data distribution in a vehicle with autonomous driving capability that uses four PDCs, according to some embodiment. E/EA system architecture 100*a* can be integrated into various types of vehicles. As defined herein, "vehicle" includes but is not limited to: fuel-powered, electric, or hybrid passenger automobiles, trucks, buses, taxis, two or three-wheel vehicles (e.g., a motorcycle, ATV), construction or farming equipment (e.g., cement trucks, dump trucks, tractors, plows, harvesters, grain trucks), military vehicles (e.g., battle tanks, infantry fighting vehicles, armored personnel carriers, unmanned combat vehicles, armored combat support vehicles, etc.), marine vessels (e.g., boats, submarines, hovercraft), automated delivery robots, and drones.

In the embodiment shown, the E/EA system architecture 100*a* includes automated driving server (ADS) 101, connected server platform (CSP) 102, secure connected gateway (SCGW) 103, propulsion and chassis server (PCS) 104, PDCs 105*a*-105*d*, radars 106*a*-106*h*, LIDARs 107*a*-107*e*, and cameras 108*a*-108*h* (e.g., stereo or mono cameras). ADS 101, CSP 102, SCGW 103, and PCS 104 are also referred to collectively as "computing platforms."

ADS 101 includes hardware and software for performing a number of autonomous driving tasks, including but not limited to: route planning, trajectory planning and validation, perception processing, decision logic, implementing control laws, localization, intersection handling, behavioral inference for planning, lateral/longitudinal control, computing a real world/environment model, and sensor data fusion.

CSP 102 is a scalable automotive server platform that includes hardware and software for running various applications, such as Advance Driver Assistant System (ADAS) applications, infotainment applications, user applications (e.g., Android® or iPhone® applications), video distribution, IP-routing, microservices, behavioral inference for planning, and Human Machine Interface (HMI) management.

SCGW 103 includes hardware and software for securely managing cloud and peer-to-peer connectivity with various data services, including but not limited to: over-the air (OTA) software update services, tele operator/remote control services, data analytics services, map database services, localization services, entertainment services, security services, and original equipment manufacturer (OEM) services. SCGW 103 also securely manages peer-to-peer connectivity with other vehicles, city infrastructure (e.g., stop lights), roadside beacons, home networks, etc.

PCS 104 includes hardware and software for controlling vehicle driving functionality, such as acceleration, braking, and steering.

The computing platforms 101-104 are coupled in a dual-ring, self-healing network topology, as described more fully in reference to FIG. 10. The dual-ring network topology provides the required data redundancy for Levels 3/4/5 autonomous driving. The data links between the computing platforms, PDCs, and sensors are indicated by the legend shown in FIG. 1A. In some embodiments, PDCs 105*a*-105*d* also operate as distributed computing nodes by performing, for example, data compression, sensor data fusion, and small ECU functions, as previously described.

In some embodiments, the computing platforms 101-104 and PDCs 105*a*-105*d* are coupled together by a first set of redundant data links (e.g., 8 GBit/s HDBaseT, 10 GBit/s Ethernet). Computing platforms 101-103 are coupled together by a second set of data links (e.g., 1 GBit/s Ethernet). In some embodiments, radars 106*a*-106*h* are coupled to their respective zone PDCs 105*a*-105*d* by a CAN-FD bus. LIDAR sensors 107*a*-107*e* are coupled to their respective zone PDCs 105*a*-105*d* by 1 GBit/s Ethernet. Cameras 108*a*, 108*b*, 108*c*, 108*g*, 108*h* are coupled to their respective zone PDCs 105*a*-105*d* by CSI buses.

In some embodiments, front facing cameras 108*d* and 108*f* are directly coupled to ADS 101 by low-voltage differential signaling (LVDS), and front facing camera 108*e* is directly coupled to computing platform 103 also by LVDS. In a ring failure, where the front-facing cameras are connected directly to ADS 101, the front facing cameras 108*d*, 108*f* remain operable. Alternatively, when the front facing cameras 108*d*, 108*f* are attached to a PDC, a partial ring failure may lead to limited coverage depending on the nature of the failure, but not necessarily due to the redundant ring topology. For example, a full ring failure disables all sensors attached to the ring but not those attached directly to ADS 101. This could also be a fail-safe approach for a full ring failure where some cameras are attached directly to ADS 101 so at least some sensor coverage remains (e.g., using front facing cameras 108*d*, 108*f*), which could allow the vehicle to perform a safe stop.

A vehicle can be divided into N zones, where each zone includes one or more PDCs coupled to one or more sensors that cover the zone. In the embodiment shown, vehicle 100*a* is divided into six zones: front-right, front-left, rear-right, rear-left, left side, and right side. In the embodiment shown, additional redundancy is provided at the front and rear of the vehicle by "crossing sensors." For example, radar 106*a* in the rear-left zone is coupled to PDC 105*d* in the rear-right zone, and radar 106*g* in the rear-right zone is coupled to PDC 105*a* in the rear-left zone. Similarly, at the front of the vehicle, radar 106*c* in the front-left zone is coupled to PDC 105*c* in the front-right zone, and radar 106*e* in the front-right zone is coupled to PDC 105*b* in the front-left zone.

E/EA 100*a* provides affordable network redundancy by using a dual-ring, self-healing network topology that includes PDCs and computing platforms. Cost efficient short-range data lines are used between the sensors and the PDCs. Crossing of front/rear radar sensors provides minimum radar coverage if one PDC fails because of a vehicle collision or other catastrophic event. The PDC can operate as a distributed computing node by performing sensor data fusion and/or data compression (e.g., lossless or lossy compression of camera data). Redundant data links are provided from each PDC to a neighbor PDC and/or a computing platform, thus preventing a single link failure (e.g., due to a vehicle collision, short-circuit, or other catastrophic event) leading to sensor data loss. In the event of a fail-safe operation, increased data compression or frame rate reduction can be used to increase network bandwidth and transmission rate. In the event of a single PDC failure, the CAN-FD bus can be used to couple a functioning PDC with SCGW 103. The computing platforms can be coupled to together with redundant high-speed data buses, such as HDBaseT and Ethernet data links, thus preventing failure of all HDBaseT links or Ethernet links leading to a total system failure.

Figure 1B:
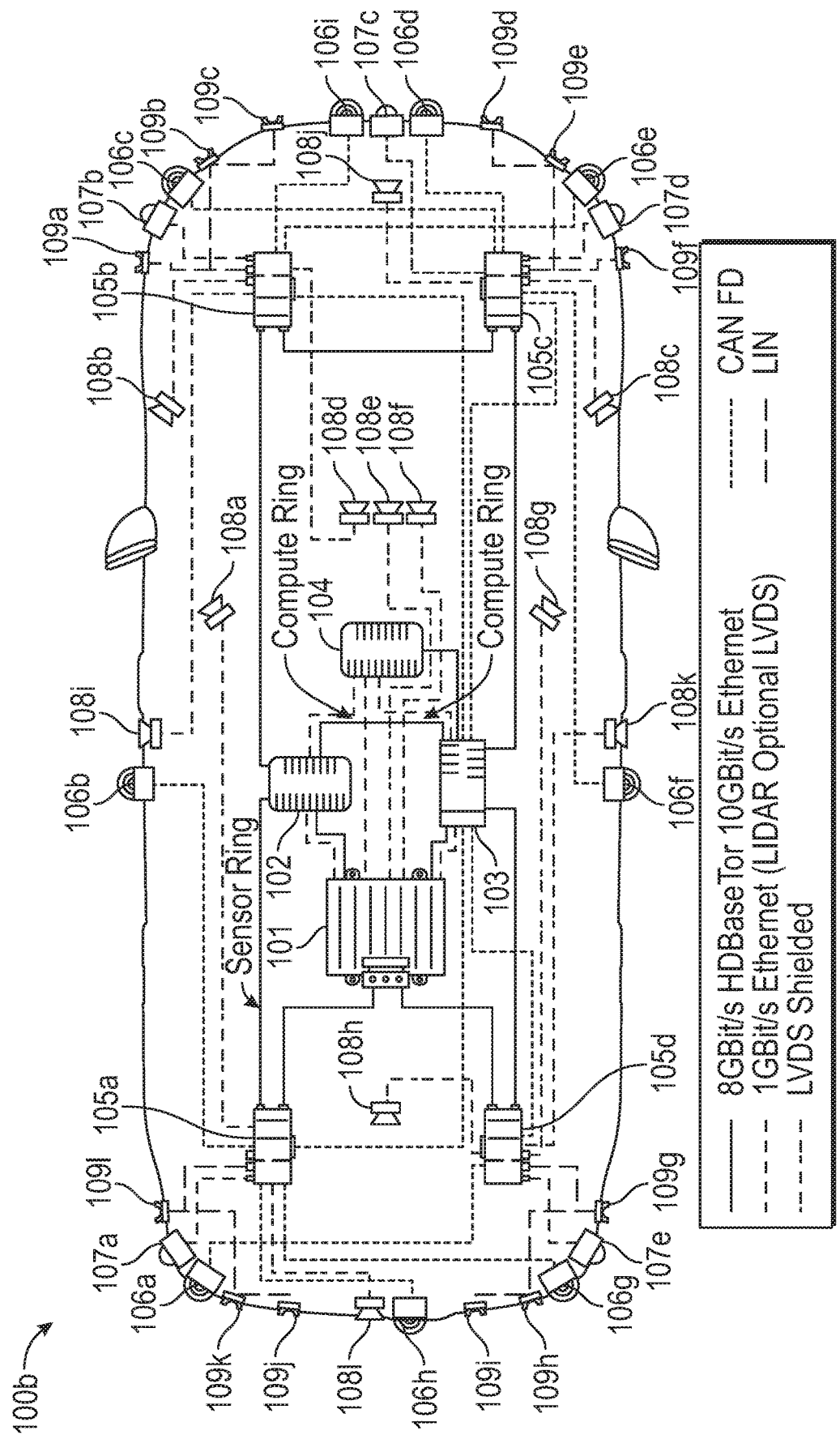
FIG. 1B illustrates an E/EA system architecture for data distribution in a vehicle with autonomous driving capability that uses four PDCs, according to some embodiments.

FIG. 1B illustrates an E/EA system architecture 100*b* for data distribution in a vehicle with autonomous driving capability that uses four PDCs, according to some embodiments. In this embodiment, the sensors are coupled to the computing platforms and PDCs by redundant sensor rings and the computing platforms are coupled to each other by redundant compute rings. There are additional cameras 108*i* and 108*k* on the left and right sides of vehicle, respectively. There are also additional cameras 108*l*, 108*j* at the rear and front of the vehicle, respectively. Note that cameras 108*a*, 108*g* have been moved toward the front of the vehicle proximate the driver and passenger doors. Also, sonars 109*a*-109*c* are coupled to PDC 105*b*, sonars 109*d*-109*f* are coupled to PDC 105*c*, sonars 109*g*-109*i* are coupled to PDC 105*c*, and sonars 109*j*-109*l* are coupled to PDC 105*a*. In some embodiments, PDCs 105*a*-105*d* are coupled each of their respective sonars using a local interconnect network (LIN) bus. The LIN bus handles the connection of low-end multiplexed communication, while the CAN-FD bus is used for high-end operations that require quick and efficient connections, such as error handling.

Compared to E/EA system architecture 100*a*, camera 108*d* is coupled to PDC 105*b* rather than ADS 101, and camera 108*e* is coupled to ADS 101 rather than SCGW 103. Cameras 108*d*-108*f* can have different field of views and sensors with different resolutions (e.g., different number of pixels), such as 100°/1.7 MP, 120°/7.4 MP, and 28°/7.4 MP. Compared to E/EA system architecture 100*a*, PCS 104 is coupled to the other platforms ADS 101, CSP 102, and SCGW 103 by the redundant compute rings rather than PDCs 105*b*, 105*c*, and radar 106*h* is coupled to PDC 105*a* rather than PDC 105*d*. The redundant data links between the sensors, PDCs, and computing platforms are indicated by the legend on FIG. 1B.

Figure 1C:
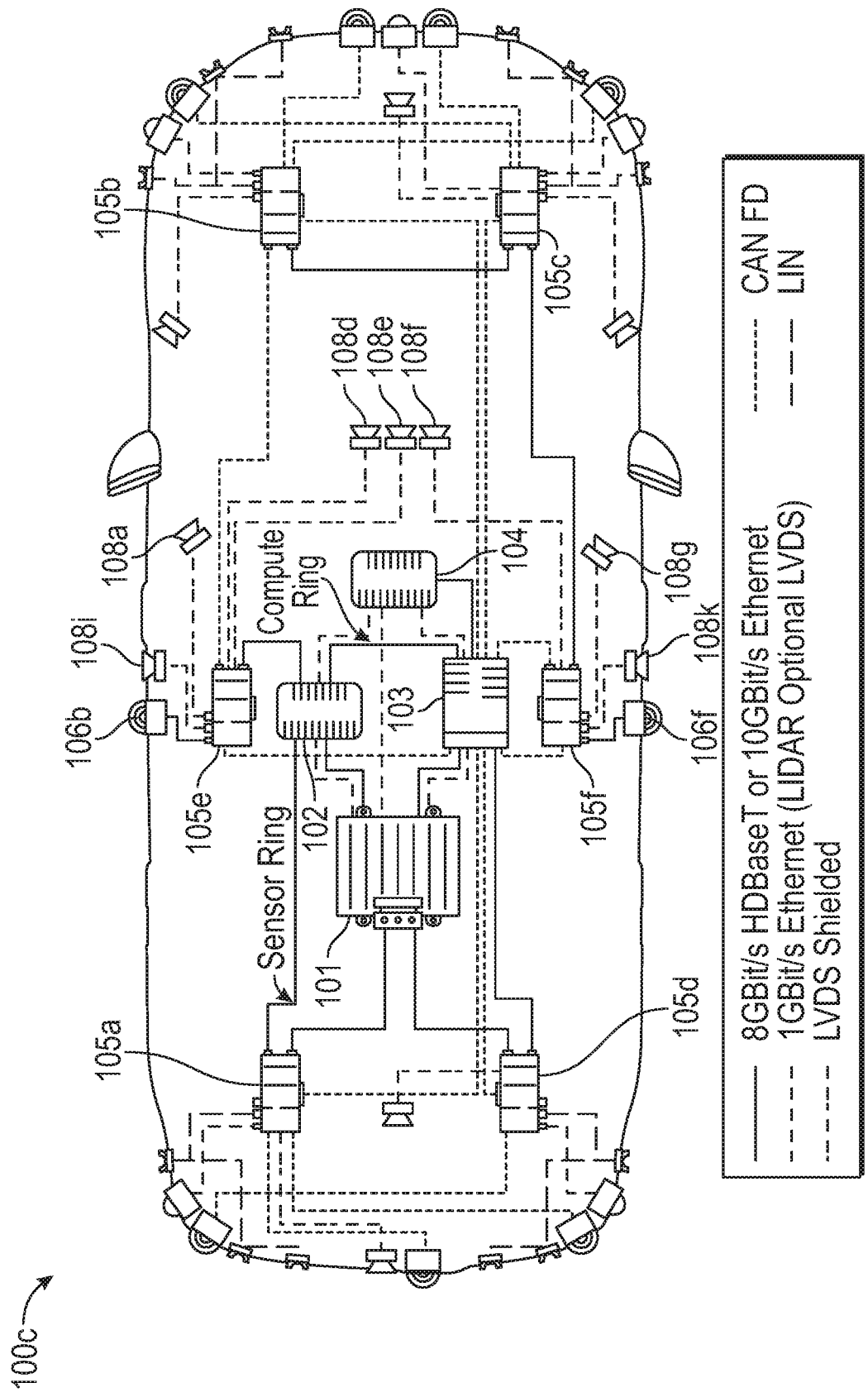
FIG. 1C illustrates an E/EA system architecture for data distribution in a vehicle with autonomous driving capability that uses six PDCs, according to some embodiments.

FIG. 1C illustrates an E/EA system architecture 100*c* for data distribution in a vehicle with autonomous driving capability that uses six PDCs, according to some embodiments. Placing four PDCs 105*a*-105*d* in each corner of the vehicle chassis as shown in E/EA 100*a* optimizes the electronic cost but potentially does not allow for automated wire harness manufacturing due to the length of some of the sensor data paths. E/EA system architecture 100*c* includes additional PDCs 105*e*, 105*f*, on the left and right sides of the vehicle. Adding two additional PDCs 150*e*, 105*f* allows automated wire harness production and improves functional safety by having less sensors lost due to PDC failure. In general, any number of PDCs can be included in the E/EA system architecture to scale the E/EA according to the optimization focus. In some embodiments, the class/size of the target vehicle, together with the possible number of sensors and electrical loads can define the optimal number of PDCs to include in the E/EA.

E/EA system architecture 100*c* includes the same number and type of sensors in E/EA system architecture 100*b*, but the data links for certain sensors are shortened due to the additional PDCs 105*e*, 105*f*. For example, radar 106*b* and cameras 108*i*, 108*a* are now coupled to PDC 105*e* rather than PDCs 105*a*, 105*b*, and radar 106*f* and cameras 108*k*, 108*g* are now coupled to PDC 105*f* rather than PDCs 105*c*, 105*d*. PDC 105*e* is further coupled to computing platforms CSP 102, SCGW 103, and PDC 105*b* by redundant compute rings and to front facing cameras 108*d* and 108*e*. PDC 105*f* is further coupled to CSP 102, PDC 105*c*, and front facing camera 108*f*.

Figure 1D:
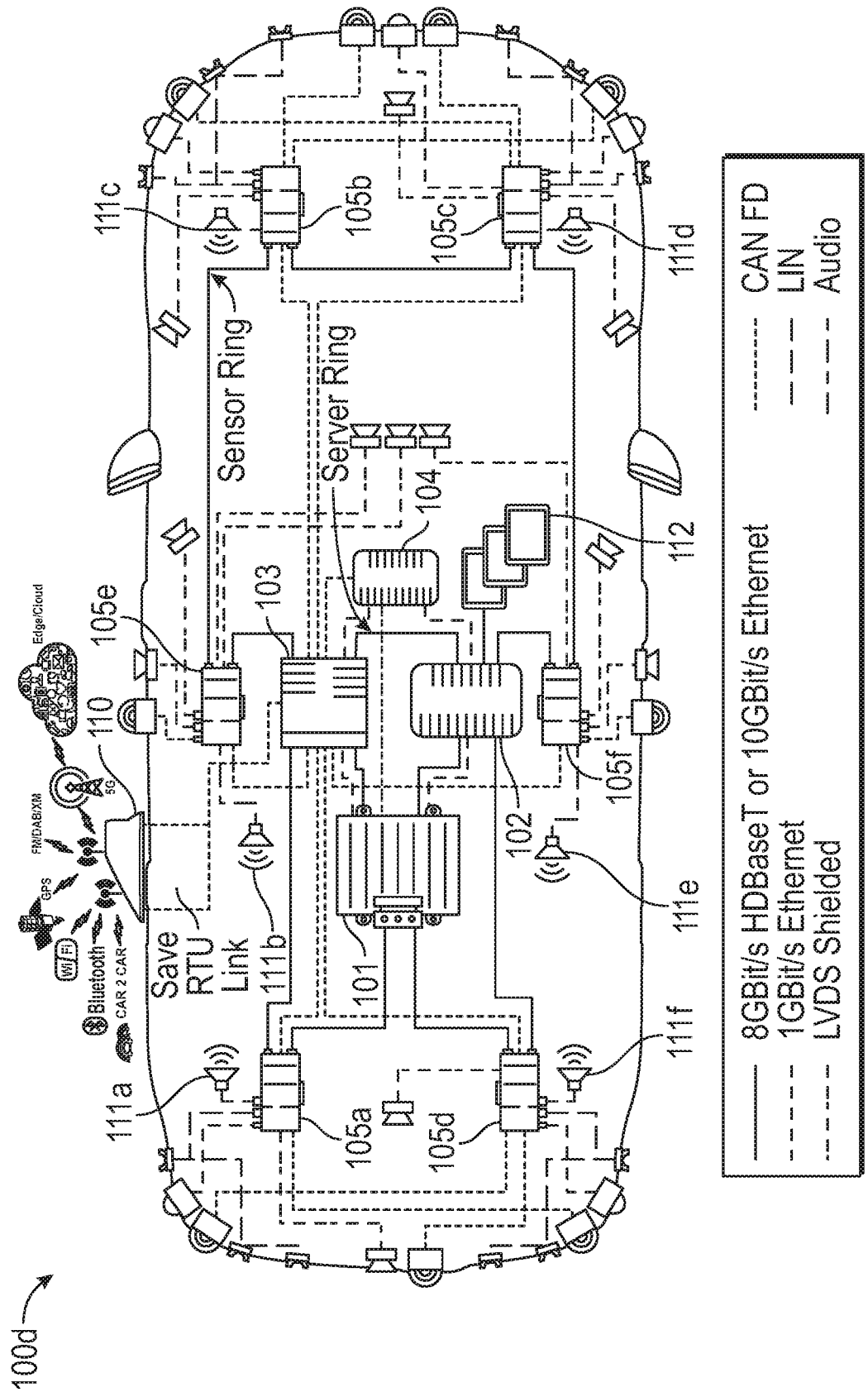
FIG. 1D illustrates an E/EA system architecture for data distribution in a vehicle with autonomous driving capability that uses six PDCs, according to some embodiments.

FIG. 1D illustrates an E/EA system architecture 100*d* for data distribution in a vehicle with autonomous driving capability that uses six PDCs, according to some embodiments. In this embodiment, PDCs 105*a*-105*f* are coupled in a sensor ring and ADS 101, CSP 102, SCGW 103*a*, and PCS 104 are coupled together into a server ring. This E/EA differs from previously described architectures by including six audio loudspeakers 111*a*-111*f*, which are coupled to PDCs 105*a*-105*f* for receiving audio data, and one or more displays coupled to CSP 102. Although loudspeakers 111*a*-111*f* are shown as active in this embodiment, in another embodiment the loudspeakers 111*a*-111*f* can be passive loudspeakers, where the amplification circuitry is included in PDCs 105*a*-105*f* to reduce heat generated by active loudspeaker circuitry.

Also included in E/EA system architecture 100*d* is remote transceiver unit (RTU) 110, which includes one or more wireless transceiver chips and supporting circuitry, and antennas for various wireless communication technologies, including without limitation: Bluetooth, Car 2 Car, WiFi, 5G, global navigation satellite system (GNSS) (e.g., GPS), FM stereo, satellite radio, and any other communication hardware. In some embodiments, the antennas can be unidirectional, omnidirectional, multiple input multiple output (MIMO), antenna arrays, or any other type of antenna. In some embodiments, the antennas can be configurable and steerable. RTU 110 is coupled to SCGW 102 by two or more data links for redundancy.

Figure 1E:
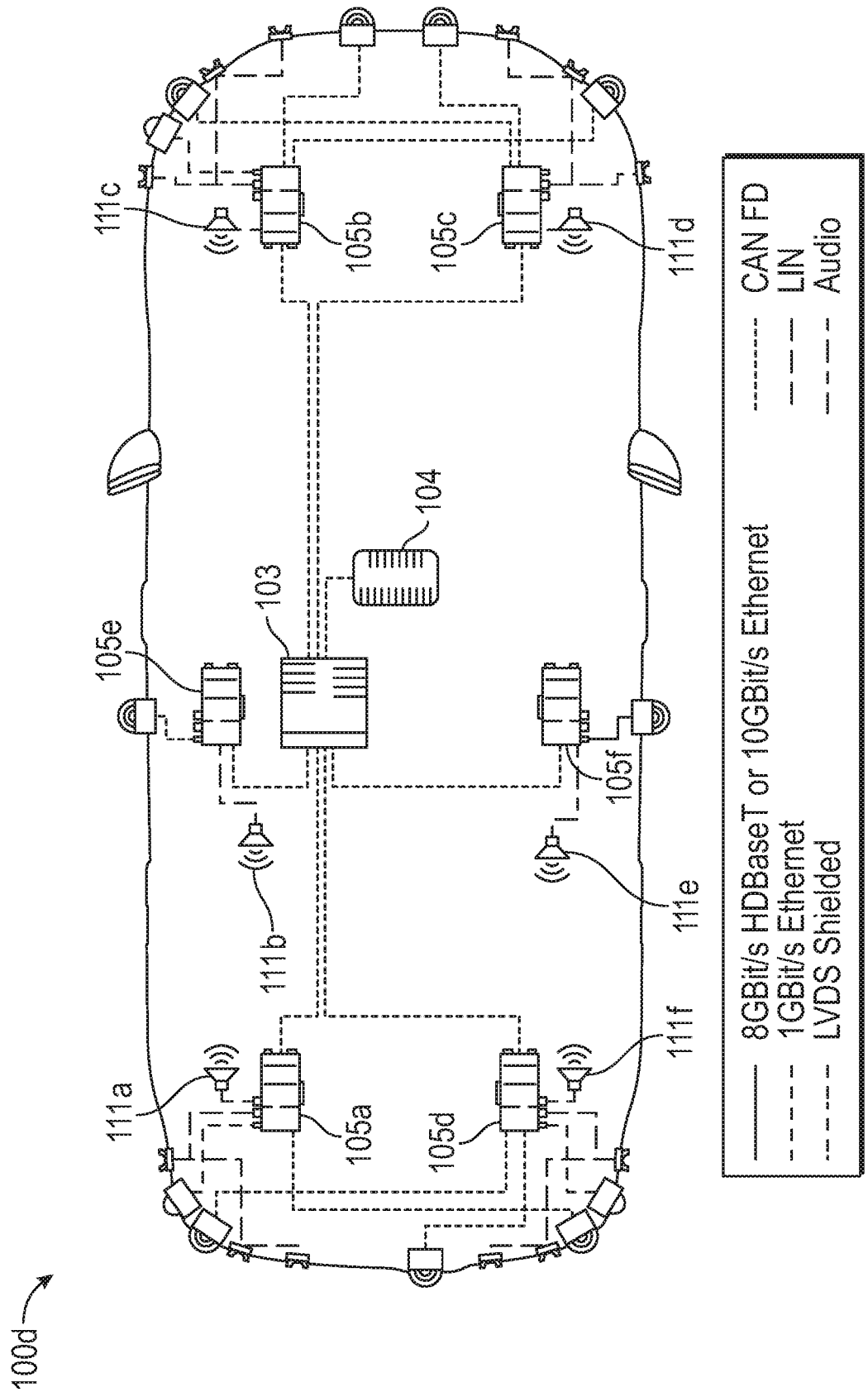
FIG. 1E illustrates Controller Area Network Flexible Data (CAN-FD) fallback and power management for the E/EA system architecture of FIG. 1D, according to some embodiments.

FIG. 1E illustrates CAN-FD fallback and power management for E/EA system architecture 100*d* of FIG. 1D, according to some embodiments. In the event that ADS 101 and CSP 102 fail, the CAN-FD bus will couple PDCs 105a-105f and SCGW 103 together. This configuration will allow communication of information (e.g., sensor data) to a remote tele operator through RTU 110. This configuration also allows the PDCs 105a-105f to distribute power to their respective sensors to ensure sensor coverage on all zones of the vehicle.

Figure 1F:
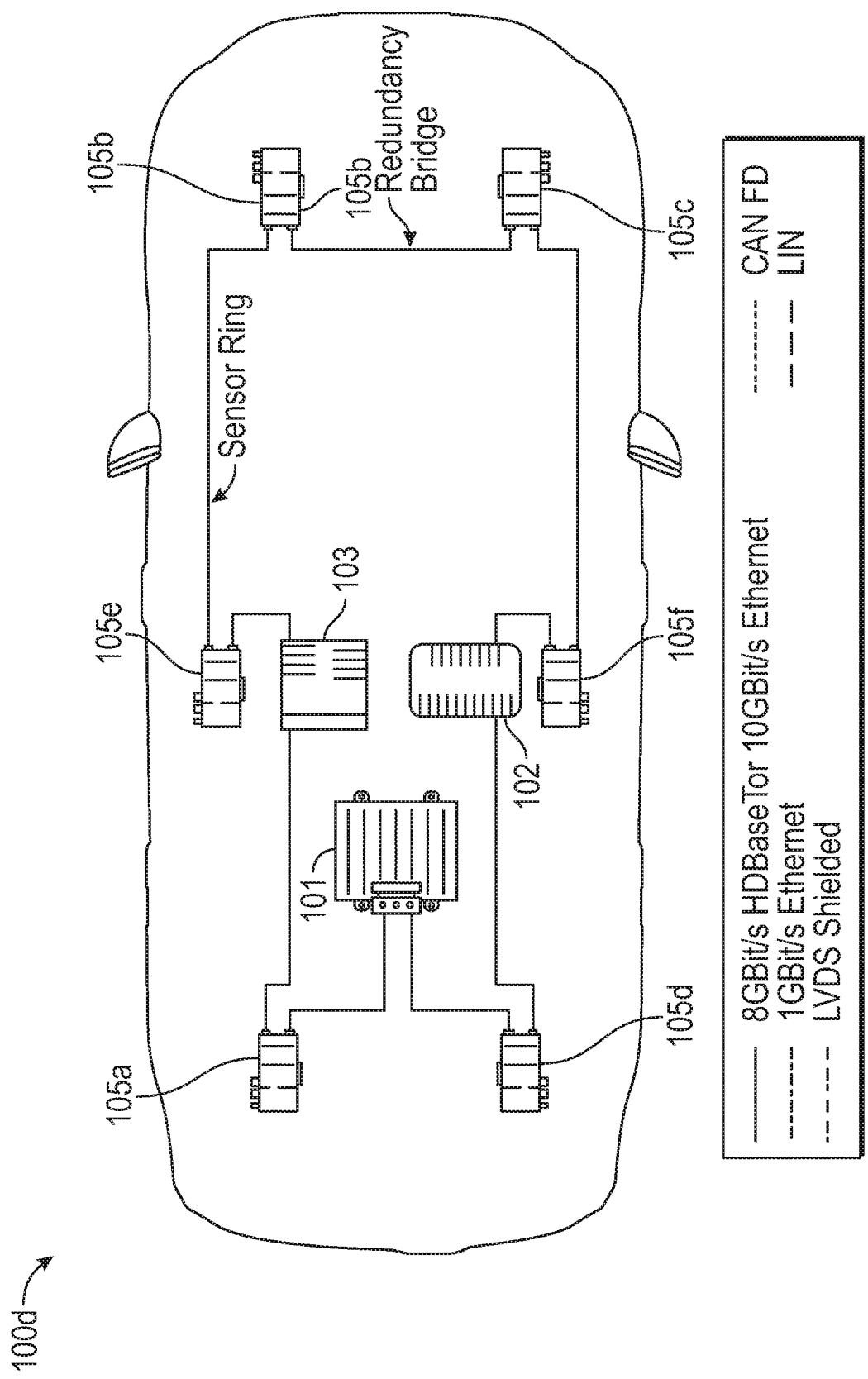
FIG. 1F illustrates the redundant sensor ring topology used by the E/EA system architecture of FIG. 1D, according to some embodiments.

FIG. 1F illustrates the redundant sensor ring topology used by E/EA system architecture 100d of FIG. 1D, according to some embodiments. In this embodiment, the six PDCs 105a-105f and ADS 101, CSP 102, and SCGW 103 are included in the sensor ring. A redundancy bridge couples PDC 105b to 105c.

Figure 1G:
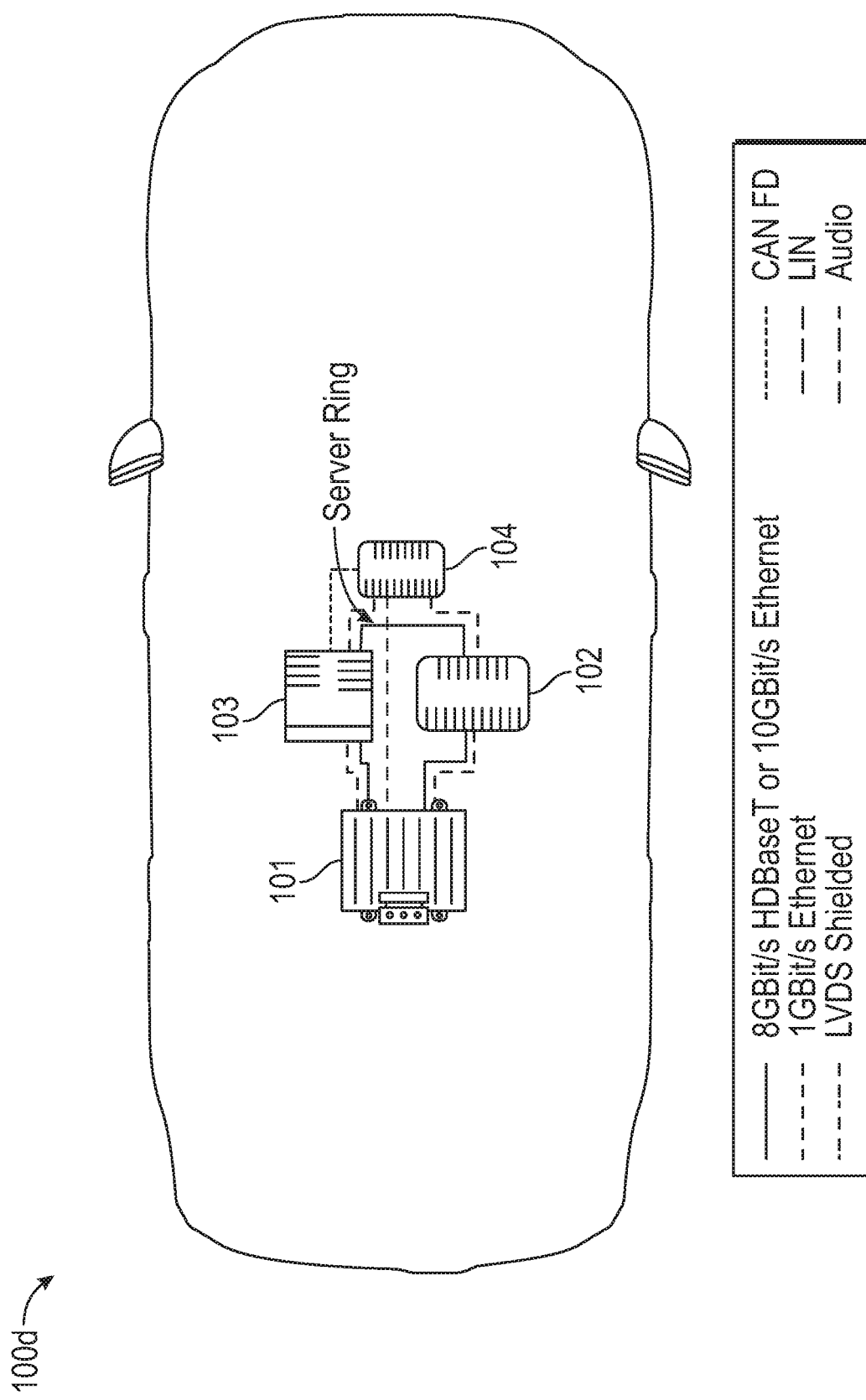
FIG. 1G illustrates the redundant service ring topology used by the E/EA system architecture of FIG. 1D, according to some embodiments.

FIG. 1G illustrates the redundant service ring topology used by E/EA system architecture 100d of FIG. 1D, according to some embodiments. As shown, ADS 101, CSP 102, SCGW 103, and PCS 104 are coupled together in the server ring for redundancy in case the sensor ring fails.

Figure 1H:
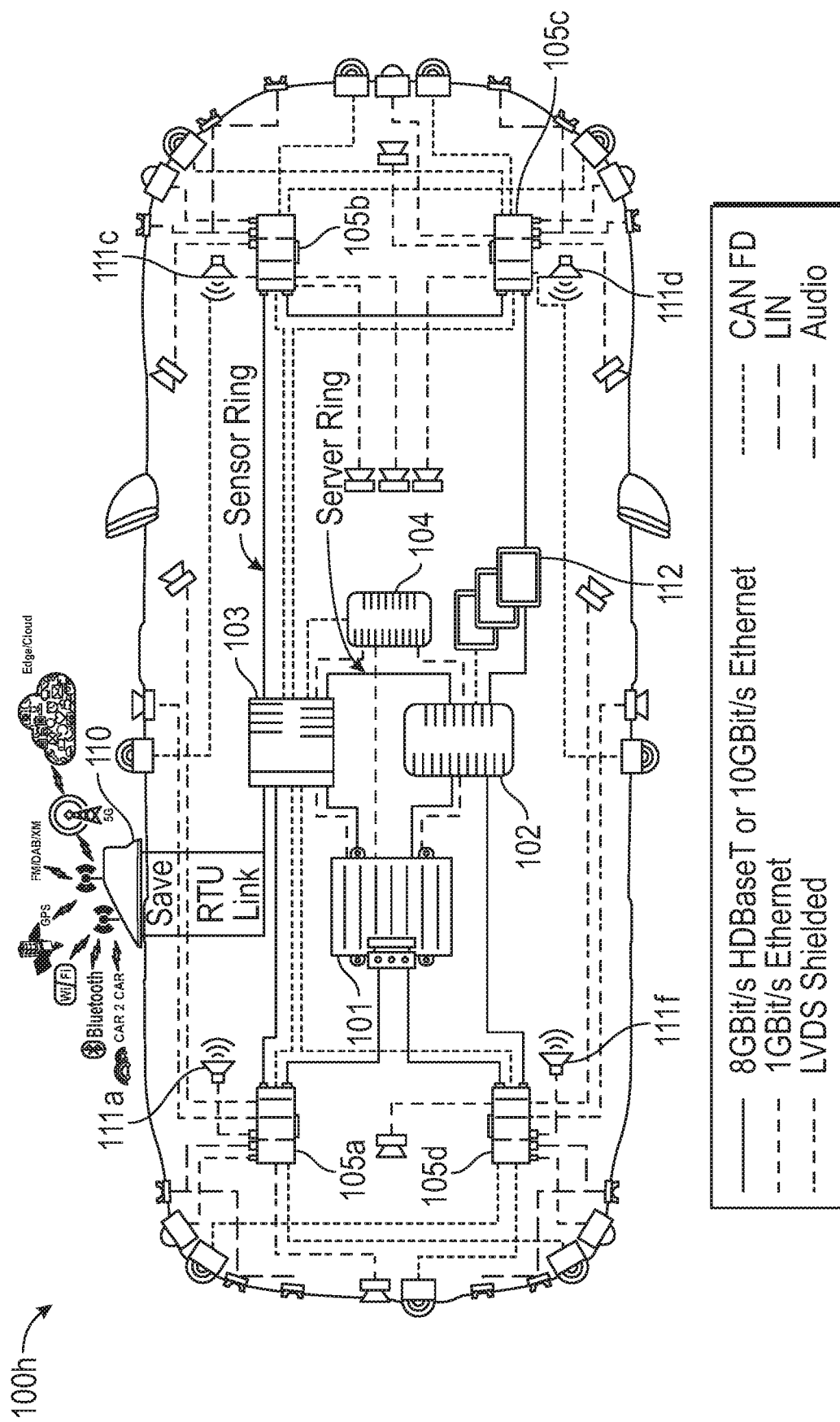
FIG. 1H illustrates an E/EA system architecture for data distribution in a vehicle with autonomous driving capability that uses four PDCs, according to some embodiments.

FIG. 1H illustrates an E/EA system architecture 100h for data distribution in a vehicle with autonomous driving capability that uses four PDCs 105a-105d, according to some embodiments. E/EA 100h is similar to E/EA 100d but is missing left and right side PDCs 105e, 105f and audio loudspeakers 111b, 111e. Audio loudspeaker 111c and LIDAR 106b are coupled in series to PDC 105b, and audio loudspeaker 111d and LIDAR 106f are coupled in series to PDC 105c.

Figure 2A:
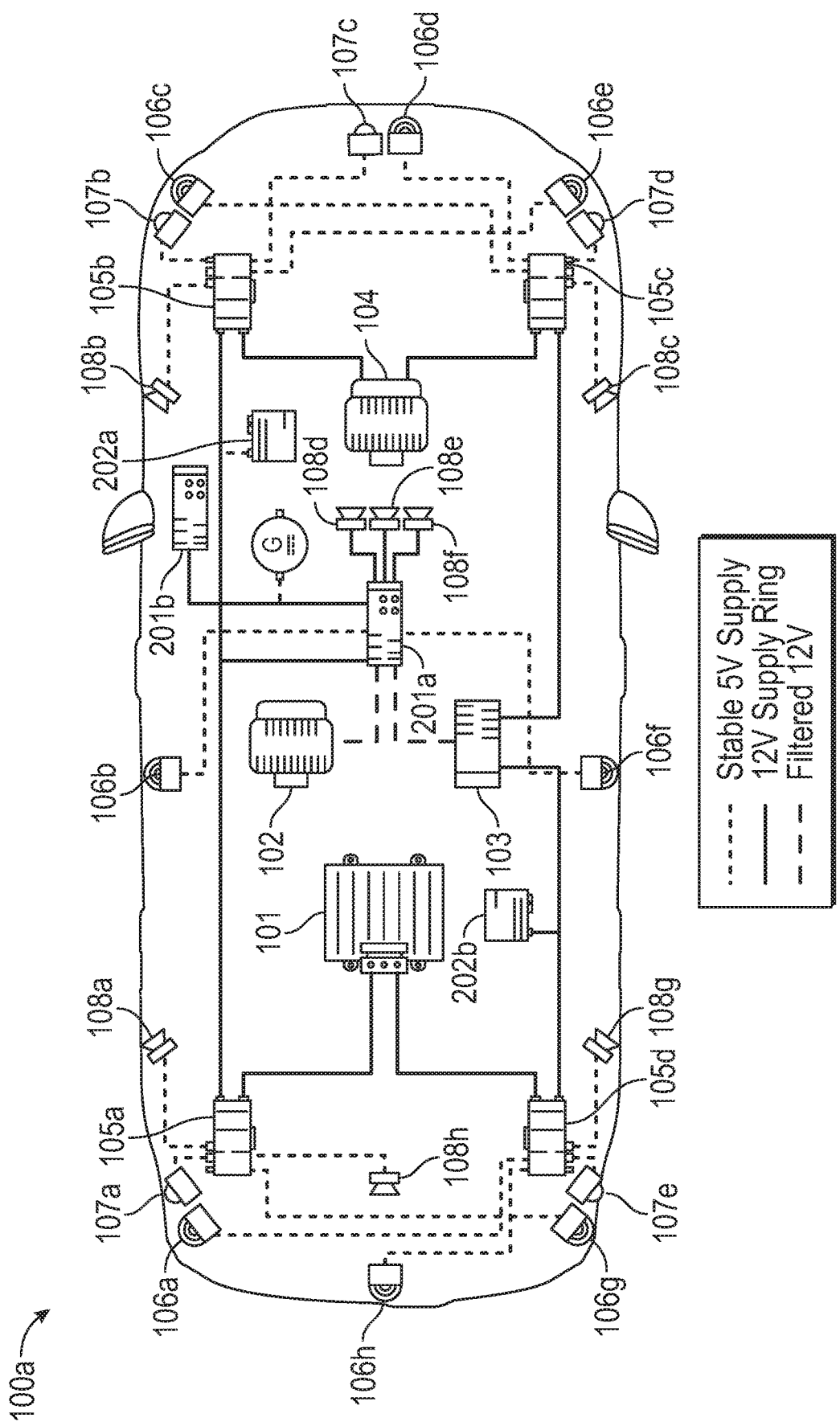
FIG. 2A illustrates an automotive E/EA system architecture for power distribution in a vehicle with autonomous driving capability that uses four PDCs, according to some embodiments.

FIG. 2A illustrates an embodiment of automotive E/EA system architecture 100a for power distribution in the vehicle with autonomous driving capability that uses four PDCs. In addition to the computing platforms, sensors, and PDCs shown in FIG. 1A, FIG. 2A shows redundant Electrical Center & Power Distribution (ECPDs) 201a, 201b and redundant power supplies 202a, 202b (e.g., Batteries). Redundant ECPDs 201a, 201b provide safe power distribution of high voltage circuits and manage battery power. ECPD 201a distributes a filtered 12 volt supply to CSP 102 and SCGW 103, and a stable voltage (e.g., 5V) supply to front facing cameras 108d, 108e, and 108f, as shown in FIG. 2A. ECPDs 201a, 201b, power supplies 202a, 202b, PDCs 105a-105d, and ADS 101 are coupled to redundant power supply rings (e.g., 12V) as shown in FIG. 2A.

PDCs 105a-105d distribute power (e.g., a stable 5V supply) to each of their respective zone sensors and cross sensor. For example, PDC 105a provides power to its respective zone sensors (sensors 107a, 108a, 108h) and cross sensor (sensor 106g), PDC 105b provides power to its respective zone sensors (sensors 107b, 107c, 108b) and cross sensor (sensor 106e), PDC 105c provides power to its respective zone sensors (106d, 107d, 108c) and cross sensor (sensor 106c), and PDC 105d provides power to its respective zone sensors (106h, 107d, 108d) and cross sensor (sensor 106a).

The E/EA 100a described above in FIG. 1A and FIG. 2A provides affordable power redundancy by using redundant power rings and a hybrid approach of vehicle electrical centers and PDCs. Redundant power supplies (e.g., 12V batteries) power the PDCs and computing platforms. The sensors are supplied with a stable and filtered power supply (e.g., 5V). No sensor or computing platform is lost due to a single power supply failure.

Figure 2B:
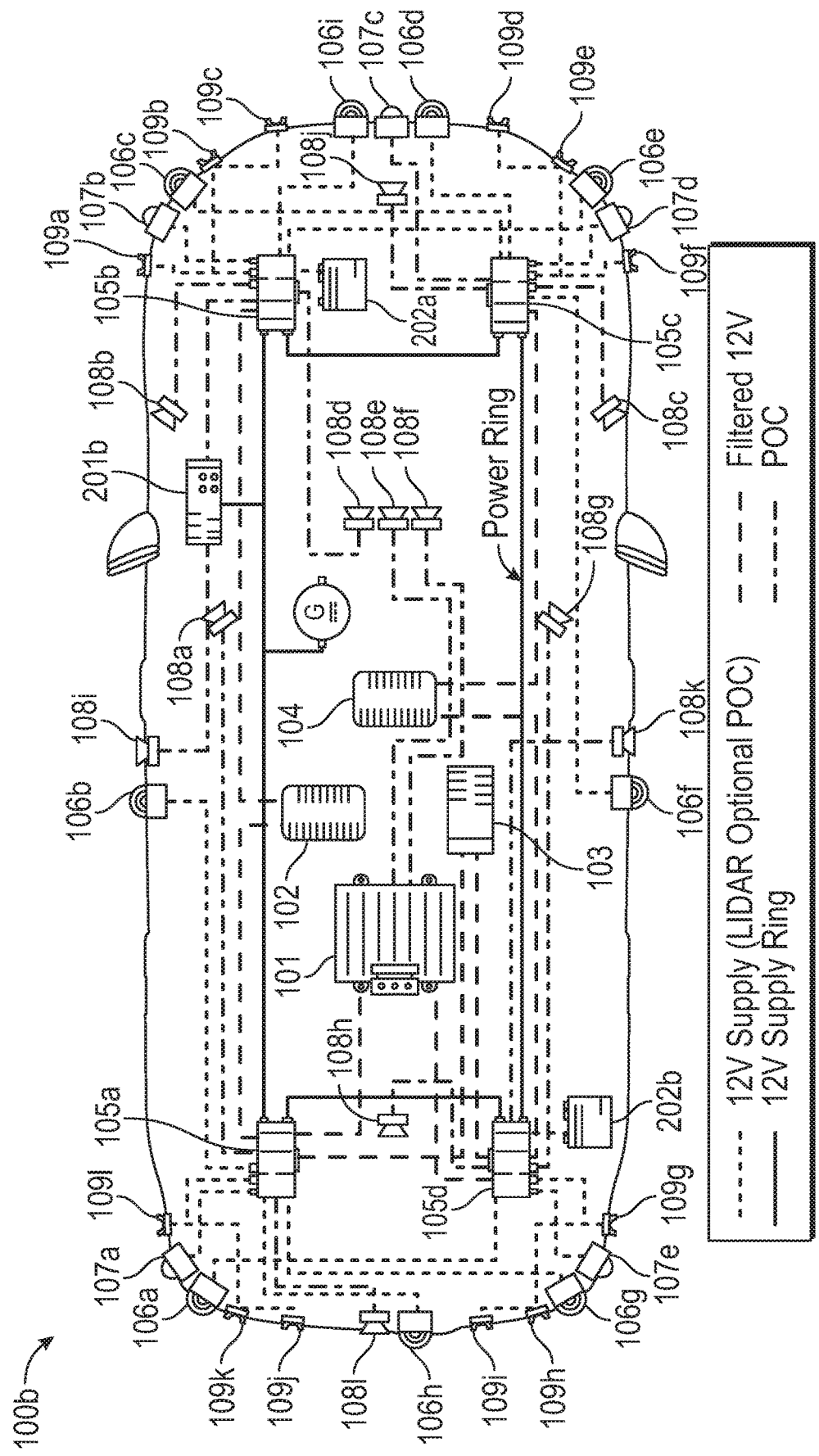
FIG. 2B illustrates an automotive E/EA system architecture for power distribution in a vehicle with autonomous driving capability that uses four PDCs, according to some embodiments.

FIG. 2B illustrates an embodiment of automotive E/EA system architecture 100b for power distribution in a vehicle with autonomous driving capability that uses four PDCs. In this embodiment, compared to the embodiment of E/EA 100a in FIG. 2A, ECPD 201a has been removed and ECPD 201b is coupled to a 12 volt power supply ring, camera 108i, and PDC 105b. PDCs 105a-105d are each coupled to two redundant power rings and distribute power (e.g., a 12V supply) to each of their respective zone sensors and cross sensor. In some embodiments, the PDCs 105a-105f use Power over Coax (POC) to power at least some of their zone sensors (e.g., cameras). For example, PDC 105a powers camera 108a and camera 108l using POC. Cameras 108b, 108d, 108i are powered by PDC 105b using POC and cameras 108e, 108f are powered by ADS 101. PDCs 105a-105f supply a filtered 12V supply to computing platforms 101-104. Power supplies 202a, 202b are coupled directly to PDCs 105b, 105d, respectively.

Figure 2C:
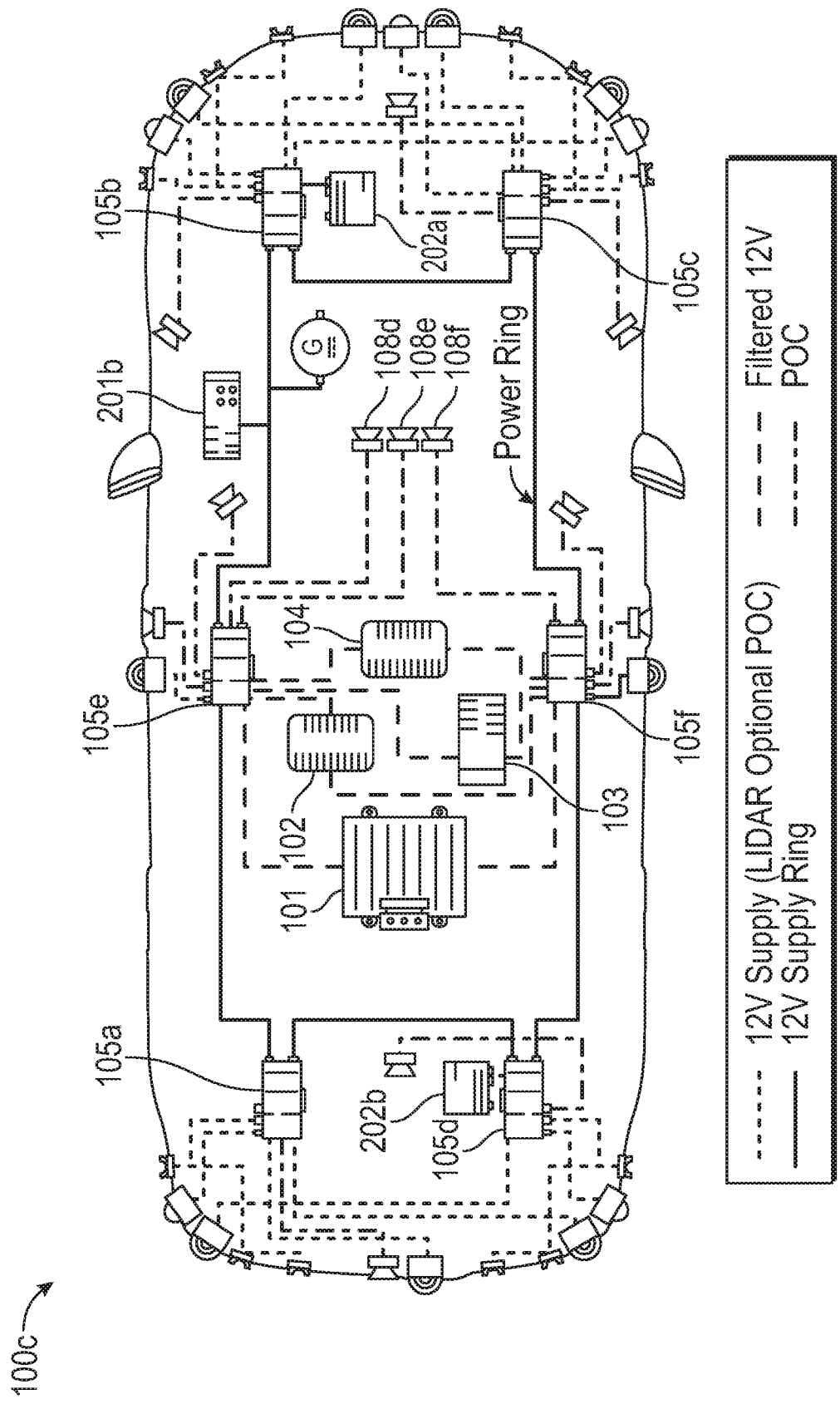
FIG. 2C illustrates an automotive E/EA system architecture for power distribution in a vehicle with autonomous driving capability that uses six PDCs, according to some embodiments.

FIG. 2C illustrates an embodiment of automotive E/EA system architecture 100c for power distribution in a vehicle with autonomous driving capability that uses six PDCs 105a-105f. FIG. 2C shows ECPD 201b and redundant power supplies 202a, 202b (e.g., batteries). PDCs 105a-105f distribute power (e.g., a 12V supply) to each of their respective zone sensors and cross sensor. PDCs 105e, 105f and computing platforms 101-104 are all coupled to a first 12V filtered power ring. PDCs 105a-105f are coupled to a second 12V power ring. PDCs 105a-105f distribute power (e.g., a 12V supply) to each of their respective zone sensors and cross sensor. In some embodiments, the PDCs 105a-105f use POC to power at least some of their zone sensors (e.g., cameras). Cameras 108d, 108e, are powered by PDC 105e and camera 108f is powered by PDC 105f.

Figure 2D:
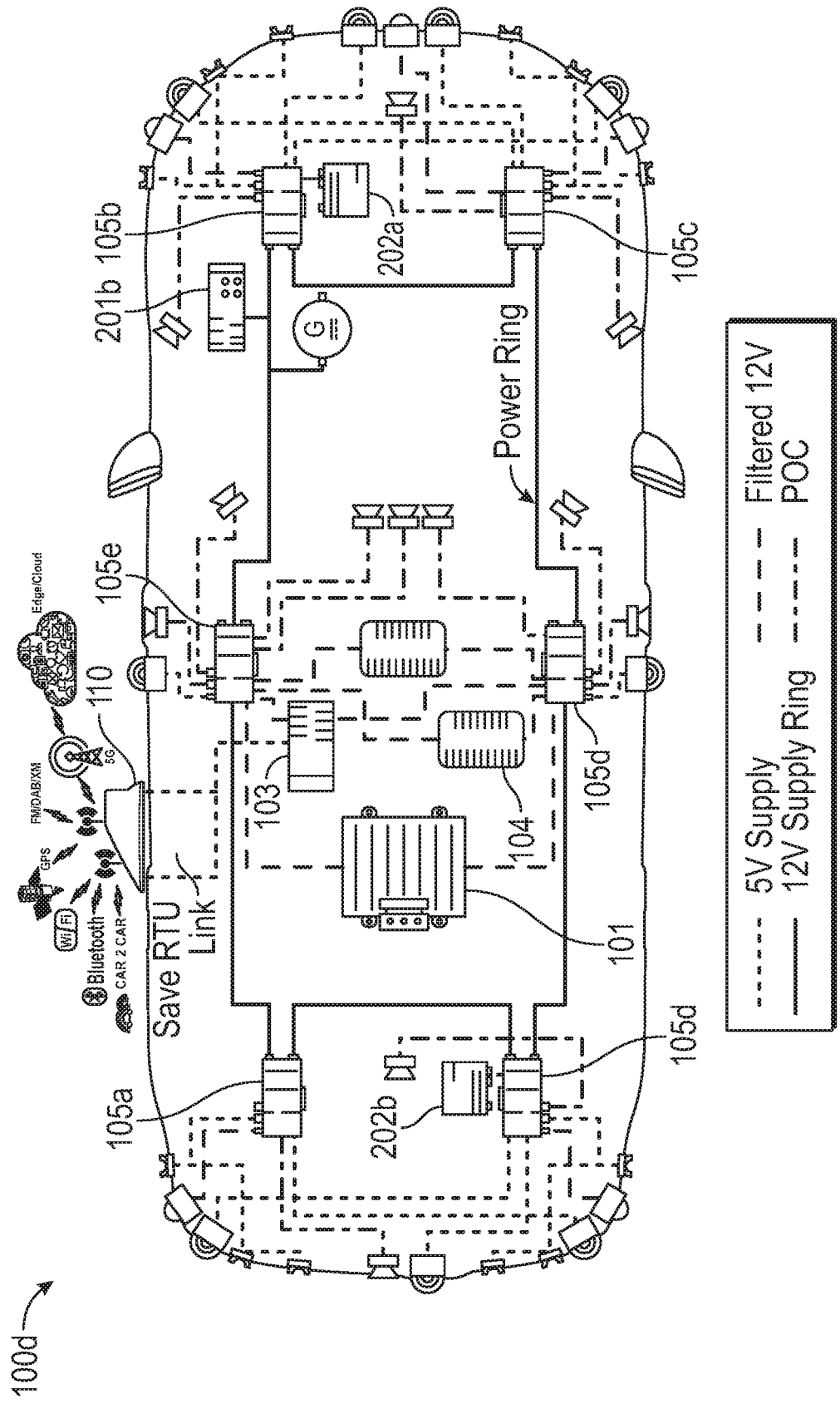
FIG. 2D illustrates an automotive E/EA system architecture for power distribution in a vehicle with autonomous driving capability that uses six PDCs, according to some embodiments.

FIG. 2D illustrates an embodiment of automotive E/EA system architecture 100d for power distribution in a vehicle with autonomous driving capability that uses six PDCs. Each PDC 105a-105f is dedicated to a zone of the vehicle and distributes power from power supplies 202a, 202b to their respective zone sensors. Note that RTU 110 is powered by SCGW 103. Also note the use of crossed sensors between the front-right and front-left zones and between the rear-right and rear-left zones to ensure that these zones have at least minimum radar coverage in the event the PDC in the zone fails.

Figure 2E:
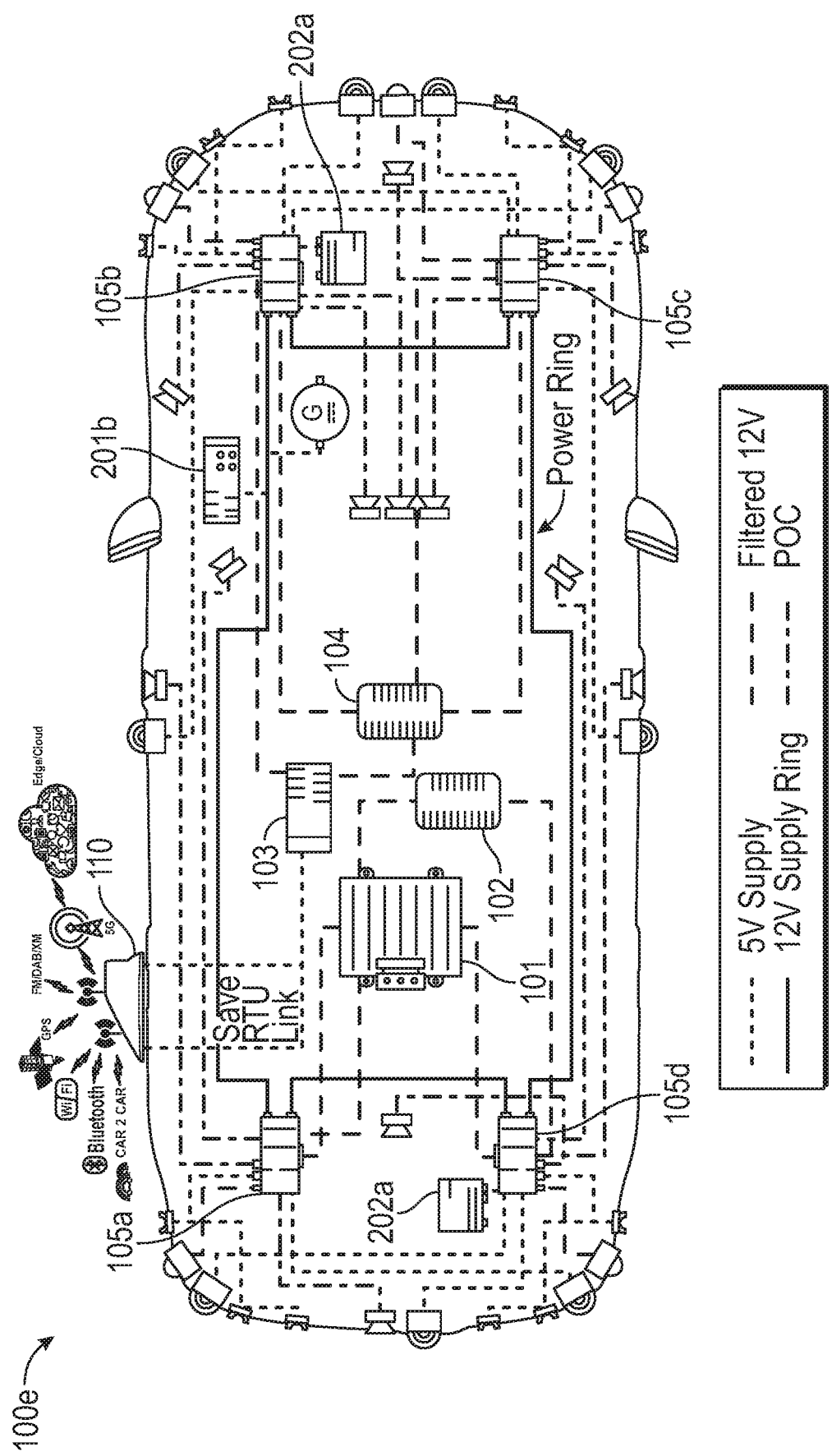
FIG. 2E illustrates an automotive E/EA system architecture for power distribution in a vehicle with autonomous driving capability that uses four PDCs, according to some embodiments.

FIG. 2E illustrates an embodiment of automotive E/EA system architecture 100e for power distribution in a vehicle with autonomous driving capability that uses four PDCs. Each PDC 105a-105d is dedicated to a zone of the vehicle and distributes power from power supplies 202a, 202b to their respective zone sensors. Note that RTU 110 is powered by SCGW 103. Also note the use of crossed sensors between the front-right and front-left zones and between the rear-right and rear-left zones to ensure that these zones have at least minimum radar coverage in the event the PDC in the zone fails.

Figure 3A:
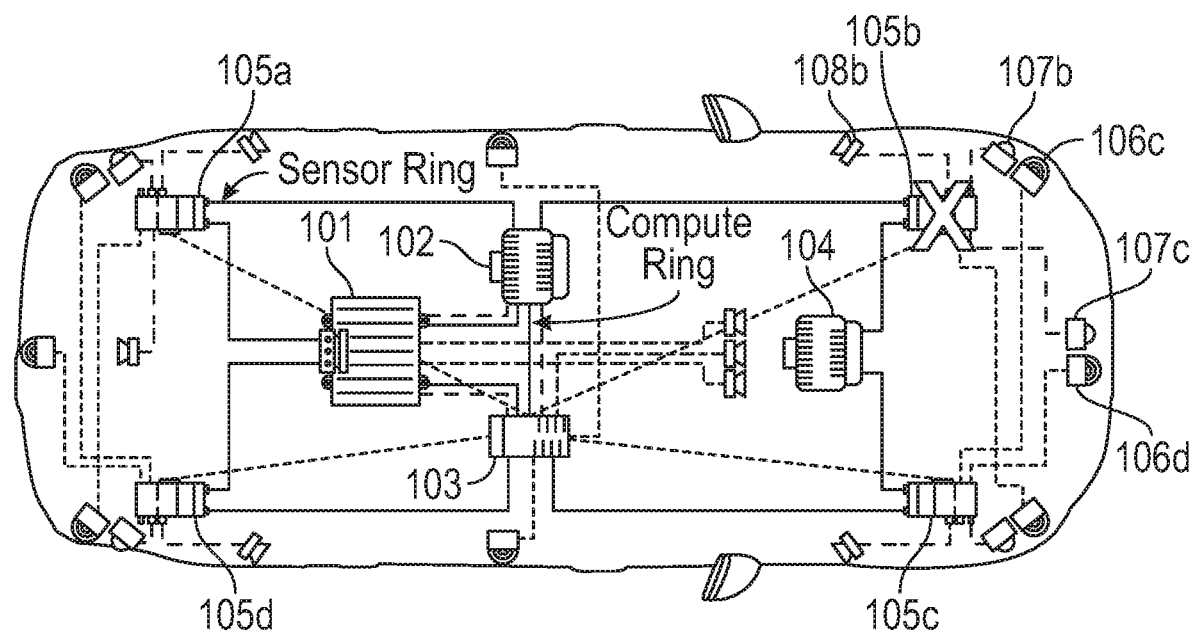
FIG. 3A illustrates fail-safe operation of the vehicle prior to failure of a PDC, according to some embodiments.
Figure 3B:
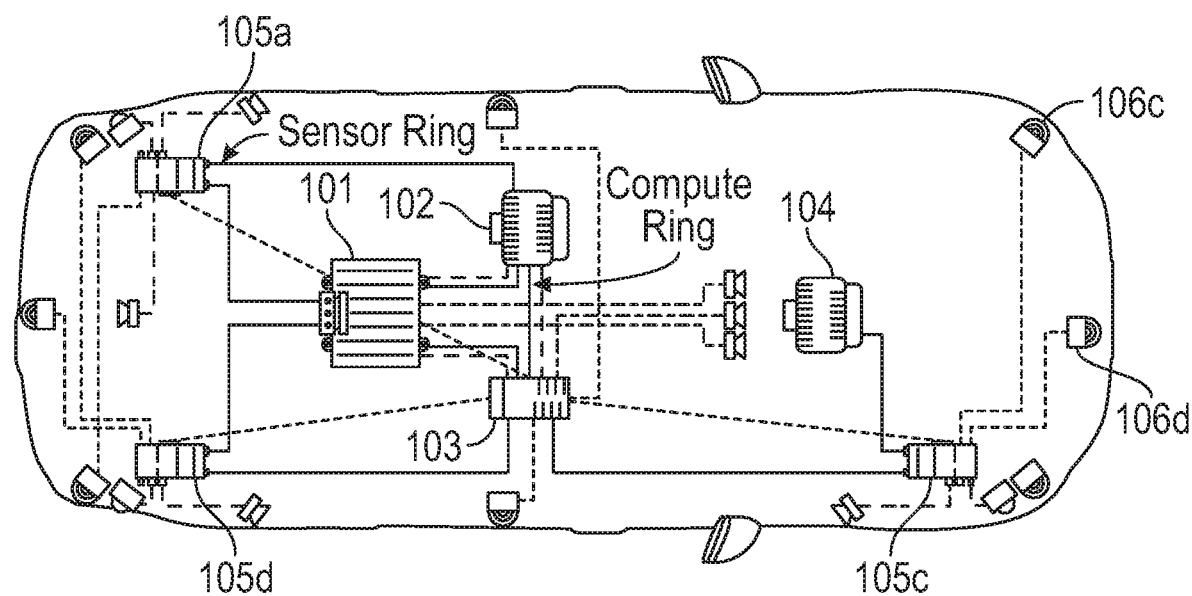
FIG. 3B illustrates fail-safe operation of the vehicle after failure of the PDC, according to some embodiments.

FIG. 3A illustrates fail-safe operation of the vehicle prior to failure of PDC 105b, and FIG. 3B illustrates fail-safe operation of the vehicle after failure of PDC 105b, according to some embodiments. Note that due to failure of PDC 105b (indicated by the large "X"), camera 108b and LIDARs 107b, 107c are disabled (e.g., due to a loss of data link, power, or both), but radar 106c is still active due to its coupling with PDC 105c. Thus, the front-left zone still has radar coverage after the failure of PDC 105b. Note that PCS 104 still receives sensor data from PDC 105c, allowing vehicle driving systems to still function. Although LIDAR 107c is disabled, the front zone of the vehicle is still covered by camera 106d.

Figure 3C:
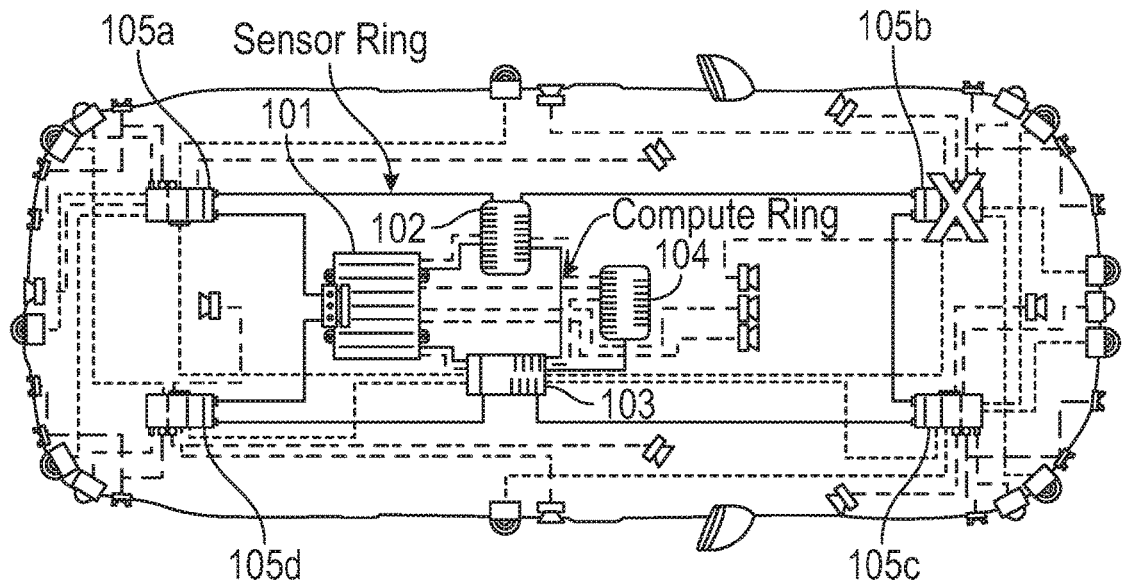
FIG. 3C illustrates fail-safe operation of the vehicle prior to failure of a PDC, according to some embodiments.
Figure 3D:
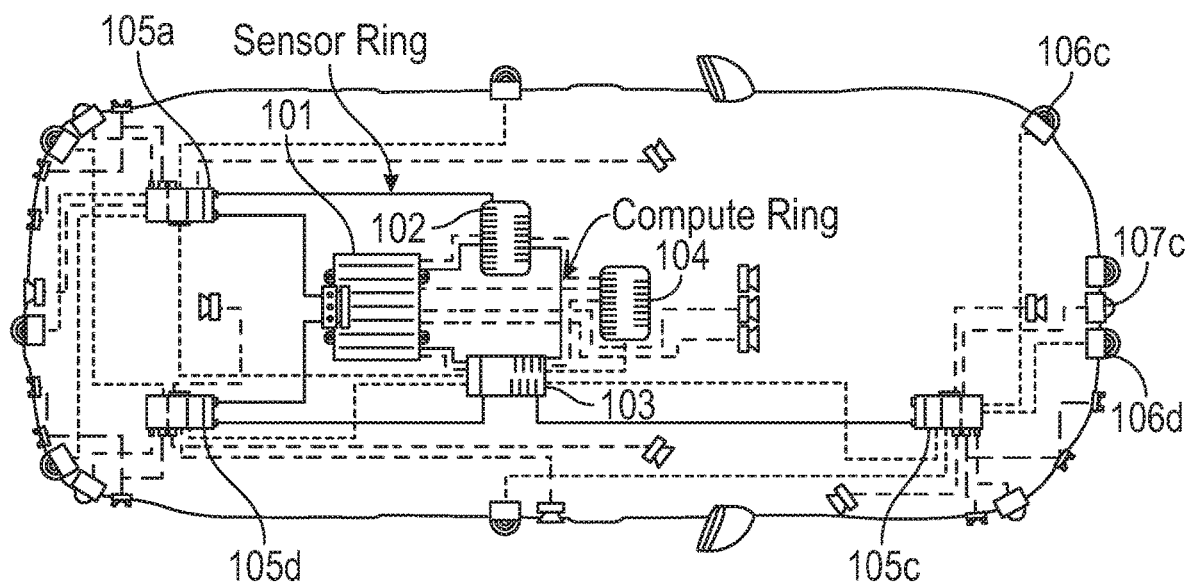
FIG. 3D illustrates fail-safe operation of the vehicle after failure of the PDC, according to some embodiments.

FIG. 3C illustrates fail-safe operation of the vehicle prior to failure of the PDC 105b, and FIG. 3D illustrates fail-safe operation of the vehicle after failure of the PDC 105b, according to some embodiments. Although the sensors coupled to PDC 105b are no longer available (e.g., due to a lost data link, power or both), the E/EA compensates for the complete loss of PDC 105b. For example, minimum radar coverage is provided in the impaired zone by radar 106c, which is coupled to PDC 105c.

Figure 3E:
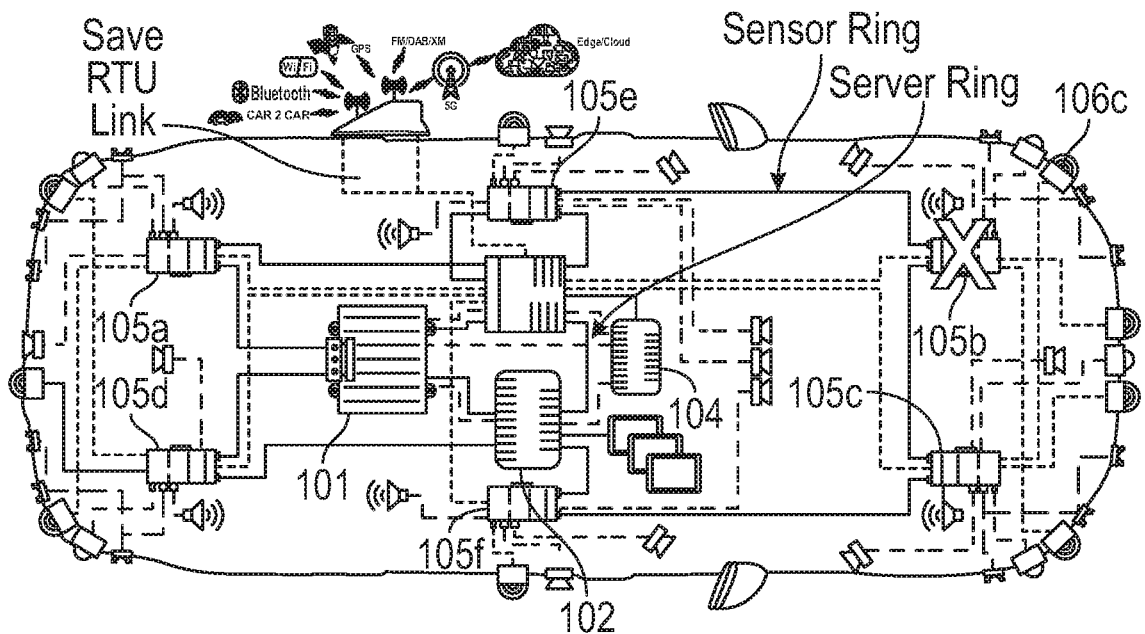
FIG. 3E illustrates fail-safe operation of the vehicle with six PDCs prior to failure of the PDC, according to some embodiments.
Figure 3F:
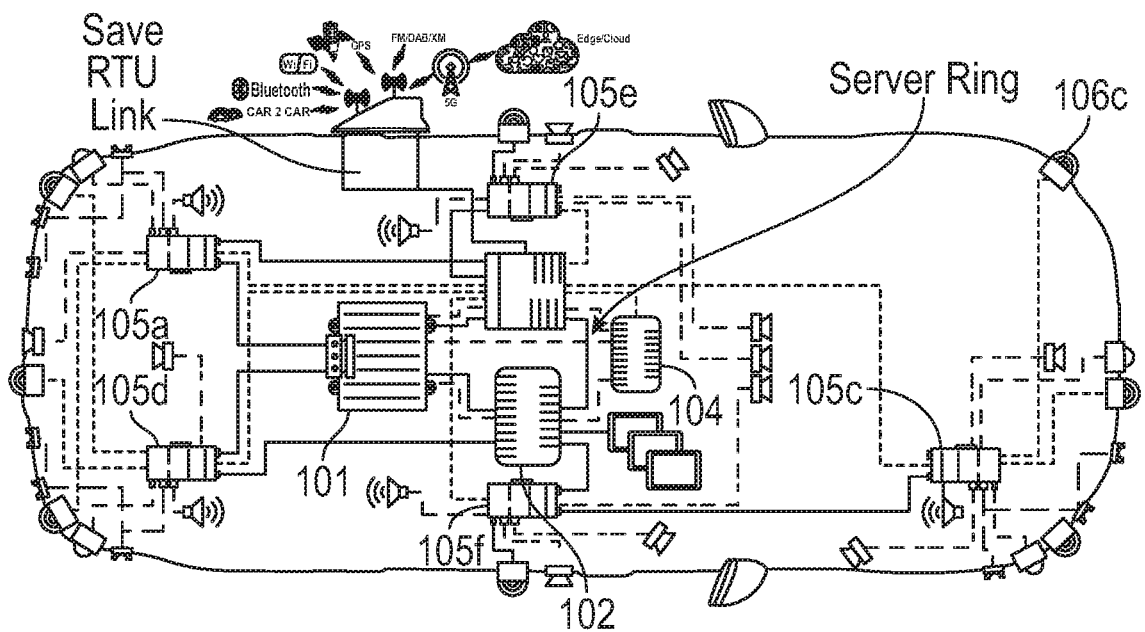
FIG. 3F illustrates fail-safe operation of the vehicle with six PDCs after failure of the PDC, according to some embodiments.

FIG. 3E illustrates fail-safe operation of the vehicle with six PDCs prior to failure of a PDC, and FIG. 3F illustrates fail-safe operation of the vehicle with six PDCs after failure of a PDC, according to some embodiments. Although the sensors coupled to PDC 105b are no longer available (e.g., due to a lost data link, power or both), the E/EA compensates for the complete loss of PDC 105b. For example, minimum radar coverage is provided in the impaired zone by radar 106c, which is coupled to PDC 105c.

Figure 4A:
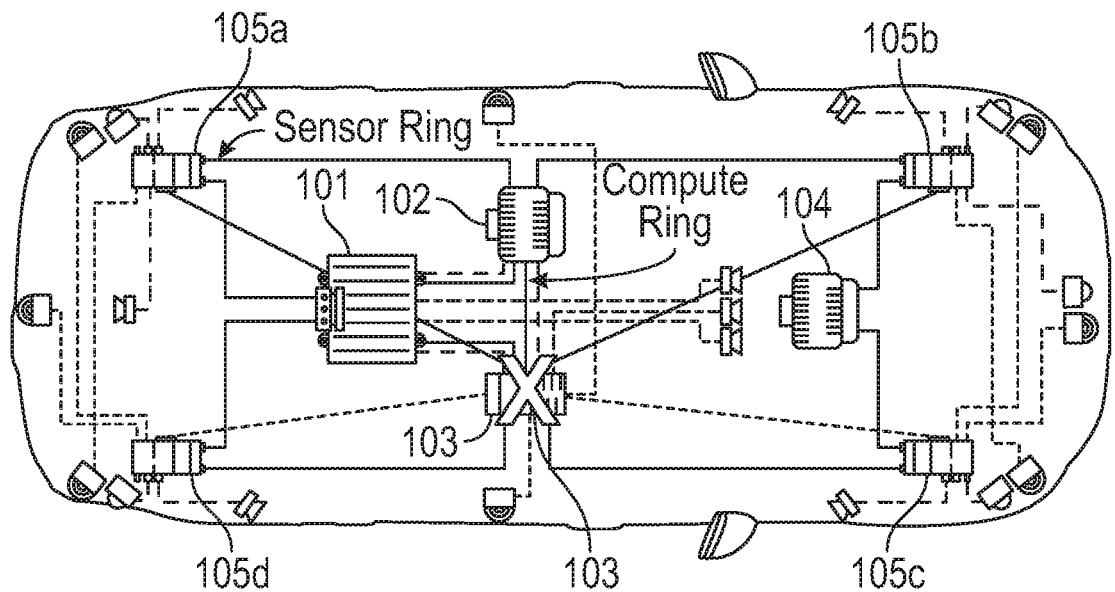
FIG. 4A illustrates fail-safe operation of the vehicle prior to failure of a secure connected gateway (SCGW), according to some embodiments.
Figure 4B:
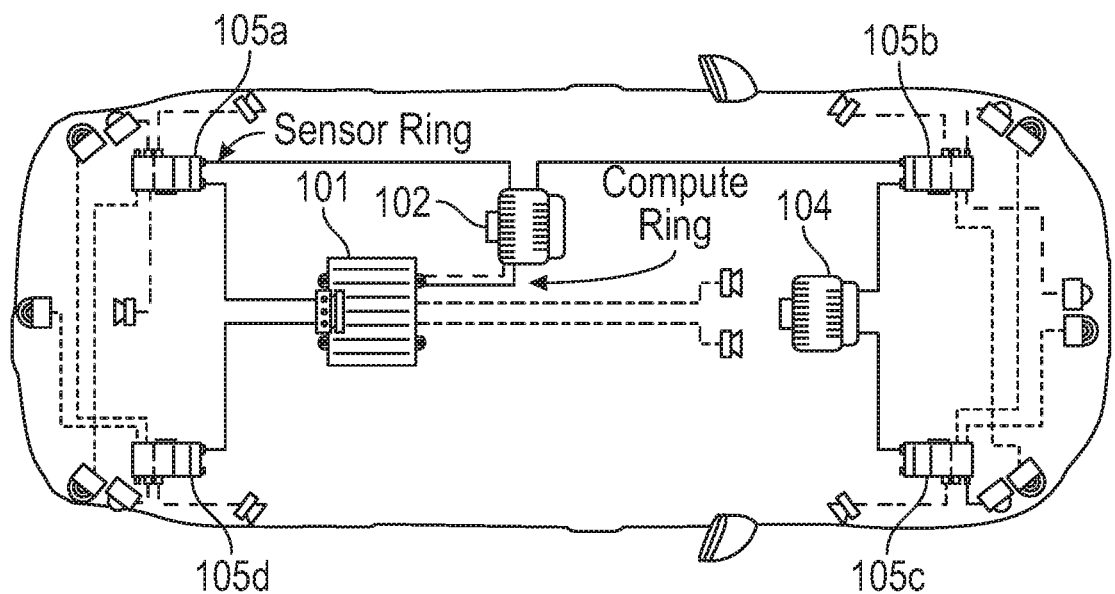
FIG. 4B illustrates fail-safe operation of the vehicle after failure of the SCGW, according to some embodiments.

FIG. 4A illustrates fail-safe operation of the vehicle prior to failure of a SCGW 103, and FIG. 4B illustrates fail-safe operation of the vehicle after failure of the SCGW 103, according to some embodiments. Note that due to failure of SCGW 103 (indicated by the large "X"), radars 106b, 106d, and camera 108e are disabled (e.g., due to a lost data link, power or both). Although camera 108e is disabled, cameras 108d, 108f are still operational to cover the front zone of the vehicle. Although radars 106b, 106d are disabled, cameras 108a, 108b, 108c and 108e are still operational to cover the right side and left side zones due to their locations on the vehicle and camera pointing directions.

In some embodiments, camera sensors 108a, 108b, 108c, and 108e can have their respective fields of view adjusted (e.g., widened) by their respective PDCs to further compensate for the loss of radars 106b, 106f. The computing platforms 101, 102, and 104 still receive sensor data from PDCs 105a-105c, allowing the critical vehicle driving systems to still function. All CAN-FD connections from SCGW 103 to PDCs 105a-105d are disabled but are replaced with HDBaseT data links.

Figure 4C:
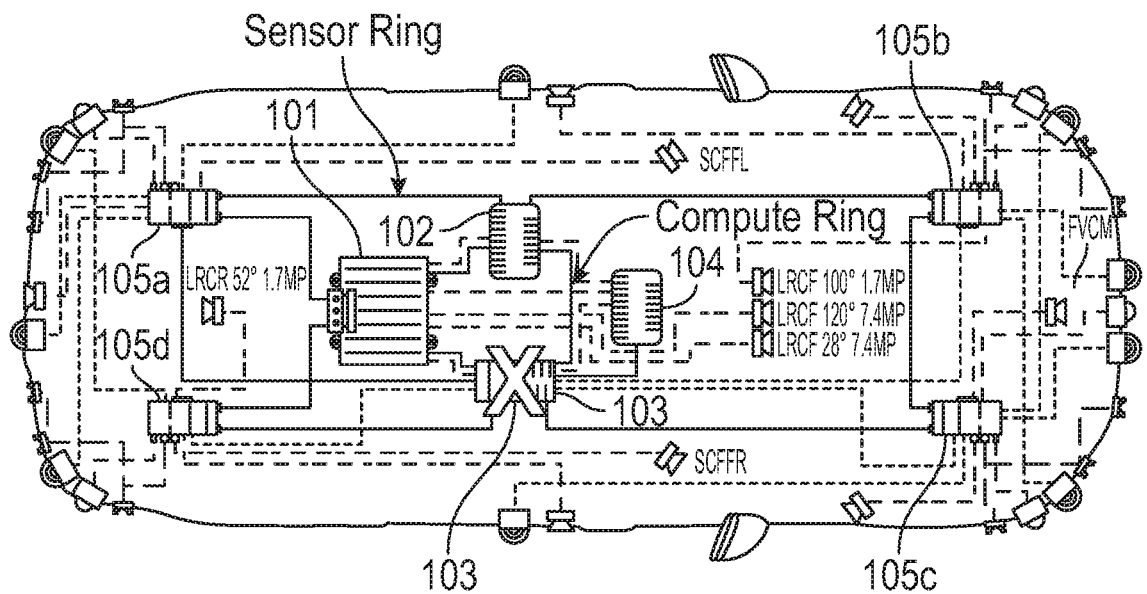
FIG. 4C illustrates fail-safe operation of the vehicle prior to failure of a SCGW, according to some embodiments.
Figure 4D:
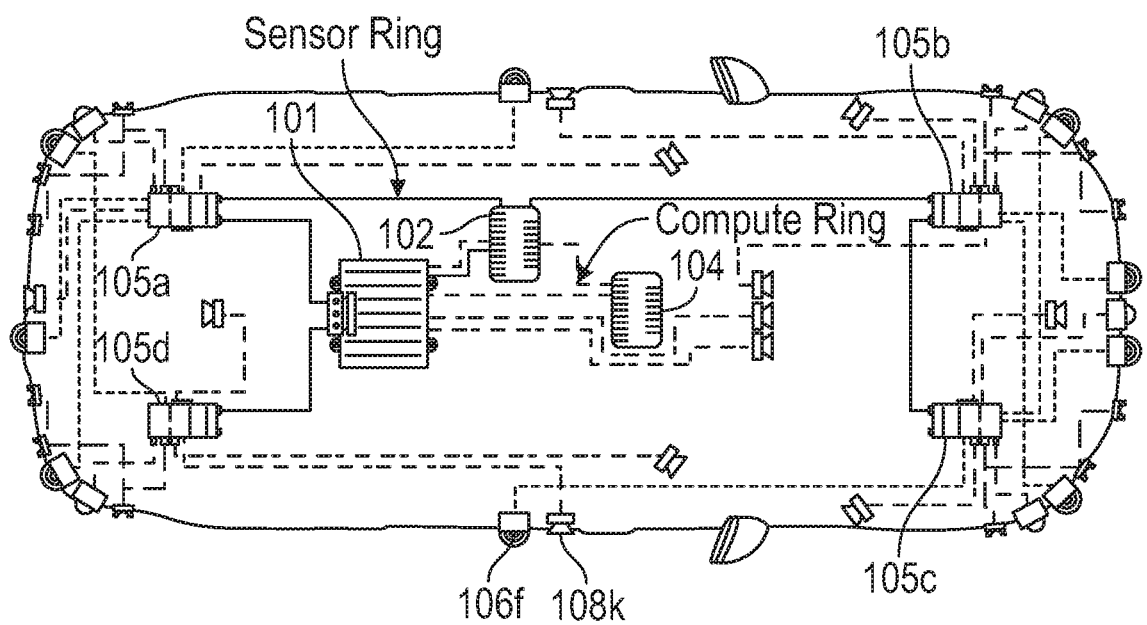
FIG. 4D illustrates fail-safe operation of the vehicle after failure of the SCGW, according to some embodiments.

FIG. 4C illustrates fail-safe operation of the vehicle prior to failure of SCGW 103, and FIG. 4D illustrates fail-safe operation of the vehicle after failure of SCGW 103, according to some embodiments. The E/EA will work without SCGW 103. Although CAN connections from SCGW 103 to PDCs 105a-105f are missing, CAN traffic is possible on HDBaseT. Because SCGW 103 is not coupled directly to any sensors, all the sensors are still available and can send their data on the sensor ring to the computing platforms and other PDCs.

Figure 4E:
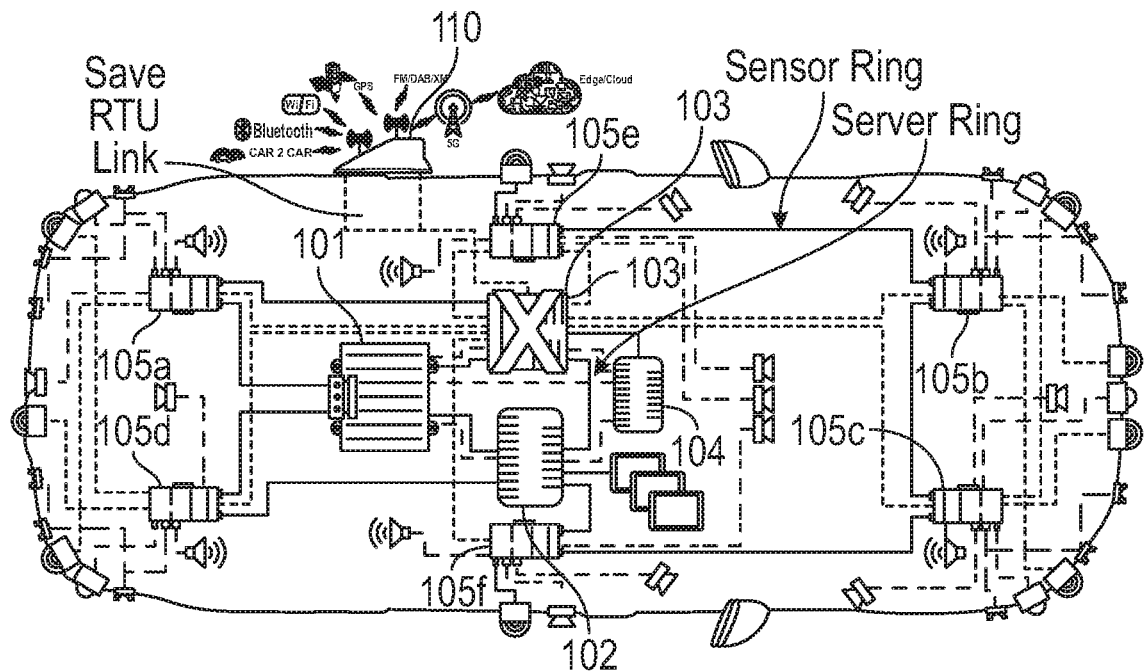
FIG. 4E illustrates fail-safe operation of the vehicle with six PDCs prior to failure of the PDC, according to some embodiments.
Figure 4F:
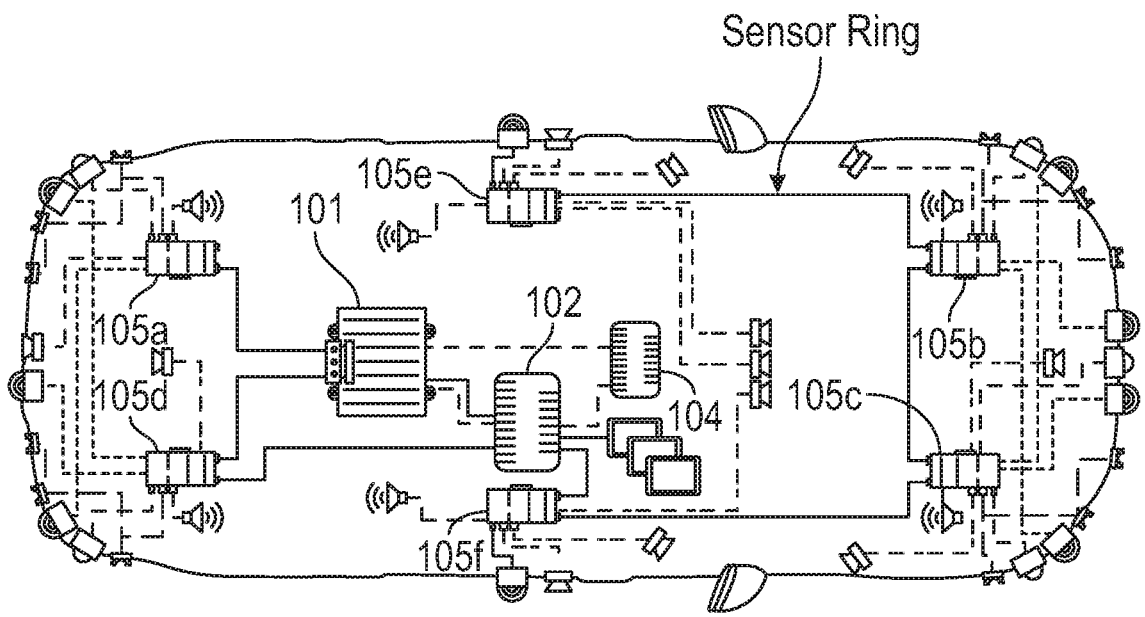
FIG. 4F illustrates fail-safe operation of the vehicle with six PDCs after failure of the PDC, according to some embodiments.

FIG. 4E illustrates fail-safe operation of the vehicle with six PDCs prior to failure of a computing platform (e.g., 103), and FIG. 4F illustrates fail-safe operation of the vehicle with six PDCs after failure of a computing platform, according to some embodiments. Although connection to RTRU 110 is lost with the failure of SCGW 103, PDCs 105a-105f, ADS 101, CSP 102, and PCS 104 can continue to communicate with each other without SCGW 103.

Figure 5A:
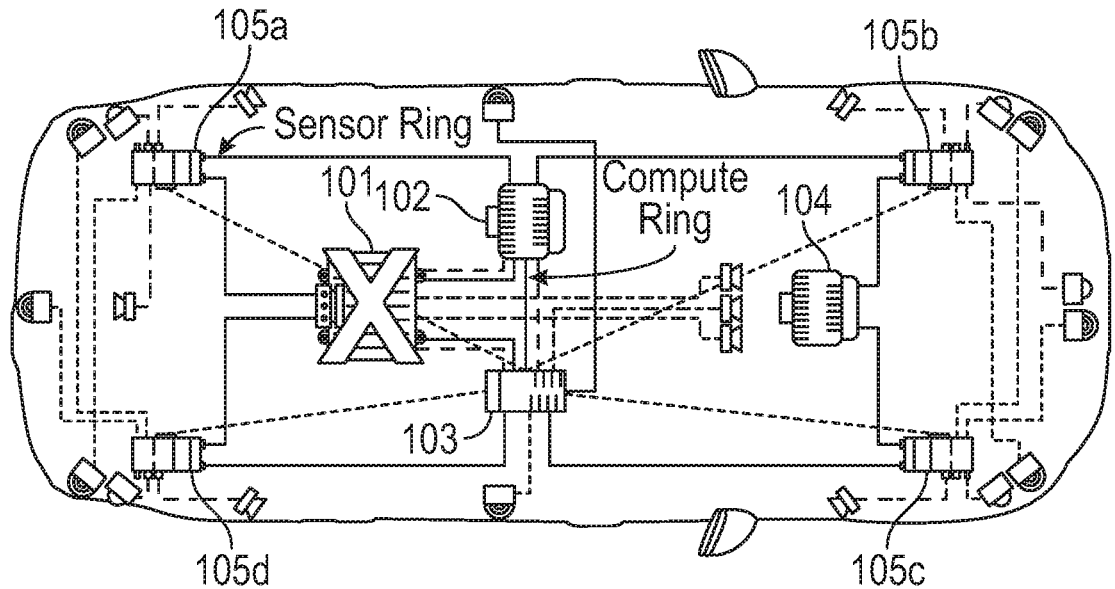
FIG. 5A illustrates fail-safe operation of the vehicle prior to failure of an automated driving server (ADS), according to some embodiments.
Figure 5B:
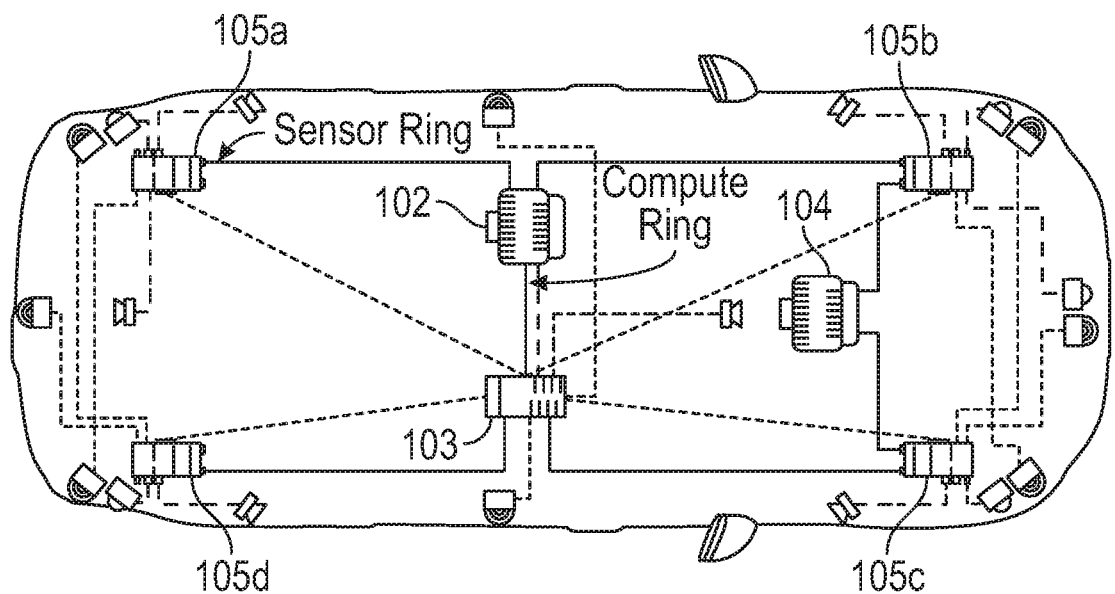
FIG. 5B illustrates fail-safe operation of the vehicle after failure of the ADS, according to some embodiments.

FIG. 5A illustrates fail-safe operation of the vehicle prior to failure of ADS 101, and FIG. 5B illustrates fail-safe operation of the vehicle after failure of ADS 101, according to some embodiments. Note that due to failure of ADS 101 (indicated by the large "X"), an emergency trajectory and drive control from CSP 102 are used in a "limp home" mode (e.g., by remote control or assistance of a tele-operator). Although front facing cameras 108d, 108e are disabled, camera 108 is still operational. All other sensors remain available to CSP 102.

Figure 5C:
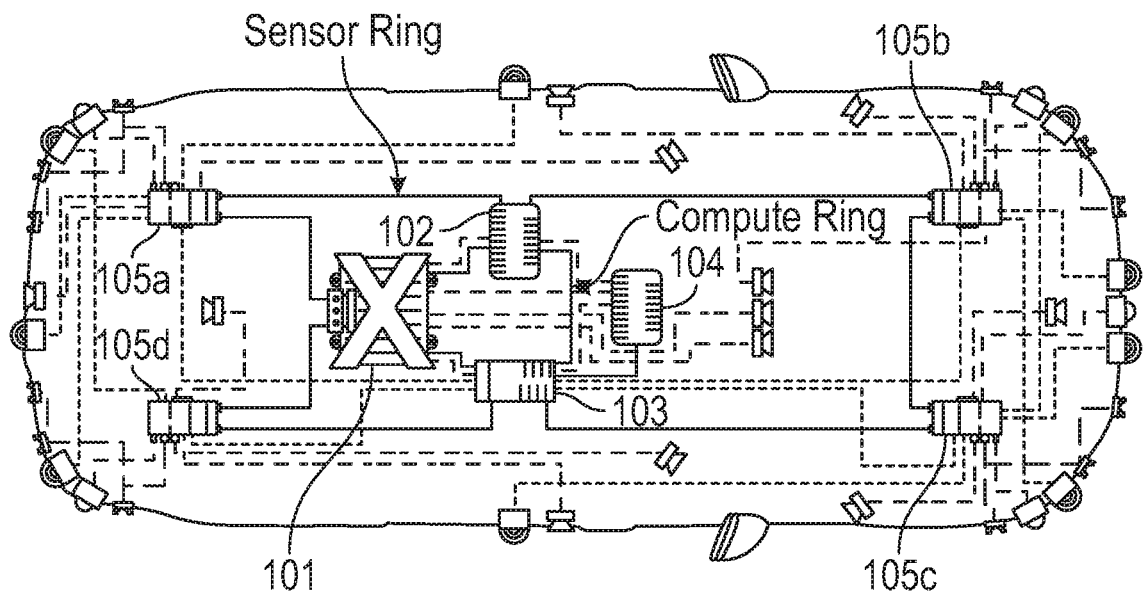
FIG. 5C illustrates fail-safe operation of the vehicle prior to failure of an ADS, according to some embodiments.
Figure 5D:
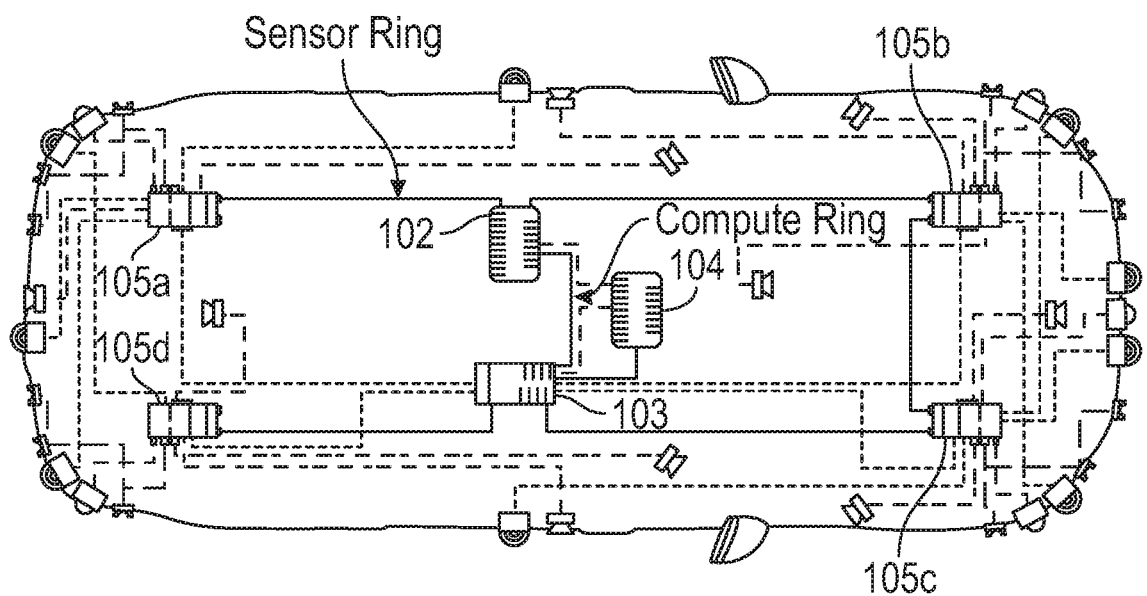
FIG. 5D illustrates fail-safe operation of the vehicle after failure of the ADS, according to some embodiments.

FIG. 5C illustrates fail-safe operation of the vehicle prior to failure of ADS 101, and FIG. 5D illustrates fail-safe operation of the vehicle after failure of ADS 101, according to some embodiments. The E/EA is able to compensate for the complete loss of ADS 101. An emergency trajectory and drive control from CSP 102 are used in a "limp home" mode. Only two front facing cameras are unavailable. All other sensors are still available to CSP 102. In some embodiments, CSP 102 can provide a last best trajectory that is stored and periodically updated.

Figure 5E:
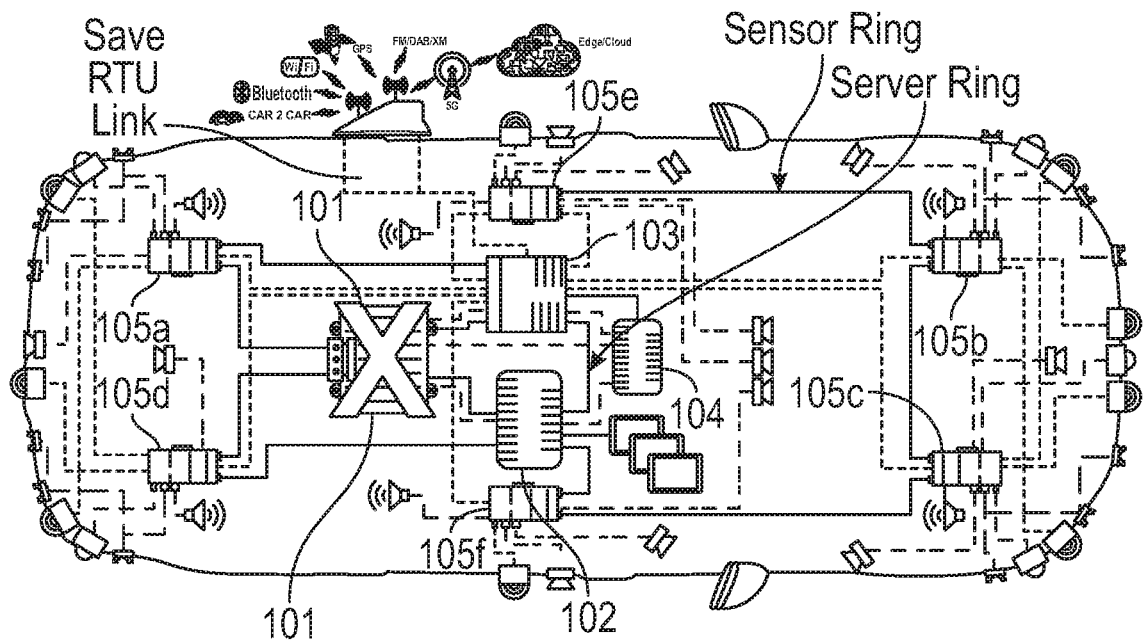
FIG. 5E illustrates fail-safe operation of the vehicle with six PDCs prior to failure of the PDC, according to some embodiments.
Figure 5F:
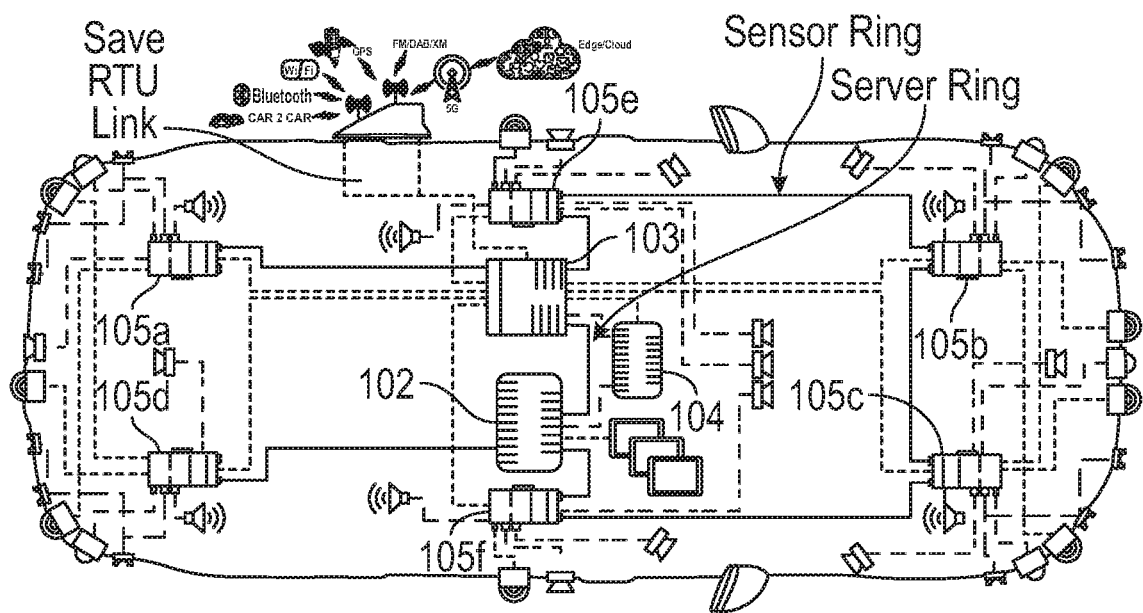
FIG. 5F illustrates fail-safe operation of the vehicle with six PDCs after failure of the PDC, according to some embodiments.

FIG. 5E illustrates fail-safe operation of the vehicle with six PDCs prior to failure of a computing platform (e.g., 101), and FIG. 5F illustrates fail-safe operation of the vehicle with six PDCs after failure of a computing platform, according to some embodiments. The E/EA is able to compensate for the complete loss of ADS 101. An emergency trajectory and drive control from CSP 102 are used in a "limp home" mode. Only two front facing cameras are unavailable. All other sensors are still available to CSP 102. RTU 110 also remains operational and can be used to communicate with a remote tele operator that can assist the vehicle in the "limp home" mode.

Figure 6A:
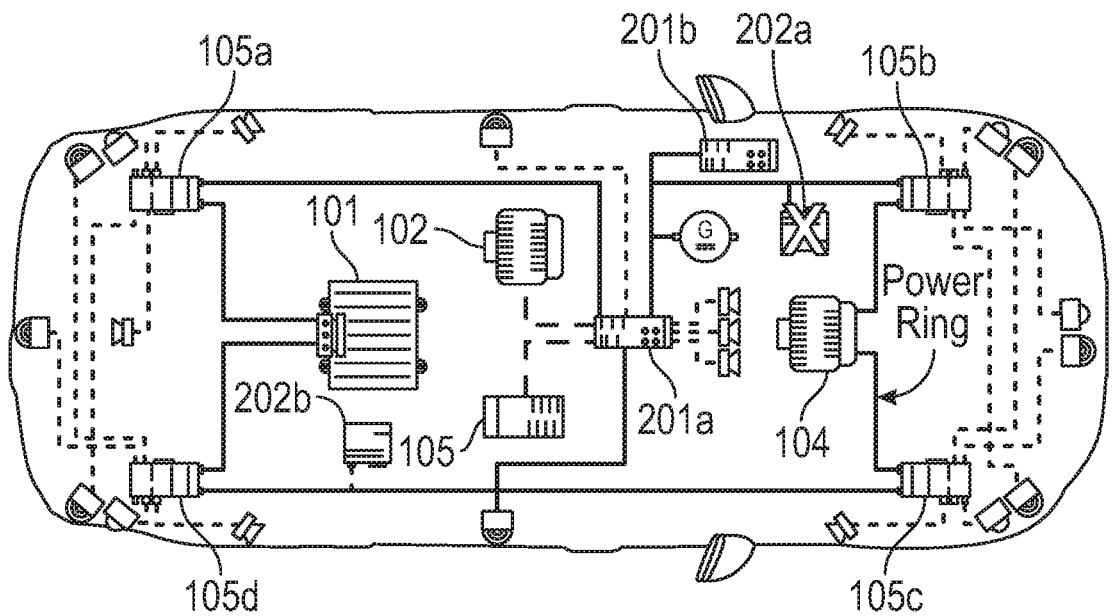
FIG. 6A illustrates fail-safe operation of the vehicle prior to failure of a power supply, according to some embodiments.
Figure 6B:
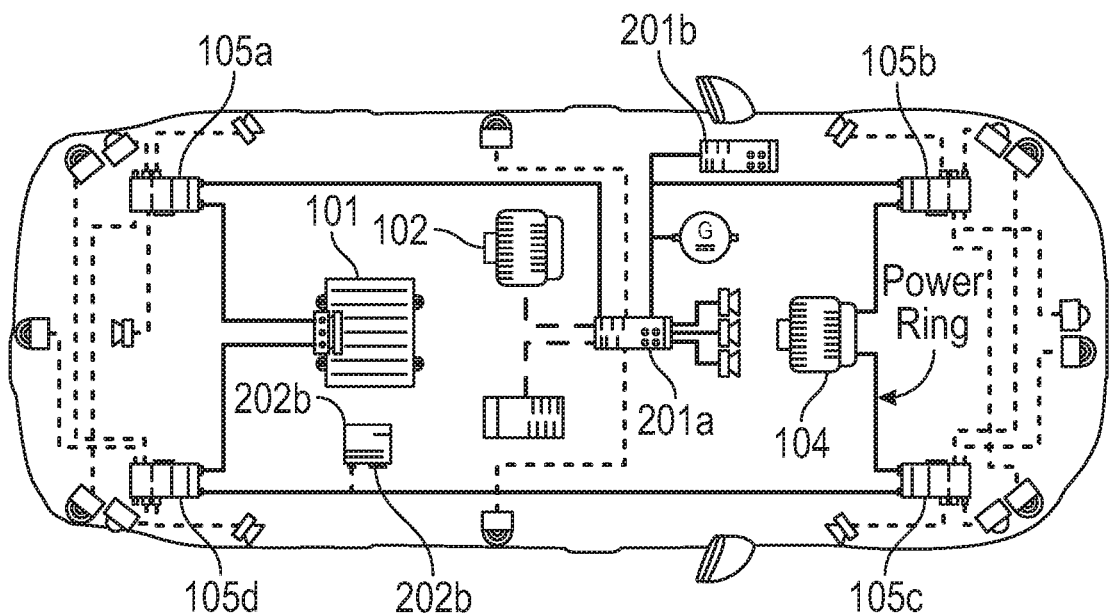
FIG. 6B illustrates fail-safe operation of the vehicle after failure of the power supply, according to some embodiments.

FIG. 6A illustrates fail-safe operation of the vehicle prior to failure of power supply 202a, and FIG. 6B illustrates fail-safe operation of the vehicle after failure of power supply 202a, according to some embodiments. Note that due to failure of power supply 202a (indicated by the large "X"), the redundant power ring topology supplies the PDCs 105a-105d and computing platforms 101-104 using power supply 202b. No sensor or computing platform is disabled because of the failure of power supply 202a.

Figure 6C:
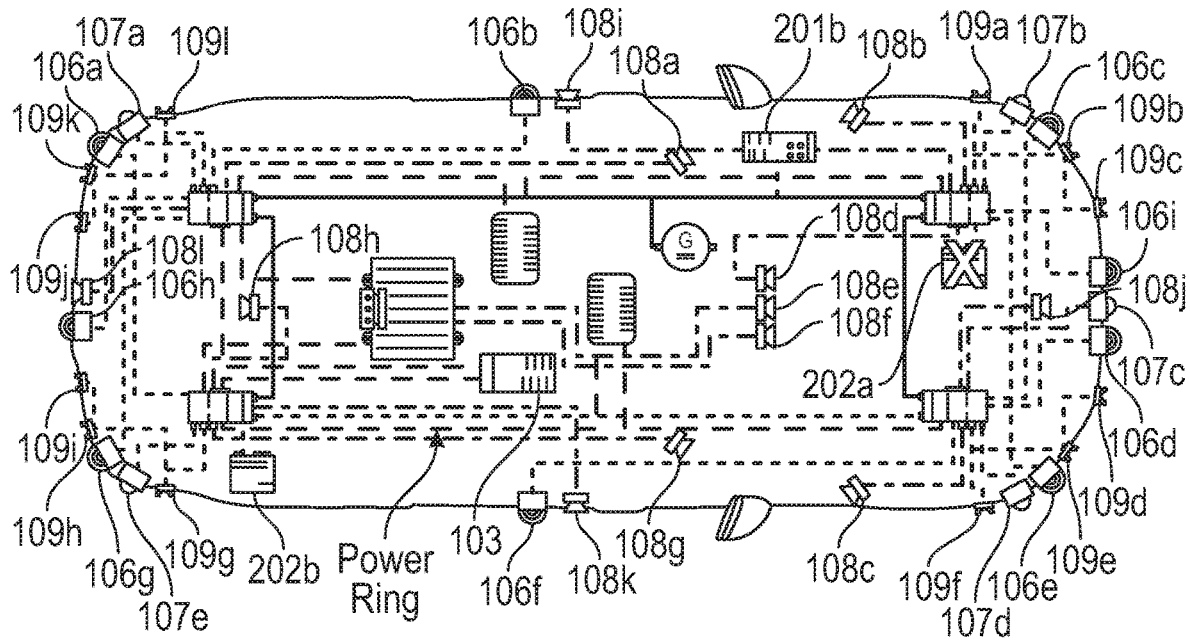
FIG. 6C illustrates fail-safe operation of the vehicle prior to failure of a power supply, according to some embodiments.
Figure 6D:
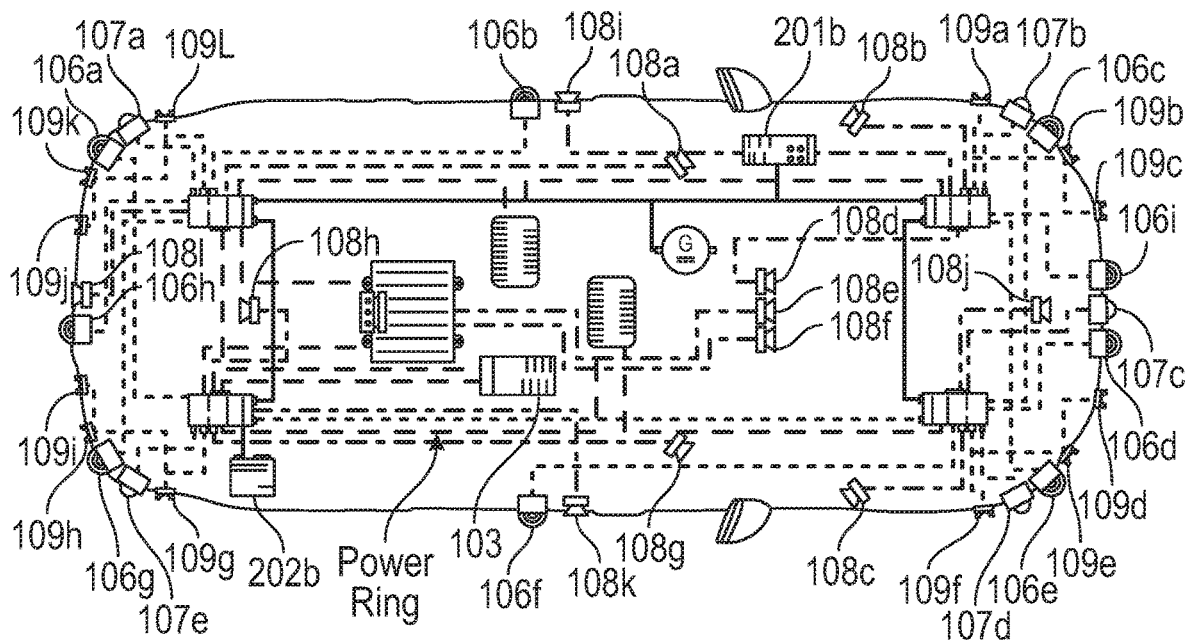
FIG. 6D illustrates fail-safe operation of the vehicle after failure of the power supply, according to some embodiments.

FIG. 6C illustrates fail-safe operation of the vehicle prior to failure of power supply 202a, and FIG. 6D illustrates fail-safe operation of the vehicle after failure of power supply 202a, according to some embodiments. The E/EA is able to compensate for the complete loss of power supply 202a. The ring topology supplies all PDCs from the second power supply 202b. All sensors and computing platforms are available after a power failure. In some embodiments, in the event of a power failure (e.g., short-circuit), one or more segments of the ring connected to power supply 202b may have to be reduced to a lower voltage.

Figure 6E:
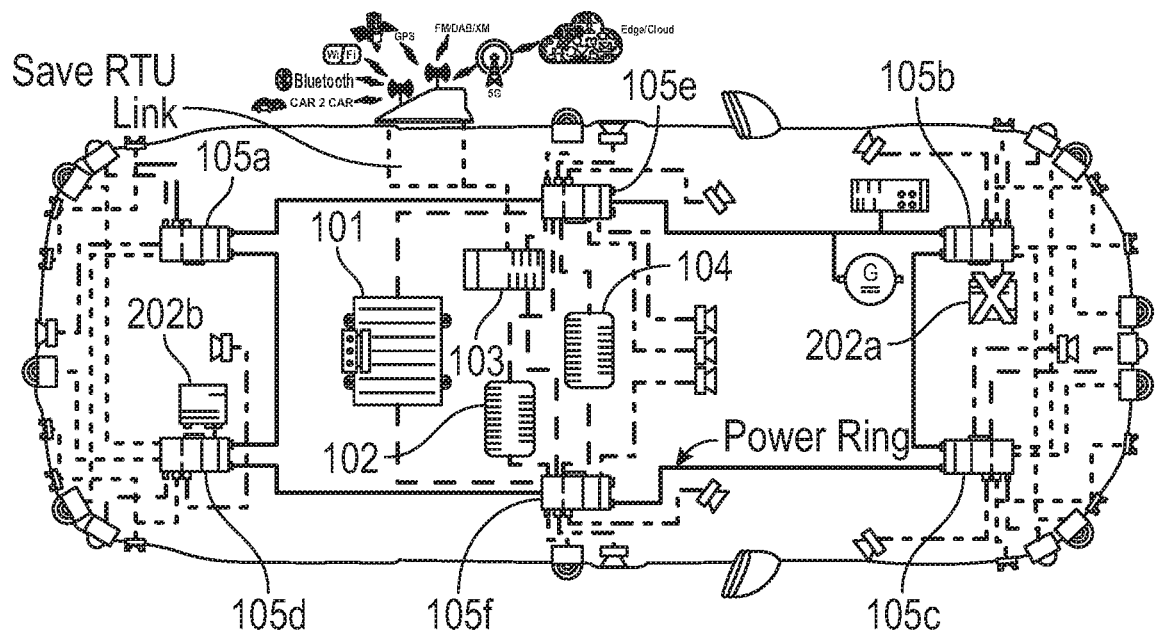
FIG. 6E illustrates fail-safe operation of the vehicle with six PDCs prior to failure of the PDC, according to some embodiments.
Figure 6F:
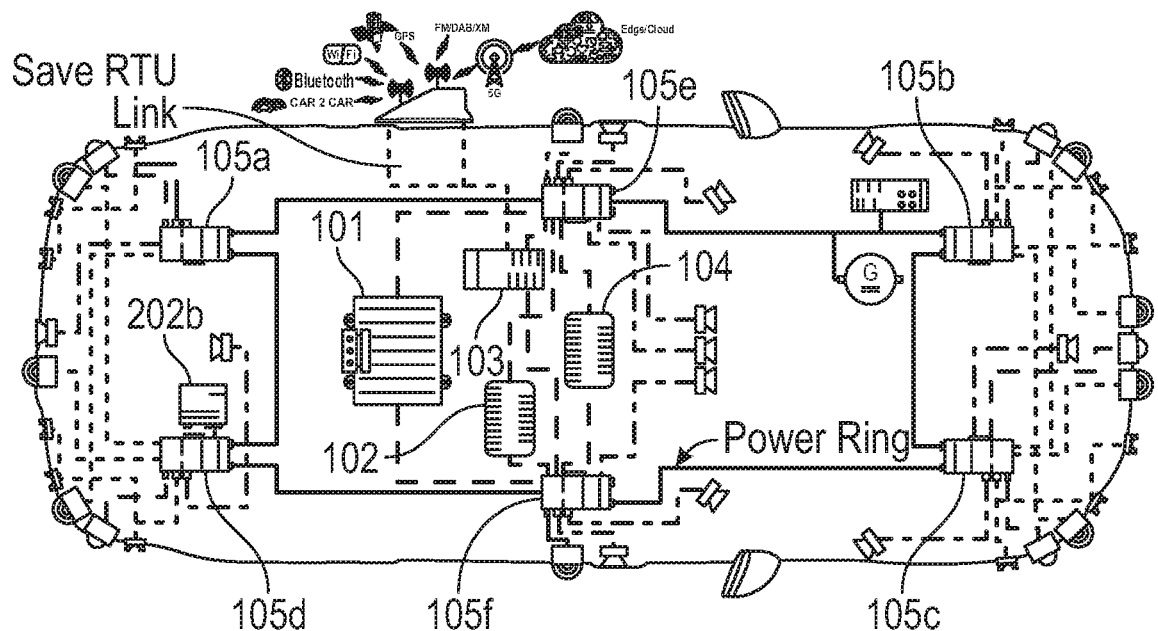
FIG. 6F illustrates fail-safe operation of the vehicle with six PDCs after failure of the PDC, according to some embodiments.

FIG. 6E illustrates fail-safe operation of the vehicle with six PDCs prior to failure of a power supply (e.g., 202a), and FIG. 6F illustrates fail-safe operation of the vehicle with six PDCs after failure of a power supply, according to some embodiments. The E/EA is able to compensate for the complete loss of power supply 202a. The ring topology supplies all PDCs from the second power supply 202b. All sensors and computing platforms are available after a power failure. In some embodiments, in the event of a power failure (e.g., short-circuit), one or more segments of the ring connected to power supply 202b may have to be reduced to a lower voltage.

PDC Architectures

Figure 7:
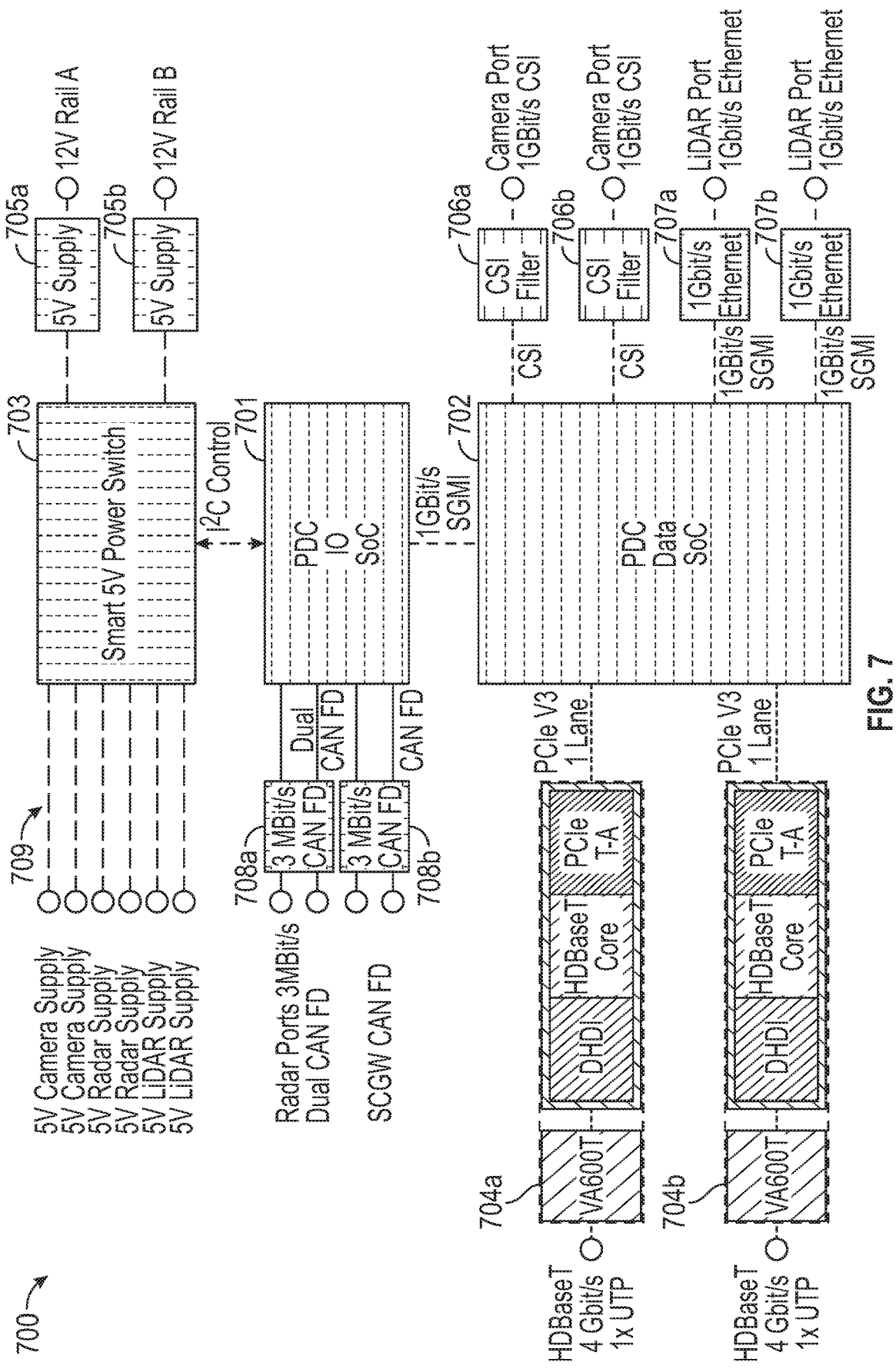
FIG. 7 is a conceptual block diagram of a PDC architecture, according to some embodiments.

FIG. 7 is a conceptual block diagram of PDC architecture 700, according to some embodiments. PDC architecture 700 includes three integrated circuit chips: PDC IO SoC 701, PDC Data SoC 702, and Smart 5V Power Switch (SPS) 703. SPS 703 includes power inputs 705a, 705b for coupling to 12V power rings, and redundant power outputs 709 for supplying a stable and filtered voltage (e.g., 5V) to cameras, radars, and LIDARs.

PDC IO SoC 701 includes radar ports 708a for communicating with radars and SCGW port 708b for communicating with SCGW 102. In the embodiment shown, radar ports 708a are each coupled to a 3 Mbit/s dual CAN-FD bus and SCGW port 708b is coupled to a 3 Mbit/s single CAN-FD bus.

PDC Data SoC 702 includes interfaces 704a, 704b configured to couple to HDBaseT 4 GBit/se 1× unshielded twisted pair (UTP) high-speed buses. In some embodiments, interfaces 704a, 704b are field programmable gate arrays (FPGAs) that are programmed with logic to implement various physical (PHY) layers, including but not limited to HDBaseT, digital hardware device interface (DHDI), Peripheral Component Interconnect Express (PCIe), and VA6000. VA6000 enables symmetric tunneling of multimedia content, with native-networking capabilities over a single UTP cable for up to 15 meters (50 feet). The VA6000 can be used as a point-to-point tunneling solution for several applications running simultaneously over a single cable, or in daisy-chain topology, and is suitable for use in automotive infotainment networks. PCIe is a high-speed serial computer expansion bus standard. HDBaseT is a standard for the transmission of ultra-high-definition video and audio, Ethernet, controls and Universal Serial Bus (USB) over a single, long-distance cable.

PDC Data SoC 702 also includes camera ports 706a, 706b and LIDAR ports 707a, 707b. Camera ports 706a, 706b are configured to couple to a camera data bus (e.g., 1 GBit/s CSI) and LIDAR ports 707a, 707b are configured to couple to Ethernet (e.g., 1 GBit/s Ethernet).

In operation, PDC IO SoC 701 sends control signals to SPS 703 over a first serial communication interface (e.g., inter-integrated circuit (I2C) control signals) and PDC Data SoC 702 sends control signals to PD IO SoC 701 over a second serial communication interface (e.g., 1 Gbit/s Serial Gigabit Media Independent (SGMI) interface).

Figure 8:
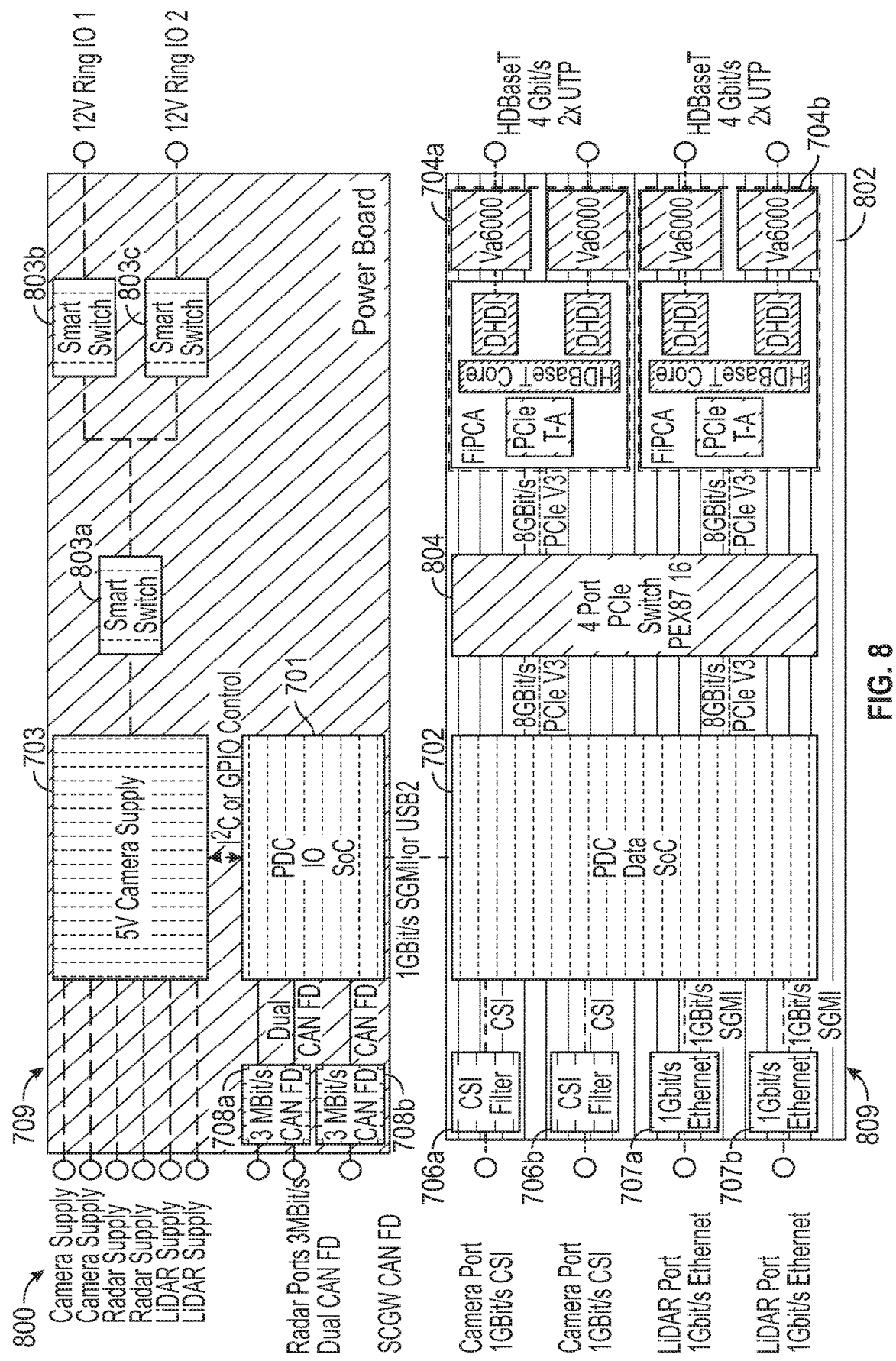
FIG. 8 is a conceptual block diagram of a PDC architecture including a power board and a data board, according to some embodiments.

FIG. 8 is a conceptual block diagram of a PDC architecture 800 including power board 801 and data board 802, according to some embodiments. PDC architecture 800 is similar to PDC architecture 700 but includes 4-port PCIe switch 804 and smart switches 803a-803c. PCIe switch 804 provides add-drop multiplexing (ADM) and connectivity to HDBaseT data FPGAs 704a, 704b. Smart switch 803a protects SPS 703, and smart switches 803b, 803c disconnect the power rings in the event of short-circuit or other power failure event in the ring.

Figure 9:
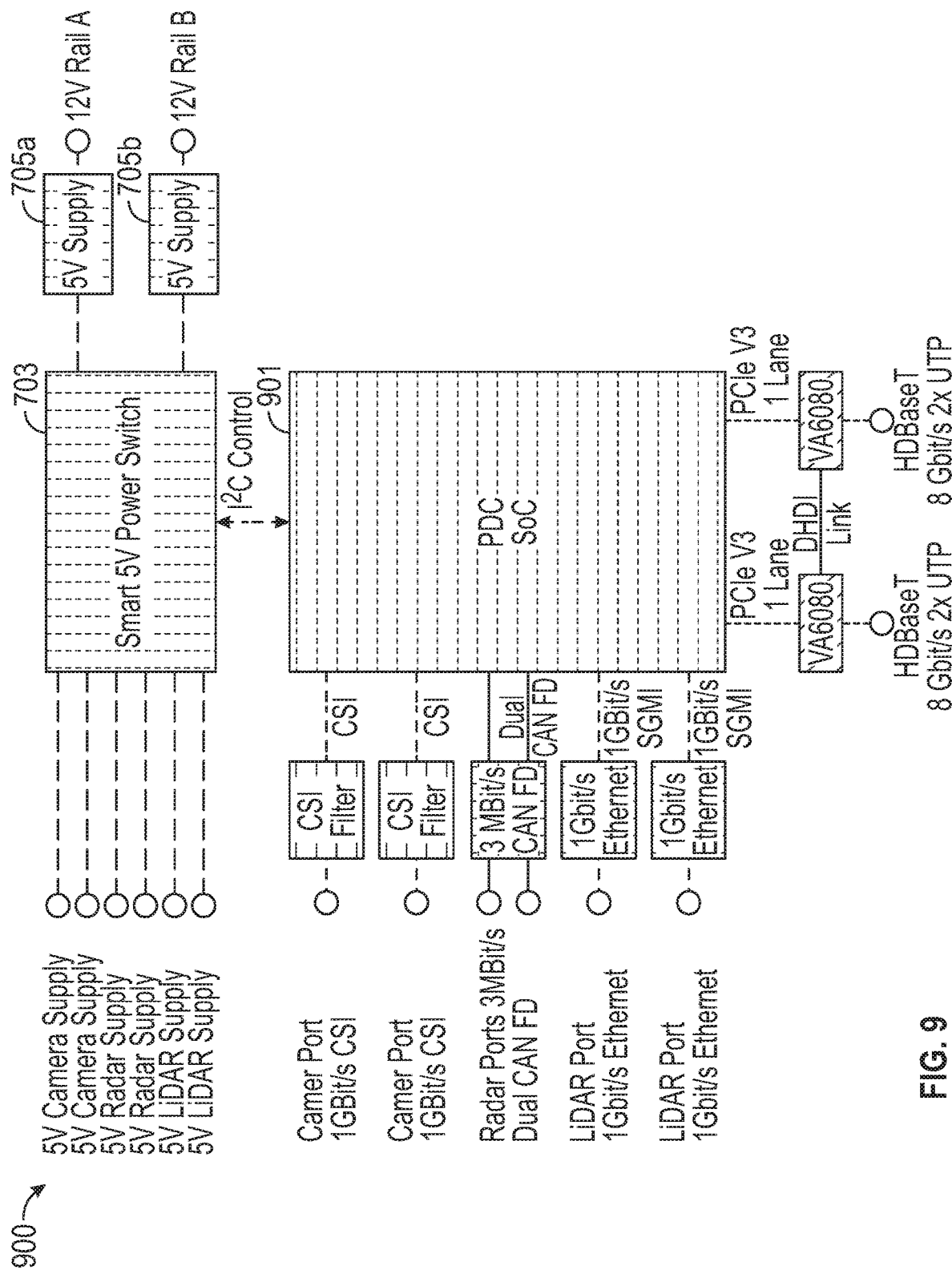
FIG. 9 is a conceptual block diagram of a PDC architecture without a PDC IO System-on-Chip (SoC), according to some embodiments.

FIG. 9 is a conceptual block diagram of a PDC architecture 900 without PDC IO SoC 701, according to some embodiments. PDC architecture 900 integrates the functions of PDC IO SoC 701 and the HDBaseT interfaces (FPGAs) into the PDC Data SoC 702, thus reducing the chipset from 3 chips to 2 chips and eliminating the need for separate data and power boards.

The PDC architectures described in reference to FIGS. 7-9 can be included in a single housing or multiple housings. For example, a first housing can include the data processing circuitry and software, and a second, physically separate housing, can include the power distribution circuitry.

FIG. 10 is a conceptual block diagram illustrating failsafe operation of a dual-ring, self-healing network topology when a PDC fails, according to some embodiments. In the embodiment shown, dual-ring, self-healing network 1000 includes computing platform 1001 (e.g., ADS 101), computing platform 1003 (e.g., CSP 102), PDC1 1002a (Zone A), PDC2 1002b (Zone B), and sensors 1004a-1004f. In this embodiment, there are two zones A and B. Sensors 1004a-1004c and PDC1 1002a serve Zone A, and sensors 1004d-1004f and PDC2 1002b serve Zone B. Data links 1005a-1005c comprise a first data ring and data links 1006a-1006c comprise a second data ring. Data flows clockwise through data links 1005a-1005c and counterclockwise through data links 1006a-1006f, according to the orientation of element as illustrated in FIG. 10.

Assuming that PDC1 1002a fails (indicated by the large "X"), circuitry in computing platform 1001 and PDC2 1002b (e.g., smart switching circuitry) will automatically initiate "self-heal" procedure that forms a new ring with data links 1005b, 1005c, 1006a, 1006b as shown at points 1007a, 1007b. Accordingly, if PDC1 1002a (or data links 1005a, 1006c) fails, dual-ring, self-healing network 1000 automatically forms a new ring so that computing platform 1001, computing platform 1003 and PDC2 1002b can continue to transfer data to each other over the new ring while the vehicle transitions into a safe-mode and slows it speed down. After the new ring is formed, in some embodiments, the functioning PDC2 1002b slows its frame rate down or commands sensors 1004d-1104f to slow down their frame rate to compensate for the data latency caused by increased distance between PDC2 1002b and computing node 1001.

In some embodiments, an automotive electrical and electronic system (e.g., 100a) includes a first PDC (e.g., 105a, 105b, 105c, 105d, 105e, 105f, 1002a, or 1002b), a first computing platform (e.g., 101, 102, 103, 104, 1001, or 1003), and a first data platform (e.g., 101, 102, 103, 104, 1001, 1003, 105a, 105b, 105c, 105d, 105e, 105f, 1002a, or 1002b). In some embodiments, the first PDC includes circuitry and/or one or more processors that are configured to process data (e.g., receive data, transmit data, and/or perform computations) and distribute power. In some embodiments, the first computing platform includes circuitry and/or one or more processors that primarily process data and perform computations for autonomous driving. In some embodiments, the first computing platform does not distribute power to other system components. In some embodiments, the first data platform is either a second PDC (e.g., 105a, 105b, 105c, 105d, 105e, or 105f) or a second computing platform (e.g., 101, 102, 103, or 104).

The first PDC is connected to the first computing platform via two different paths, including a first path (e.g., the portion of the sensor ring in FIG. 1B from PDC 105b clockwise to ADS 101) that includes the first data platform (e.g., 105c or SCGW 103) and a second path (e.g., the portion of the sensor ring in FIG. 1B from PDC 105b counterclockwise to ADS 101) that does not include the first data platform (e.g., 105c or SCGW 103).

In some embodiments, the first PDC is connected to the first computing platform without an intervening PDC or computing platform. In some embodiments, the first PDC is connected to the first computing platform via one or more other PDCs or computing platforms. In some embodiments, a path is a continuous communication link between two points (e.g., the first PDC and the first computing platform) in the system, where the communication link includes any system components (cabling, PDCs, computing platforms, etc.) between the two points.

The first PDC includes a first sensor interface (e.g., 701, 708a, 706a, 706b, 707a, 707b) configured to receive sensor data from one or more sensors (e.g., 107a, 108a, 108h, 106g) and a first data interface (e.g., 702, 704a, 704b) configured to transmit the sensor data. In some embodiments, the first data interface includes multiple output ports (e.g., 704a and 704b are connected to different paths of a network ring).

The first data interface of the first PDC is configured to transmit the sensor data to the first computing platform via the first path and the second path (e.g., the first data interface provides a connection to the communication links between the first PDC and the first computing platform). In some embodiments, the first data interface of the first PDC is configured to transmit sensor data to the first computing platform via the first path while concurrently transmitting sensor data to the first computing platform via the second path. In some embodiments, the first data interface of the first PDC is configured to transmit sensor data to the first computing platform via only one path at a time (e.g., the first PDC can transmit sensor data to the first computing platform via either path).

In some embodiments, the first PDC is configured to: transmit the sensor data to the first computing platform via the first path in accordance with a determination that the first path does not have a failure (e.g., the first path is operating at or above a threshold level); and transmit the sensor data to the first computing platform via the second path in accordance with a determination that the second path has a failure (e.g., the second path is degraded below a threshold level).

In some embodiments, the first path, the second path, the first PDC, and the first computing platform form a first ring network configured to transmit the sensor data (e.g., the sensor ring in 100a (FIG. 1A), 100b (FIG. 1B), 100c (FIG. 1C), 100d (FIG. 1D), 100f (FIG. 1F), or 100h (FIG. 1H)). For example, in the first ring network, a first end (e.g., the first PDC) of the first path is a second end of the second path, and a second end (e.g., the first computing platform) of the first path is the first end of the second path (e.g., the first path ends where the second path begins, and the second path ends where the first path begins; the first and second paths begin at a same first position and end at a same second position). In some embodiments, the beginning and ending of a path are interchangeable (e.g., the first end of the first path can be referred to as the beginning or the end of the first path, and the second end of the first path can be referred to as the end or the beginning of the first path, respectively).

In some embodiments, the system includes a second PDC that is included in either the first path or the second path (e.g., the second PDC is in the second path and not in the first path, or is in the first path and not the second path). In some embodiments, the system includes a first sensor (e.g., 106a-106h, 107a-107e, 108a-108f, or 1004a-1004f) and a second sensor. The first sensor is connected to the first PDC, and be second sensor is connected to the second PDC. The physical distance from the first sensor to the first PDC is less than the physical distance from the first sensor to the second PDC (e.g., the first sensor is in a first zone of a vehicle, the first PDC is in the first zone of the vehicle, and the second PDC is in a second zone of the vehicle). The physical distance from the second sensor to the first PDC is less than the physical distance from the second sensor to the second PDC (e.g., the second sensor is in the same zone as the first sensor; the second sensor is crisscrossed (coupled to a PDC in a different zone)). In some embodiments, the first sensor is connected to the first PDC without an intervening PDC or computing platform. In some embodiments, the second sensor is connected to the second PDC without an intervening PDC or computing platform.

In some embodiments, the first PDC is connected to the second PDC without an intervening PDC or computing platform (see, e.g., 105b and 105c connected by the redundancy bridge in FIG. 1F). In some embodiments, the first computing platform is configured to: receive power via the first PDC in accordance with a determination that the first PDC is functioning (e.g., the first PDC is operating at or above a threshold level; the first PDC is not in a failed state); and receive power via the second PDC in accordance with a determination that the first PDC is not functioning (e.g., the first PDC is not operating or is operating below a threshold level; the first PDC is in a failed state). In some embodiments, the system is configured to: provide power to the first computing platform via the first PDC in accordance with a determination that the first PDC is functioning; and provide power to the first computing platform via the second PDC in accordance with a determination that the first PDC is not functioning.

In some embodiments, the system includes a second computing platform and a third computing platform, and the system is configured such that the first computing platform is connected to the second computing platform via a third path (e.g., the portion of the compute ring in FIG. 1B from 102 counterclockwise to 103) that includes the third computing platform (e.g., 101), and the first computing platform is connected to the second computing platform via a fourth path (e.g., the portion of the compute ring in FIG. 1B from 102 clockwise to 103), different from the third path, that does not include the third computing platform (e.g., 101). In some embodiments, the second computing platform is the first data platform.

In some embodiments, the third path, the fourth path, the first computing platform, the second computing platform, and the third computing platform form a second ring network (e.g., the compute ring in FIG. 1B or the server ring in FIG. 1G). In some embodiments, the third path does not include the first PDC and the fourth path does not include the first PDC (e.g., the server ring does not include a PDC).

In some embodiments, the system includes a first power supply ring (e.g., the power ring in FIGS. 2A-2E), which includes the first PDC, and a first power source (e.g., 201a, 201b, 202a, or 202b) connected to the first power supply ring. The first computing device is coupled to the first power supply ring. In some embodiments, the first power source is tapped into the power supply ring (e.g., 202a in FIG. 2A) or is connected to the first PDC (e.g., 202a in FIG. 2B). In some embodiments, the first computing device is tapped into the power supply ring (e.g., to one of the elements in the power supply ring, such as 102 in FIG. 2A or 104 in FIG. 2B) or is part of the power supply ring (such as 104 in FIG. 2A)).

In some embodiments, the system includes a second power source coupled to the first power supply ring. In some embodiments, the first PDC is configured to: in accordance with a determination that the first power source is functioning (e.g., the first power source is operating at or above a threshold level; the first power source is not in a failed state), receive power from the first power source; and in accordance with a determination that the first power source is not functioning (e.g., the first power source is not operating or is operating below a threshold level; the first power source is in a failed state), receive power from the second power source. In some embodiments, the first computing platform is configured to: in accordance with a determination that the first power source is functioning (e.g., the first power source is operating at or above a threshold level; the first power source is not in a failed state), receive power from the first power source (e.g., via the first PDC); and in accordance with a determination that the first power source is not functioning (e.g., the first power source is not operating or is operating below a threshold level; the first power source is in a failed state), receive power from the second power source (e.g., via a second PDC). In some embodiments, the system is configured to: in accordance with a determination that the first power source is functioning, provide power to the first computing platform from the first power source; and in accordance with a determination that the first power source is not functioning, provide power to the first computing platform from the second power source (e.g., via a second PDC).

PDC Processes

Figure 11:
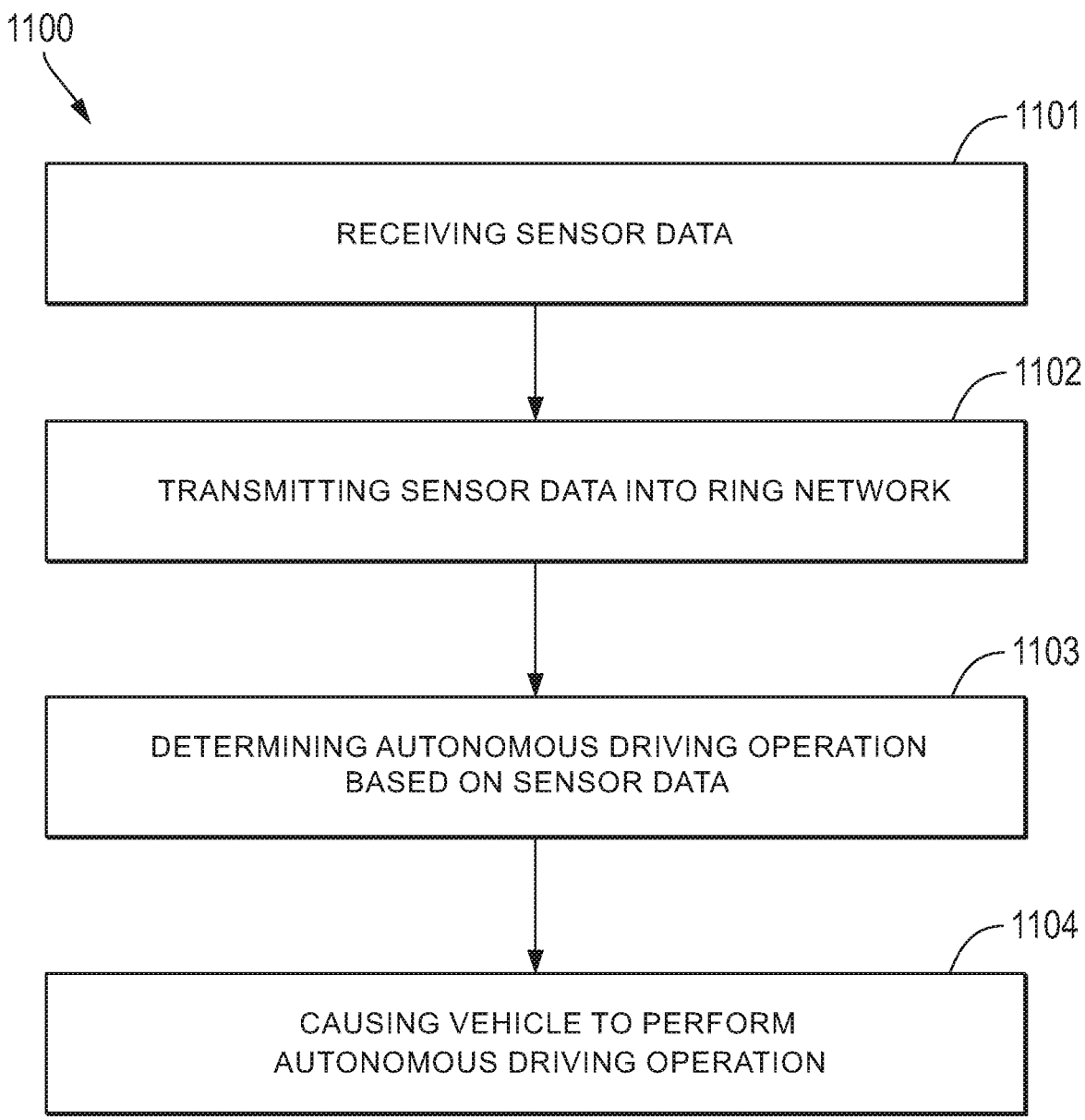
FIG. 11 is flow diagram illustrating a process performed by a PDC during normal operation, according to some embodiments.

FIG. 11 is flow diagram illustrating process 1100 performed by a PDC during normal operation, according to some embodiments. Process 1100 can be implemented by the PDC architectures described in reference to FIGS. 7-10. Process 1100 begins by receiving, through a sensor interface of the PDC, sensor data from one or more sensors (1101). In some embodiments, data input and output ports of the PDC are coupled to two or more redundant, self-healing data rings.

Process 1100 continues by transmitting, by output ports of the PDC, the sensor data into a ring network (e.g., a multi-ring, self-healing network) coupled to the PDC and to at least one computing platform (1102). In some embodiments, multiple PDCs are assigned to cover zones of a vehicle. Each PDC acts as a data concentrator and router for sensors in its zone. The PDC collects raw or pre-processed sensor data and transmits the data to the ring network. In some embodiments, the PDC compresses the raw sensor data before transmitting the data into the ring network or performs sensor fusion.

Process 1100 continues by determining, by the at least one computing platform, at least one autonomous driving operation based at least in part on the received sensor data (1103). In some embodiments, the computing platform is an automated driving server (e.g., ADS 101) that includes hardware and software for performing a number of autonomous driving tasks, including but not limited to: route planning, trajectory planning and validation, perception processing, decision logic, implementing control laws, localization, intersection handling, behavioral planning, lateral/longitudinal control, computing a real world/environment model, and sensor data fusion.

Process 1100 continues by causing, by the at least one computing platform, the vehicle to perform the at least one autonomous driving operation (1104). For example, the ADS 101 can generate a route to a destination or compute a maneuver around an object detected on an object map.

Figure 12:
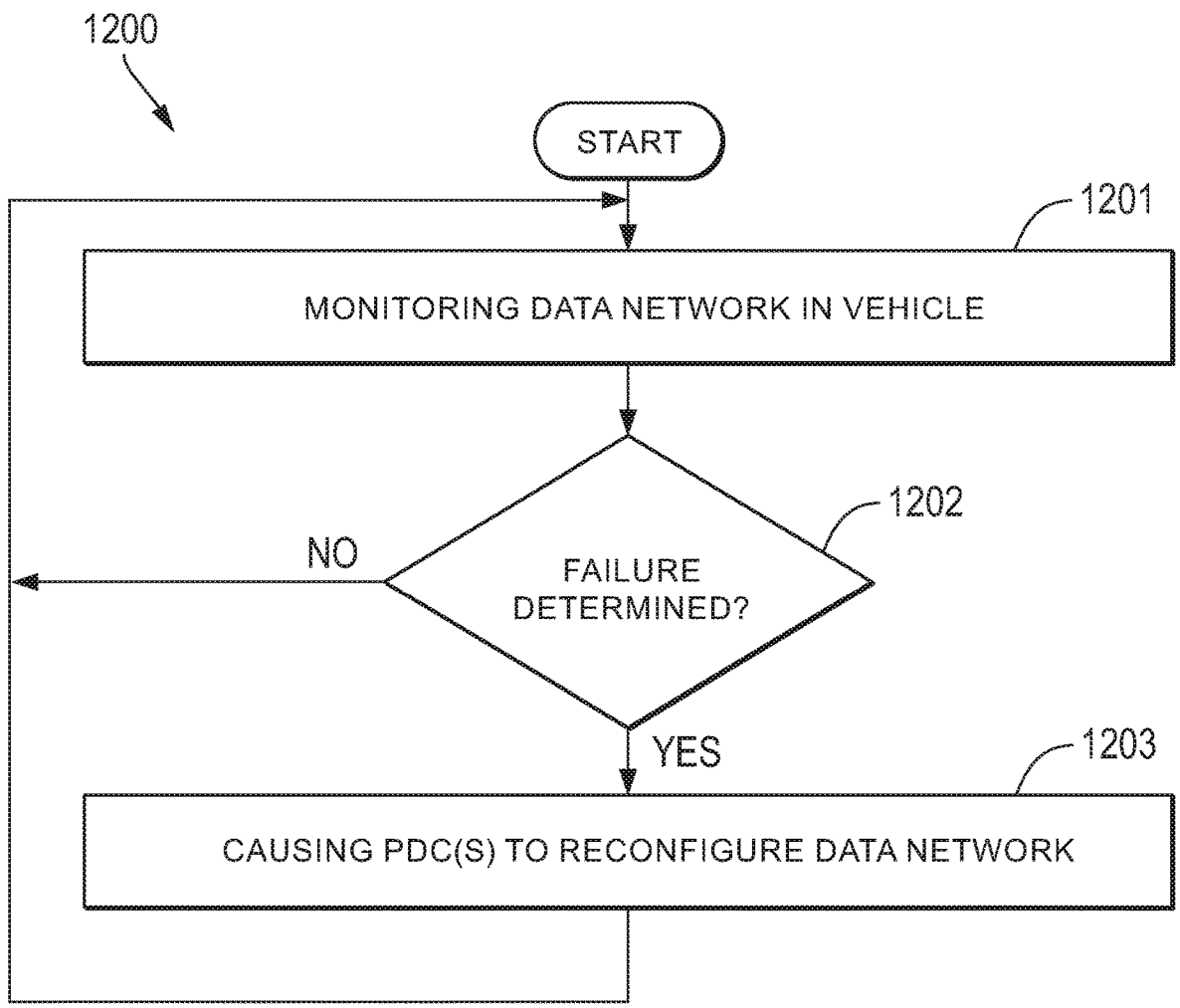
FIG. 12 is flow diagram illustrating a process for monitoring data network failure by a PDC, according to some embodiments.

FIG. 12 is flow diagram illustrating process 1200 performed by a PDC for monitoring a data network in a vehicle, according to some embodiments. Process 1200 can be implemented by the PDC architectures described in reference to FIGS. 7-10.

Process 1200 begins by monitoring a data network in a vehicle (1201). Process continues by determining if there is a failure in the data network (1201). In accordance with determining there is a failure in the data network, causing the PDC(s) to reconfigure the data network (1203), as described in reference to FIGS. 3A-3F, 4A-4F, 5A-5F and FIG. 10.

Figure 13:
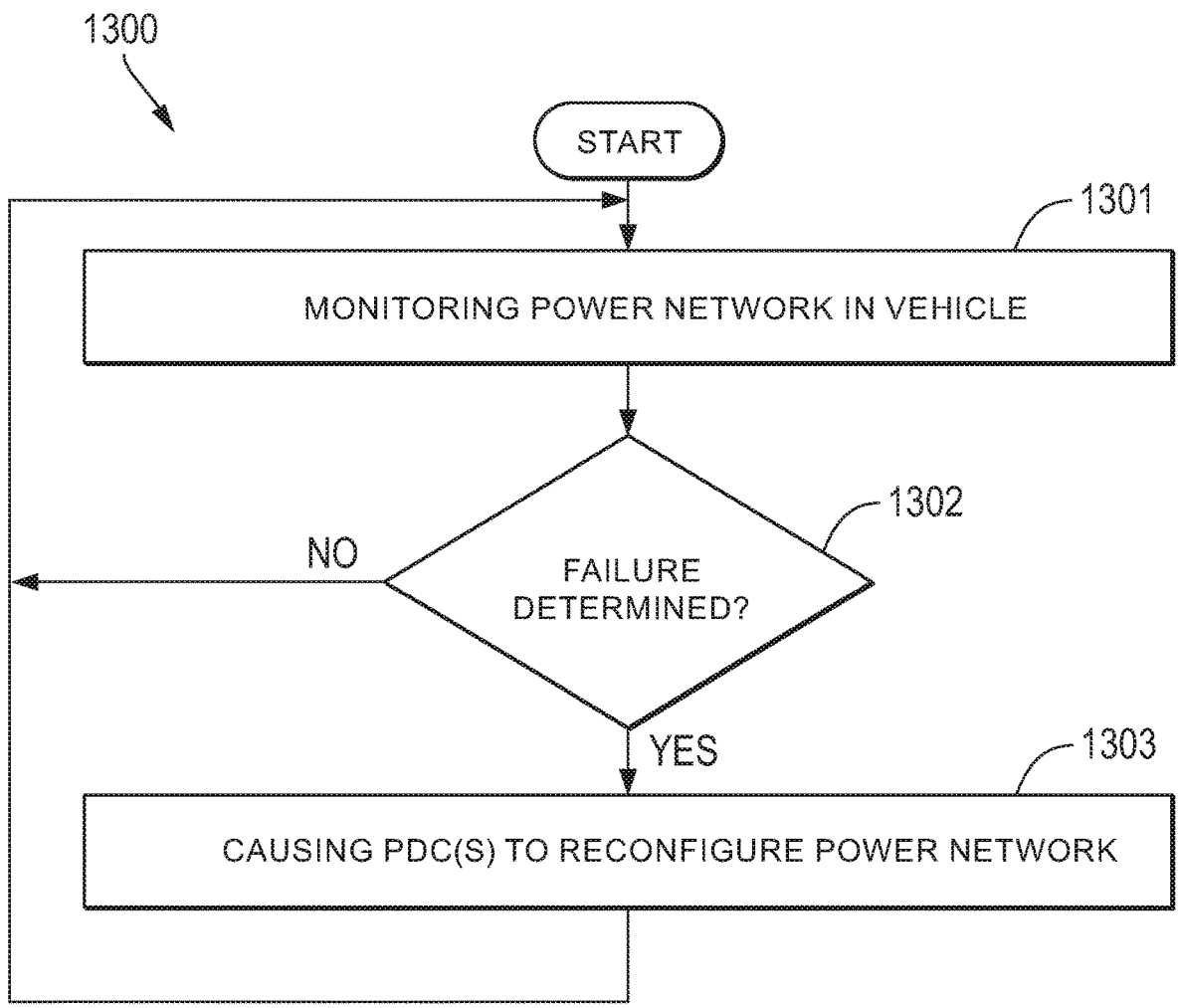
FIG. 13 is flow diagram illustrating a process for monitoring power failure by a PDC, according to some embodiments.

FIG. 13 is flow diagram illustrating a process performed by a PDC for monitoring a power network in a vehicle, according to some embodiments. Process 1300 can be implemented by the PDC architectures described in reference to FIGS. 7-10.

Process 1300 begins by monitoring a power network in a vehicle (1301). Process 1300 continues by determining if there is a failure in the power network (1302). In accordance with determining that there is a failure in the power network, causing the PDC(s) to reconfigure the power network (1303), as described in reference to FIGS. 6A-6F.

Embodiment Using Transparent Component Data Links

FIG. 14A illustrates an open car server alliance (OCSA) server system concept, according to some embodiments. OCSA server system concepts will help the automotive industry standardize the way software and hardware updates are tested and deployed in future vehicles.

Autonomous vehicles can be updated in the field to keep the vehicles up to date. In existing systems, hardware can only be updated if there is a new version of hardware that is compatible with the space allocated for the hardware and existing interfaces to the vehicle E/EA. The OCSA server system concept addresses this issue by using PDCs to abstract I/O functions from physical I/Os (e.g., I/O virtualization) to enable server updates. In some embodiments, the OCSA provides at least the following advantages: 1) the I/O configuration does not change with the update of server components; 2) new server hardware fits seamlessly in new vehicles and in legacy applications; and 3) updates can be done during vehicle production at any time; there is no need for model year synchronization.

Referring to FIG. 14A, existing hardware/software business models in the automotive industry require that software be developed only on a target system (e.g., a specific vehicle model and make) and tested only together with other applications. Under this model, any small change in software or hardware requires a new test run. Using OCSA concepts, software development is performed on a computer-based reference system where application software is independent of target hardware and can be developed on computer systems (e.g., a personal computer). Additionally, tests of application software can be performed in a reference environment independent from any other application. OCSA enables the sourcing of standardized computing power to vehicles. A device compliant with OCSA fits in various vehicles and can be changed at any time. Software can be reused without changes and with no dedicated homologation. OCSA reduces the engineering required to deploy the latest compute devices in vehicles.

In some embodiments, the OCSA server platform: 1) abstracts software from hardware to maximize reuse and portability of the software (future sensitive and reverse compatible); 2) reduces complexity by developing software and hardware in parallel; 3) configures, provisions, and updates software using a cloud-based OTA platform with built-in security mechanisms; and 4) scales software and hardware with a flexible server architecture where the number and size of compute blocks vary.

For example, an OCSA hardware platform can be a scalable automotive server hardware platform that allows the number and size of SoCs to be scaled. High-speed data links (e.g., PCI-E or Thunderbolt 3) can be used to connect SoCs. HDBaseT and Ethernet links can be used for inputs (e.g., cameras) and outputs (e.g., displays). And 8-10 GBit/s HDBaseT or Ethernet can be used to connect to the ADS. Additionally, the number of 1 GBit/s and 100 Mbit/sec Ethernet ports are scalable.

The OCSA software platform includes a hypervisor with service OS (Domain 0) that abstracts hardware for other virtual machines, a flexible HMI manager in Domain 1 that handles a flexible number of screens and tiles, an optional Android® partition which can process apps and Google® services, microservices platform that runs containerized software and also deploys during runtime, a Greengrass™ Core to run Amazon® Web Services (AWS) λ functions for IoT connection, a fixed number of virtual machines (VMs) with microservice VM and Greengrass core and a flexible number of VMs that can be deployed before runtime.

Figure 14B:
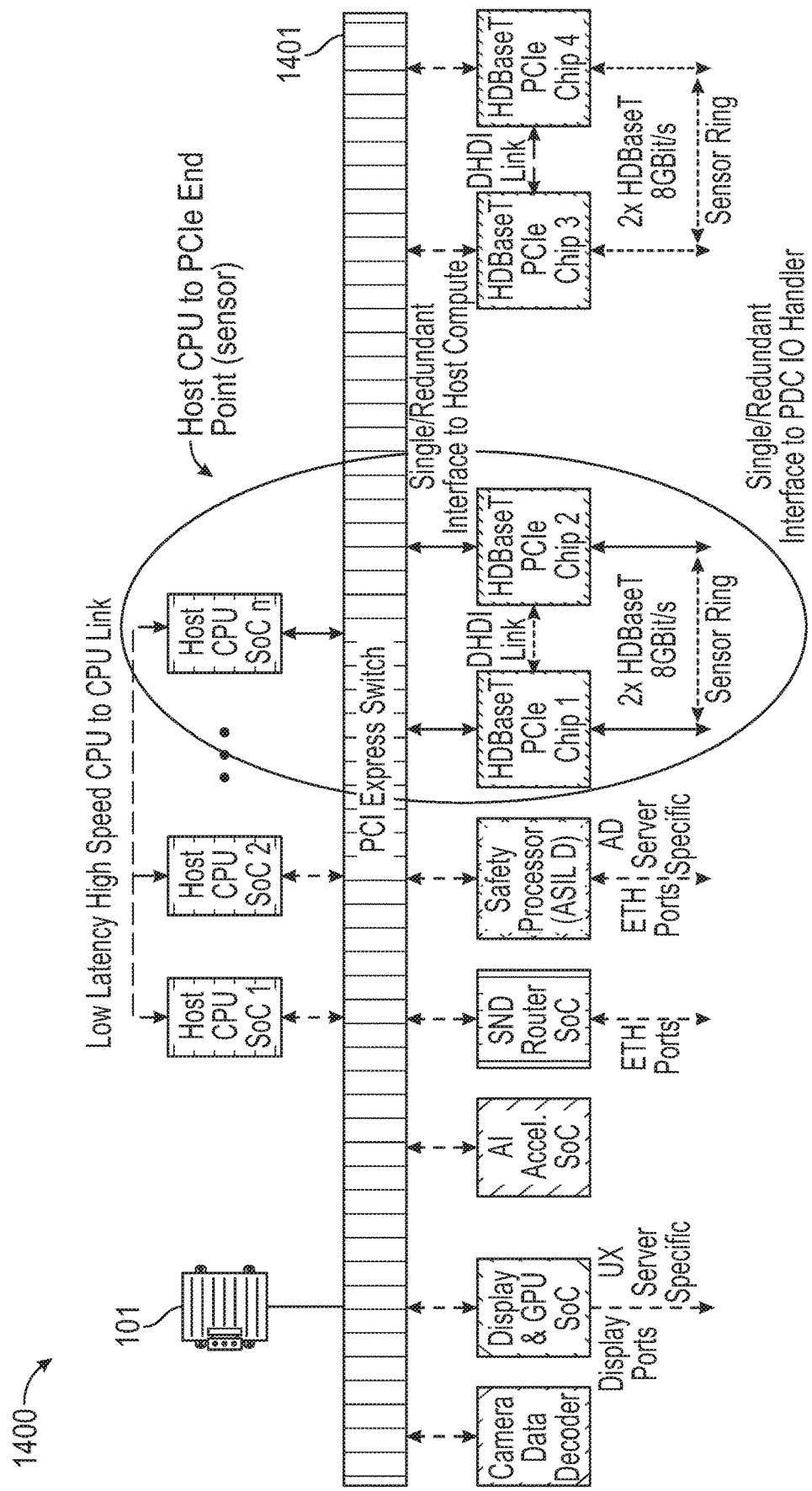
FIG. 14B is a conceptual block diagram illustrating OCSA server system hardware (HW), according to some embodiments.

FIG. 14B is a conceptual block diagram illustrating OCSA server system hardware, according to some embodiments. In this embodiment, vehicle component data links are realized as a transparent PCIe Interface 1400 (e.g., a PCIe switch) that uses HDBaseT or any other PCIe physical connections. Each vehicle component has a data endpoint in the PDC SoC which the component is connected to.

In the embodiment shown, the hardware components include a camera data decoder, display and graphics processing unit (GPU) SoC, AI accelerator SoC, SDN router SoC, safety processor (ASIL D), HDBaseT PCIe chip 1, HDBaseT PCIe chip 2, HDBaseT chip 3 and HDBaseT PCIe chip 4. Also coupled to the PCIe interface 1400 is ADS 101, and host CPU SoC_1, Host CPU SoC_2 . . . Host CPU SoC_n. The host CPUs communicate with each other using a high-speed CPU to CPU link. The HDBaseT chips 1 and 2 and HDBaseT chips 3 and 4 provide a single/redundant interface to the host CPU SoCs and PDC IO handler for the sensor ring and server ring, respectively. The SDN router SoC takes care of all network connections and system health. Low latency HDBaseT direct PCIe links couple the PDCs to other service devices. Virtual drivers in the PDCs provide a uniform sensor view.

The SoC receives data from the component and may or may not perform data processing/transformation algorithms (e.g., compression of the data size, radar sensor compute algorithms, etc.). Each vehicle computing platform that requires the data from the component establishes a transparent link within the PCIe based component data link from the PDC SoC to the computing platform. The computing platform starts a driver for each transparent component data link and the component appears as a logical device to the computing platform. In this embodiment, PDCs operate as a component hub to the computing platform (e.g., similar to a docking station to a mobile device). The PDC SoC transfers the treated or untreated component data (e.g., sensor data) using PCIe mechanisms (e.g., I/O virtualization) to one or more physical locations to one or more vehicle computing platforms. The PDC SoCs host the logical devices for component data and allow access to the component data and also enable the control and the system diagnosis for the entire component using the logical sensor driver.

In some embodiments, the PDCs and computing platforms enable multiple component data links to multiple components to transfer the data from the components to multiple computing platforms. PCIe enables this feature by multicasting from one data source to multiple PCIe devices. The data does not need to be transferred several times using the same component data link. Rather, the data is duplicated at the component which is the first connection between the component and the computing platform, thus saving data bandwidth on the component data link. The data can be duplicated several times at different PDCs or computing platforms. But only one computing platform can perform the control of the component. All other computing platforms are able to receive the component data in an unchanged form.

The PDC can also host multiple component data drivers to transfer the data from one component to multiple computing platforms with different data treatment/transformation algorithms or using different routes within the component data link ring structure. PCIe enumeration is performed through the PCIe core subsystem that searches the bus, applies modifications if necessary based on the identifier (ID) of the end point device, and then loads a driver that has a matching ID in its discovery function. In some embodiments, bus-padding is used and PCIe bus numbers and memory segments are reserved for potential future devices with "hot plug" without disruption making the system highly scalable.

Figure 14C:
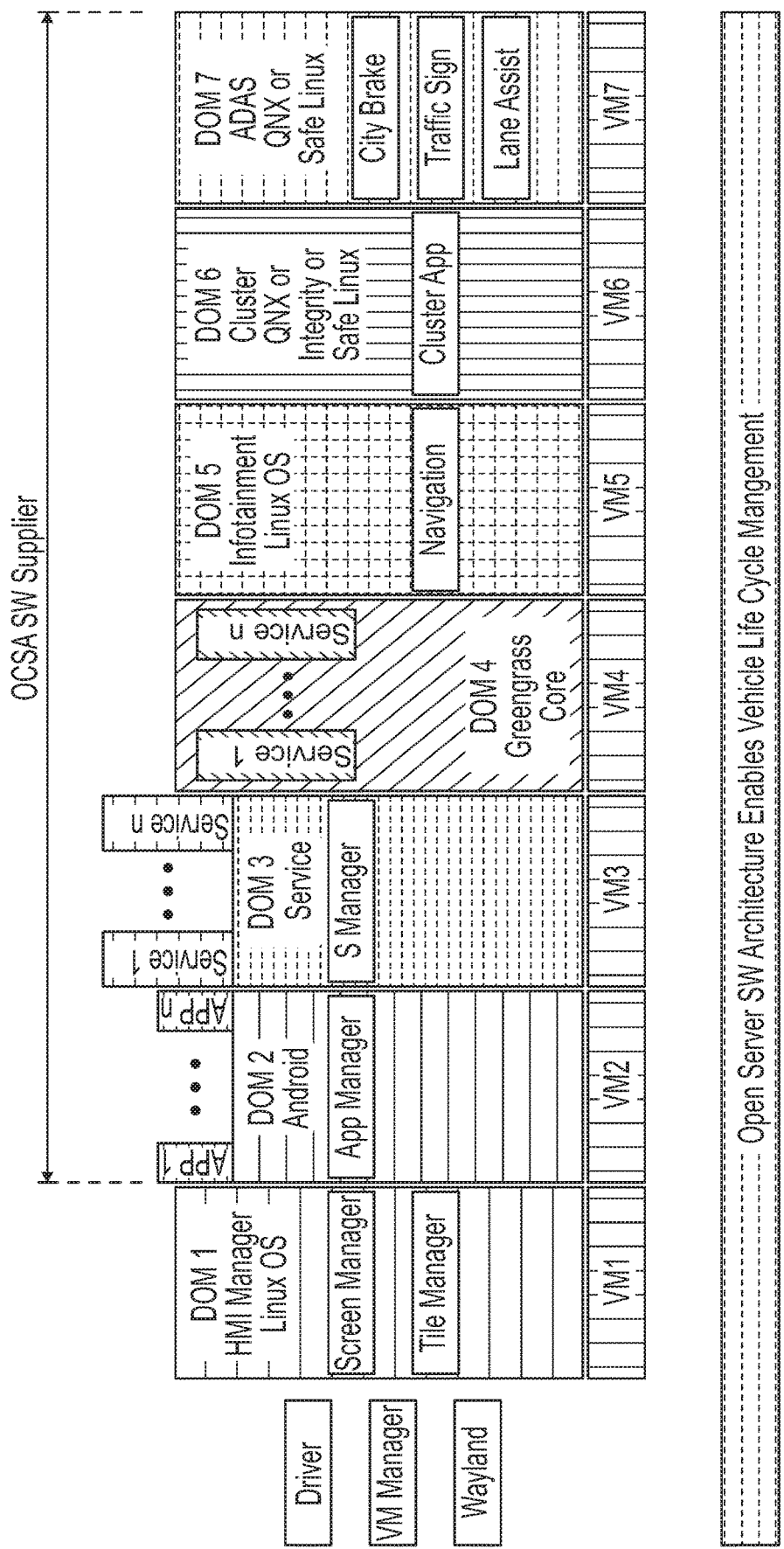
FIG. 14C is a conceptual block diagram illustrating OCSA server system software (SW), according to some embodiments.

FIG. 14C is a conceptual block diagram illustrating OCSA server system software, according to some embodiments. In some embodiments, multiple software domains on each SoC device are separated by a hypervisor. In some embodiments, the hypervisor is a VM monitor (VMM) implemented in computer software, firmware, or hardware and runs VMs. The hypervisor presents guest operating systems with a virtual operating platform and manages the execution of the guest operating systems. Multiple instances of a variety of operating systems may share the virtualized hardware resources, including but not limited to: Linux®, Windows®, and macOS® instances can all run on a single SoC.

As shown in FIG. 14C, OSCA hardware suppliers provide fully abstracted hardware and a flexible HMI manager that is implemented on virtual machines VM0, VM1 respectively. OSCA software suppliers develop their software on a computer-based reference system. For example, an app manager runs on virtual machine VM2 and supports a number of software applications (e.g., Android® apps). A microservice manager runs on virtual machine VM3 and supports a number of microservices. Virtual machine VM4 supports Amazon® Web services (AWS) λ functions. Virtual machine VM5 supports infotainment and navigation applications. Virtual machine VM6 supports instrument cluster applications (e.g., using QNX, Integrity, Safe Linux). Virtual machine VM7 supports ADAS applications. AWS Greengrass is software that extends AWS Cloud capabilities to local devices, making it possible for those devices to collect and analyze data closer to the source of information, while also securely communicating with each other on local networks. Developers who use AWS Greengrass can author serverless code (AWS λ functions) in the cloud and then deploy the code to devices for local execution of applications.

Figure 15:
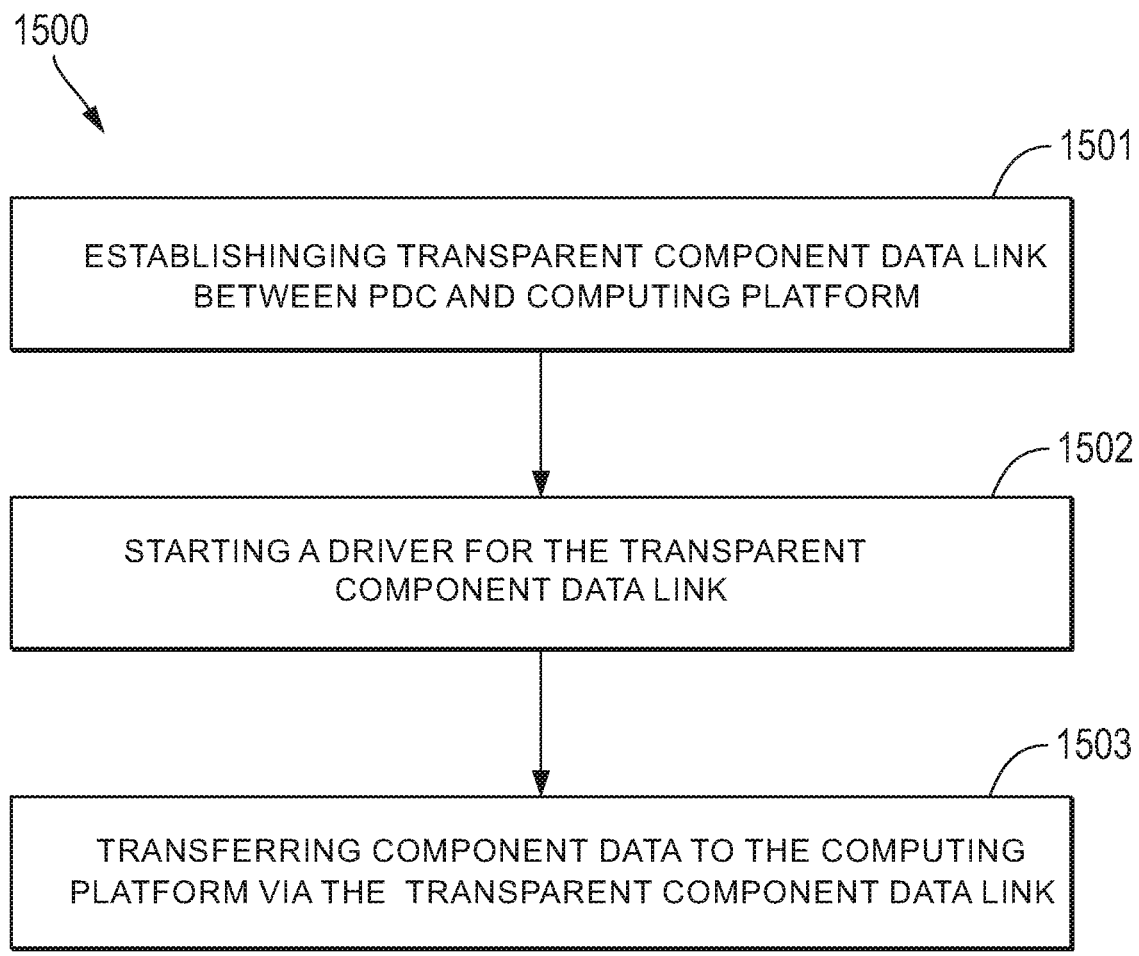
FIG. 15 is a flow diagram illustrating a process for establishing a logical connection from components to computing platforms, according to some embodiments.

FIG. 15 is a flow diagram illustrating process 1500 for establishing a logical connection from components (e.g., sensors coupled to a PDC) to computing platforms (e.g., ADS server 101), according to some embodiments. Process 1500 begins by establishing a transparent component data link between a PDC and one or more computing platforms (1501). Process 1500 continues by starting a driver for the transparent component data link (1502). For example, the driver can be started by the one or more computing platforms. Process 1500 continues by transferring component data to and from the one or more computing platforms via the transparent component data link (1503).

Figure 16A:
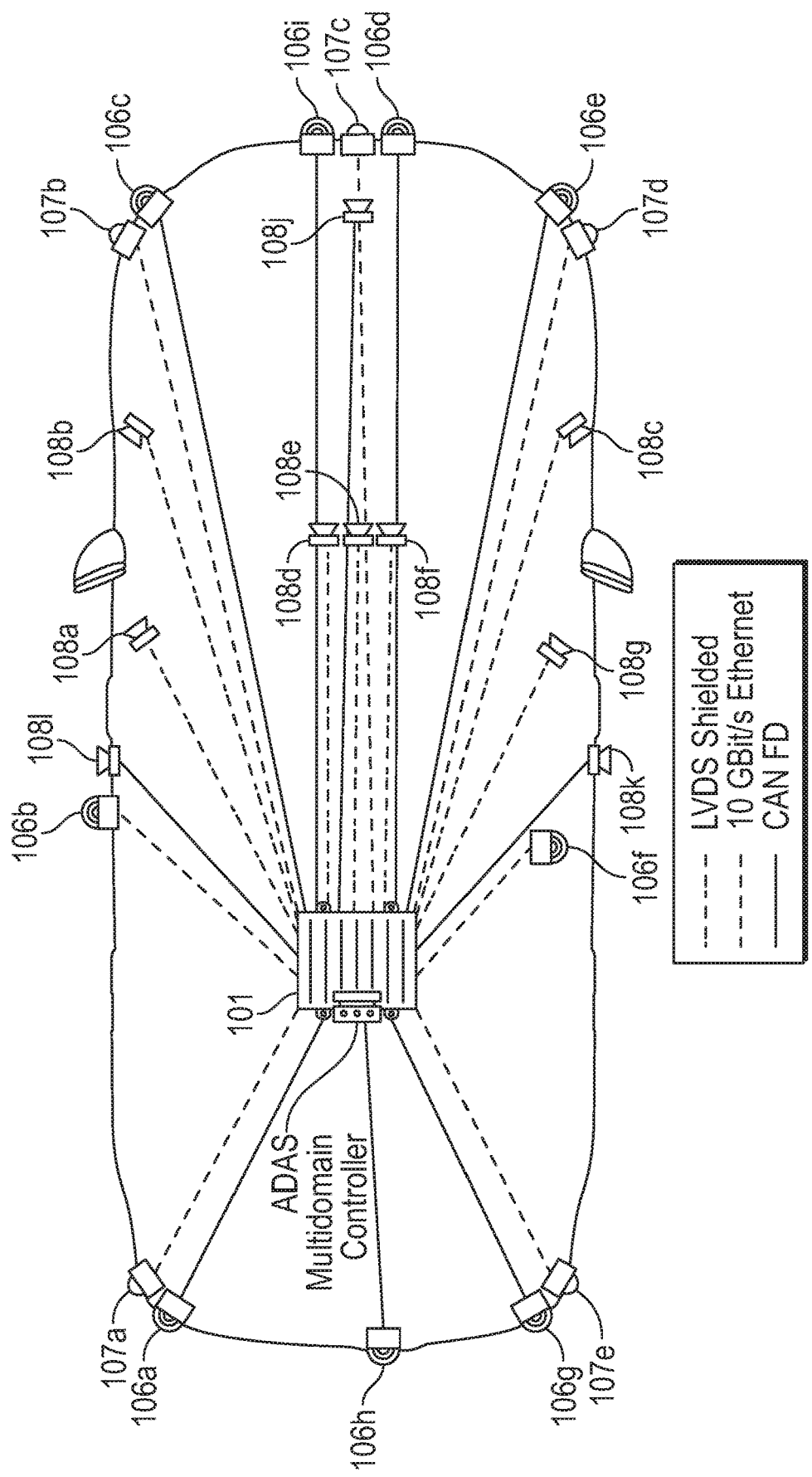
FIG. 16A illustrates a star topology using an ADS as a peripherals docking station, according to some embodiments.

FIG. 16A illustrates a star topology using an ADS as a peripherals docking station, according to some embodiments. In the topology shown, every sensor emanates from the ADS in a "hub and spoke" configuration. The topology shown is a level 4/5 sensor configuration that does not include redundancy. This star topology is largely inflexible because it does not allow for data to be repurposed beyond automated driving without causing significant overhead. Such a star topology can be made redundant in a couple of ways. In some embodiments, every component of the star topology is redundant, which means the topology would include redundant power and data supplied to each sensor and redundant computing, which would result in a costly system. Some embodiments include one or more subsets of redundancy that rely on different subsets of sensors to achieve redundancy, as described in reference to FIG. 16B.

Figure 16B:
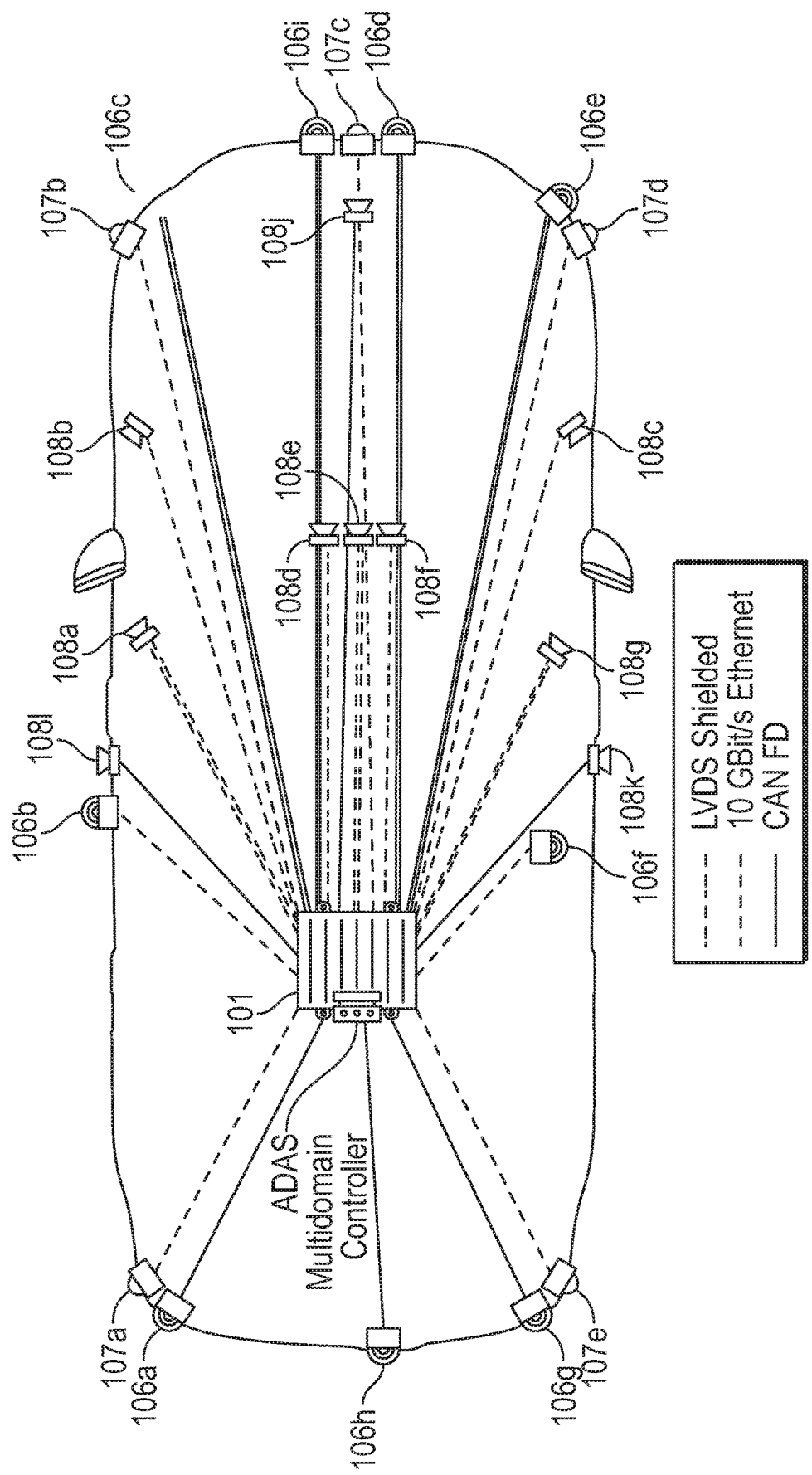
FIG. 16B illustrates a star topology including a subset of redundant data links for certain sensors, according to some embodiments.

FIG. 16B illustrates a star topology including a first subset of redundant data links for sensors, according to some embodiments. This embodiment has a lower level of redundancy for automated driving computing (a subset) than the PDC based topologies previously described. The star topology shown in FIG. 16B provides a first level of data redundancy that uses a first subset of sensors that are available in the event of a failure. Note that only data redundancy is shown in FIG. 16B and a practical system would also default to a first level of power redundancy that uses a first set of power components. Additionally, there can be a second level of redundancy that uses a second (possibly reduced) subset of sensors in the event that a sensor in the first subset of sensors fails. Although the reduced number of sensors would reduce the functionality of the autonomous vehicle, the vehicle would still have the capability to provide at least a "limp" home function or "limp" to safety function.

Figure 17:
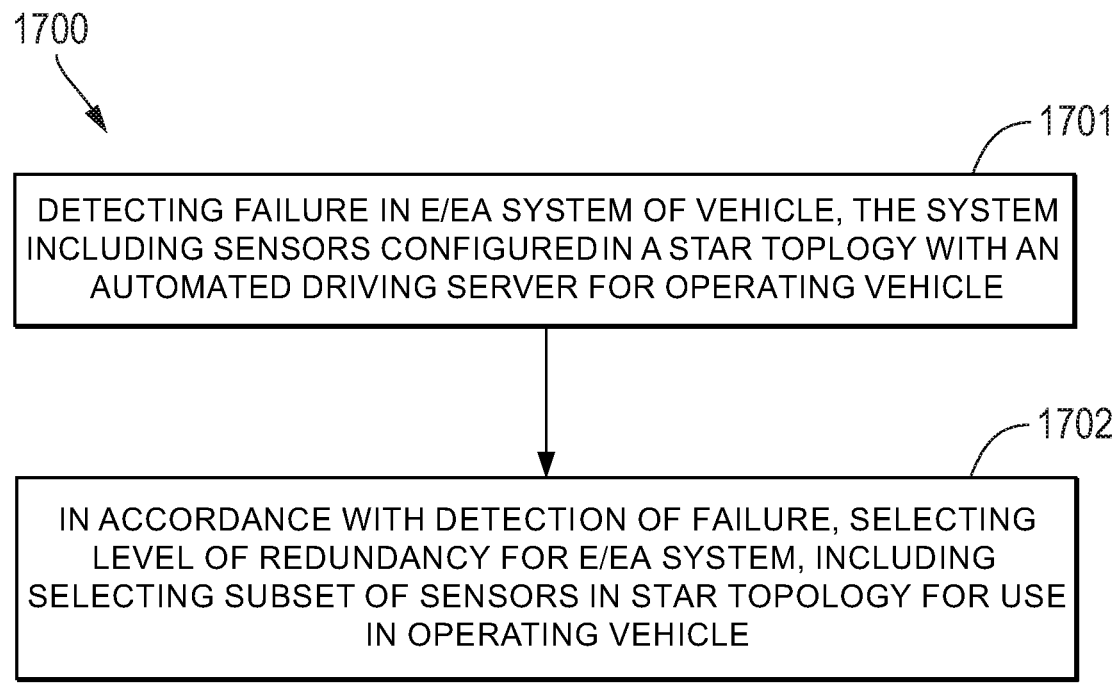
FIG. 17 is a flow diagram of a process for selecting a subset of redundant sensors configured in a star topology, according to some embodiments.

FIG. 17 is a flow diagram of a process 1700 for selecting a subset of redundant sensors configured in a star topology, according to some embodiments. Process 1700 begins by detecting a failure in an automotive E/EA system of a vehicle (1701), where the system is configured in a star topology; and then in accordance with detection of the failure, process 1700 continues by selecting a level of redundancy for the system, the selecting including selecting a subset of redundant sensors in the star topology for use in operating the vehicle (1702).

Example Computer System

Figure 18:
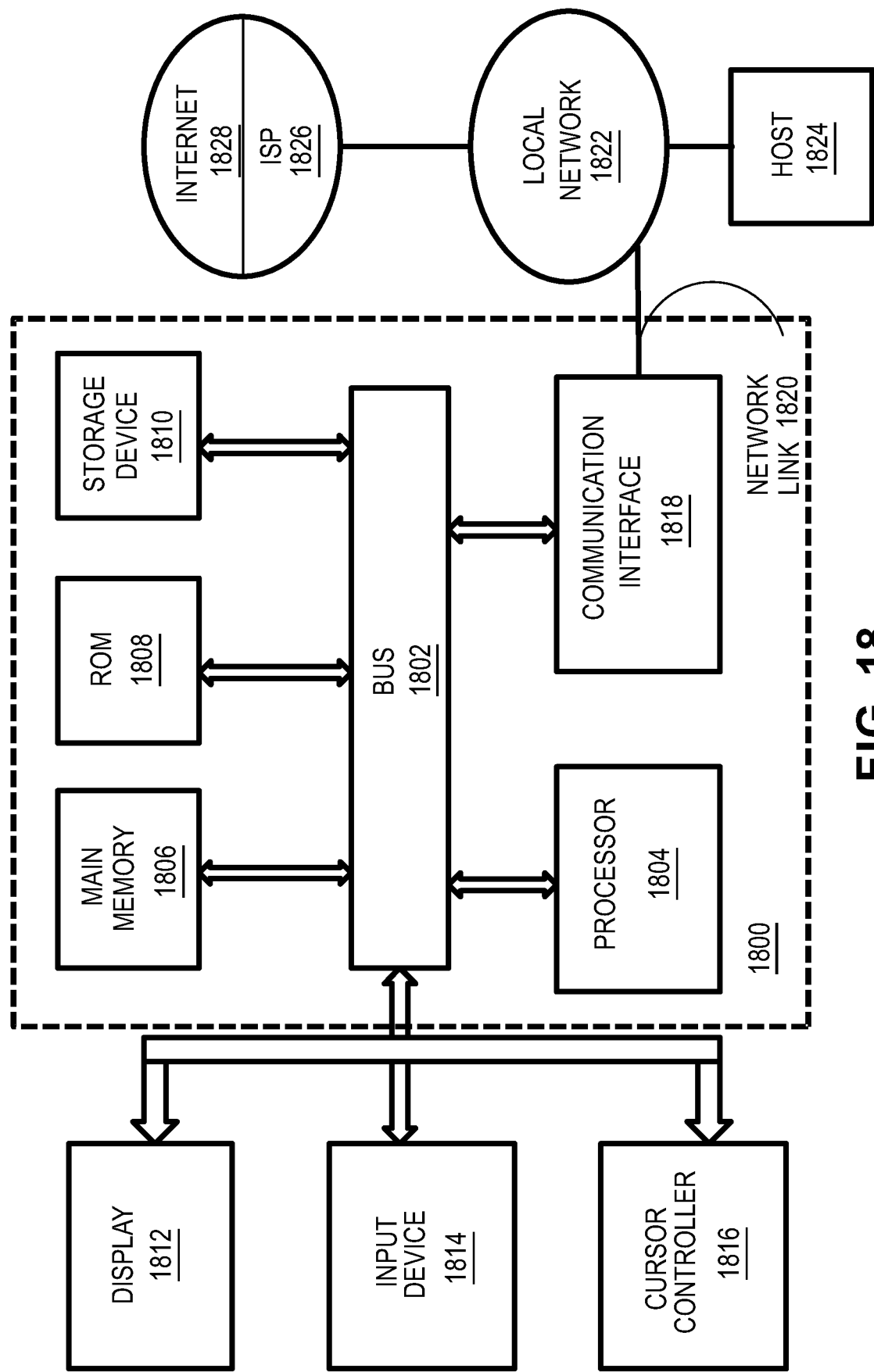
FIG. 18 illustrates a computer system, according to some embodiments.

FIG. 18 illustrates a computer system 1800 (e.g., a PDC (or a portion thereof) or a computing platform (or a portion thereof)). In some embodiments, the computer system 1800 is a special purpose computing device. The special-purpose computing device is hard-wired to perform techniques described above (e.g., some or all of the operations in processes 1100, 1200, 1300, 1500, and/or 1700 or operations that implement other techniques described above) or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In some embodiments, the special-purpose computing devices are desktop computer systems, portable computer systems, handheld devices, network devices or any other device that incorporates hard-wired and/or program logic to implement the techniques.

In some embodiments, the computer system 1800 includes a bus 1802 or other communication mechanism for communicating information, and a hardware processor 1804 coupled with a bus 1802 for processing information. The hardware processor 1804 is, for example, a general-purpose microprocessor. The computer system 1800 also includes a main memory 1806, such as a random-access memory (RAM) or other dynamic storage device, coupled to the bus 1802 for storing information and instructions to be executed by processor 1804. In some embodiments, the main memory 1806 is used for storing temporary variables or other intermediate information during execution of instructions to be executed by the processor 1804. Such instructions, when stored in non-transitory storage media accessible to the processor 1804, render the computer system 1800 into a special-purpose machine that is customized to perform the operations specified in the instructions.

In some embodiments, the computer system 1800 further includes a read only memory (ROM) 1808 or other static storage device coupled to the bus 1802 for storing static information and instructions for the processor 1804. A storage device 1810, such as a magnetic disk, optical disk, solid-state drive, or three-dimensional cross point memory is provided and coupled to the bus 1802 for storing information and instructions.

In some embodiments, the computer system 1800 is coupled via the bus 1802 to a display 1812, such as a cathode ray tube (CRT), a liquid crystal display (LCD), plasma display, light emitting diode (LED) display, or an organic light emitting diode (OLED) display for displaying information to a computer user. An input device 1814, including alphanumeric and other keys, is coupled to bus 1802 for communicating information and command selections to the processor 1804. Another type of user input device is a cursor controller 1816, such as a mouse, a trackball, a touch-enabled display, or cursor direction keys for communicating direction information and command selections to the processor 1804 and for controlling cursor movement on the display 1812. This input device typically has two degrees of freedom in two axes, a first axis (e.g., x-axis) and a second axis (e.g., y-axis), that allows the device to specify positions in a plane.

According to some embodiments, the techniques herein are performed by the computer system 1800 in response to the processor 1804 executing one or more sequences of one or more instructions contained in the main memory 1806. Such instructions are read into the main memory 1806 from another storage medium, such as the storage device 1810. Execution of the sequences of instructions contained in the main memory 1806 causes the processor 1804 to perform the process steps described herein. In some embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 1810. Volatile media includes dynamic memory, such as the main memory 1806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media (e.g., transitory computer-readable media). Transmission media participates in transferring information between storage media. For example, transmission media includes coaxial cables, copper wire and fiber optics, including the wires that comprise the bus 1802. Transmission media can also take the form of acoustic or light waves, such as those generated during radio-wave and infrared data communications.

In some embodiments, various forms of media are involved in carrying one or more sequences of one or more instructions to the processor 1804 for execution. For example, the instructions are initially carried on a magnetic disk or solid-state drive of a remote computer. The remote computer loads the instructions into its dynamic memory and send the instructions over a telephone line using a modem. A modem local to the computer system 1800 receives the data on the telephone line and use an infrared transmitter to convert the data to an infrared signal. An infrared detector receives the data carried in the infrared signal and appropriate circuitry places the data on the bus 1802. The bus 1802 carries the data to the main memory 1806, from which processor 1804 retrieves and executes the instructions. The instructions received by the main memory 1806 may optionally be stored on the storage device 1810 either before or after execution by processor 1804.

The computer system 1800 also includes a communication interface 1818 coupled to the bus 1802. The communication interface 1818 provides a two-way data communication coupling to a network link 1820 that is connected to a local network 1822. For example, the communication interface 1818 is an integrated service digital network (ISDN) card, cable modem, satellite modem, or a modem to provide a data communication connection to a corresponding type of telephone line. As another example, the communication interface 1818 is a local area network (LAN) card to provide a data communication connection to a compatible LAN. In some embodiments, wireless links are also implemented. In some such embodiments, the communication interface 1818 sends and receives electrical, electromagnetic, or optical signals that carry digital data streams representing various types of information.

The network link 1820 typically provides data communication through one or more networks to other data devices. For example, the network link 1820 provides a connection through the local network 1822 to a host computer 1824 or to a cloud data center or equipment operated by an Internet Service Provider (ISP) 1826. The ISP 1826 in turn provides data communication services through the world-wide packet data communication network now commonly referred to as the "Internet" 1828. The local network 1822 and Internet 1828 both use electrical, electromagnetic or optical signals that carry digital data streams. The signals through the various networks and the signals on the network link 1820 and through the communication interface 1818, which carry the digital data to and from the computer system 1800, are example forms of transmission media. In an embodiment, the network 1820 contains the cloud 202 or a part of the cloud 202 described above.

The computer system 1800 sends messages and receives data, including program code, through the network(s), the network link 1820, and the communication interface 1818. In some embodiments, the computer system 1800 receives code for processing. The received code is executed by the processor 1804 as it is received, and/or stored in storage device 1810, or other non-volatile storage for later execution.

Figure 19:
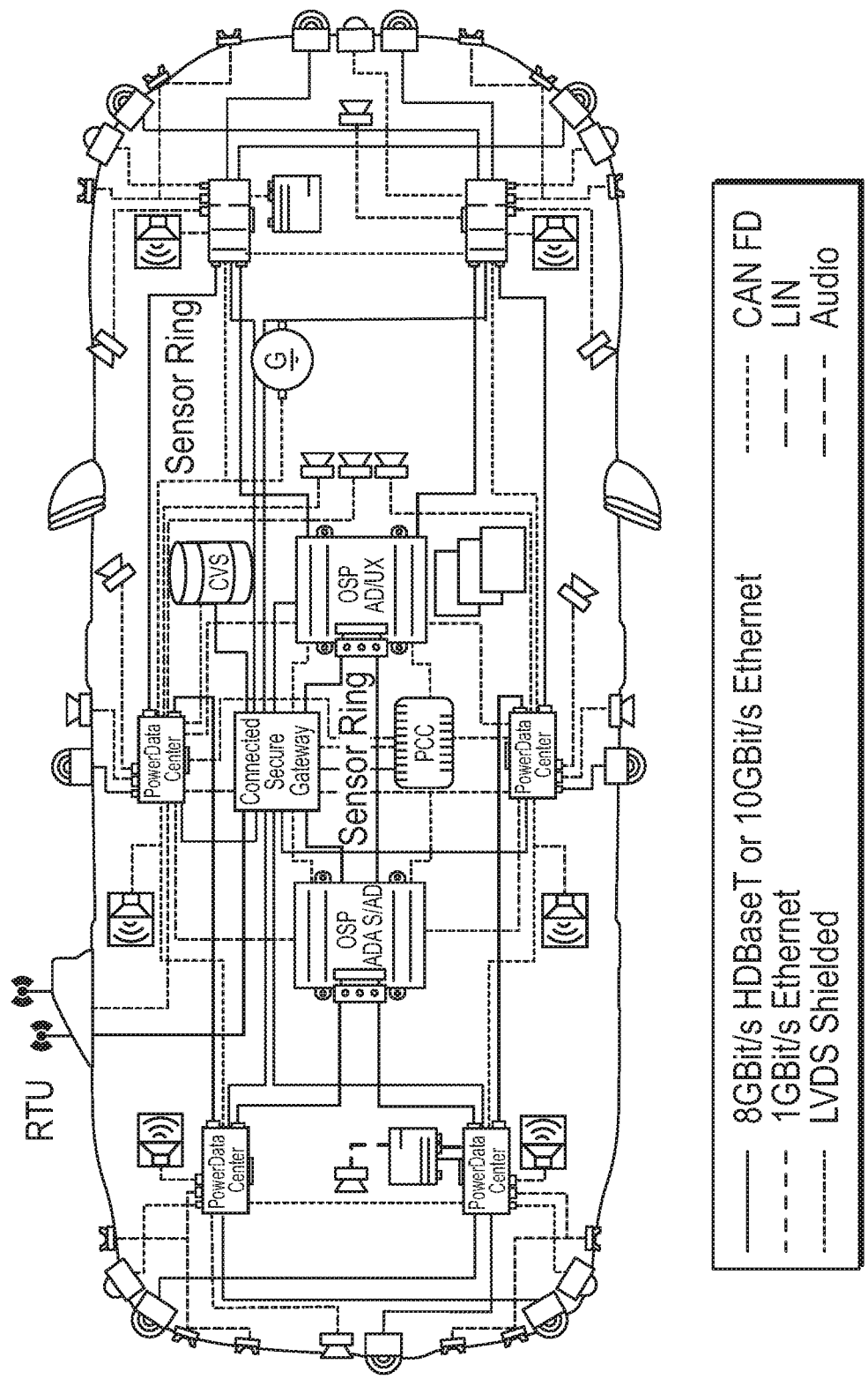
FIG. 19 illustrates an E/EA system architecture that utilizes an open server platform (OSP) and provides a scalable topology with fail operational design, according to an embodiment.

FIG. 19 illustrates an E/EA system architecture that utilizes an open server platform (OSP) and provides a scalable topology with fail operational design, according to an embodiment. The E/A architecture separates hardware and software innovation cycles so that hardware can be developed and delivered independent of software, allows existing software to be moved to new hardware without modification, provides efficient compute resource sharing to enable coexistence of safety critical and non-safety critical workloads on the same machine, and provides affordable redundancy with a 3-layer fail operational design that duplicates only those components that are absolutely necessary for safe fail operation. The E/EA architecture replaces the conventional distributed monolithic embedded software/hardware approach to a modular, open and centralized smart vehicle architecture.

An advantage to the E/EA architecture is the decoupling of software from hardware which allows independent life cycles for the hardware and software, and also provides flexibility for dynamic feature sets and compute needs, thus improving scalability. Another advantage the separation of I/O from compute resources using PDCs which provide I/O concentration, this enabling affordable redundancy. Another advantage is using a central compute cluster that provides a universal platform with standardized interfaces and a connected secure gateway. Another advantage is a unified power and data backbone that provides modular and automobile harness technology and design for redundant networks via a dual-ring topology. Another advantage is the use of the PDC as a "universal docking station" and for sensors and zone consolidation.

Referring to FIG. 19, E/EA architecture includes 6 PDCs covering different zones in the vehicle. Each PDC acts a docking station for sensors in the zone. The PDCs communicate through a sensor ring and through a single interface with the OSP ADAS/AD server. The sensor ring is implemented using redundant 8 Gbit/s PCI Express or 10 Gbit/se Ethernet. The OSP ADAS/AD server is coupled in a self-healing server ring with an SCGW OSP AD/UX and PCC. The server ring is also implemented using redundant 8 Gbit/s PCI Express or 10 Gbit/se Ethernet. An RTU handles external communications and receives audio and software updates. Software updates received by the RTU are routed to the SCGW and stored in a central vehicle storage (CVS) unit, as described in reference to FIGS. 24 and 25. Audio (e.g., satellite radio) is sent by the RTU to a PDC, where it can be distributed to other components, including the CVS unit. In an embodiment, each PDC includes audio electronics (e.g., an audio amplifier, warning tone generator, low latency sound, audio client, AVB slave) and is coupled to one or more loudspeakers to deliver audio.

Figure 20:
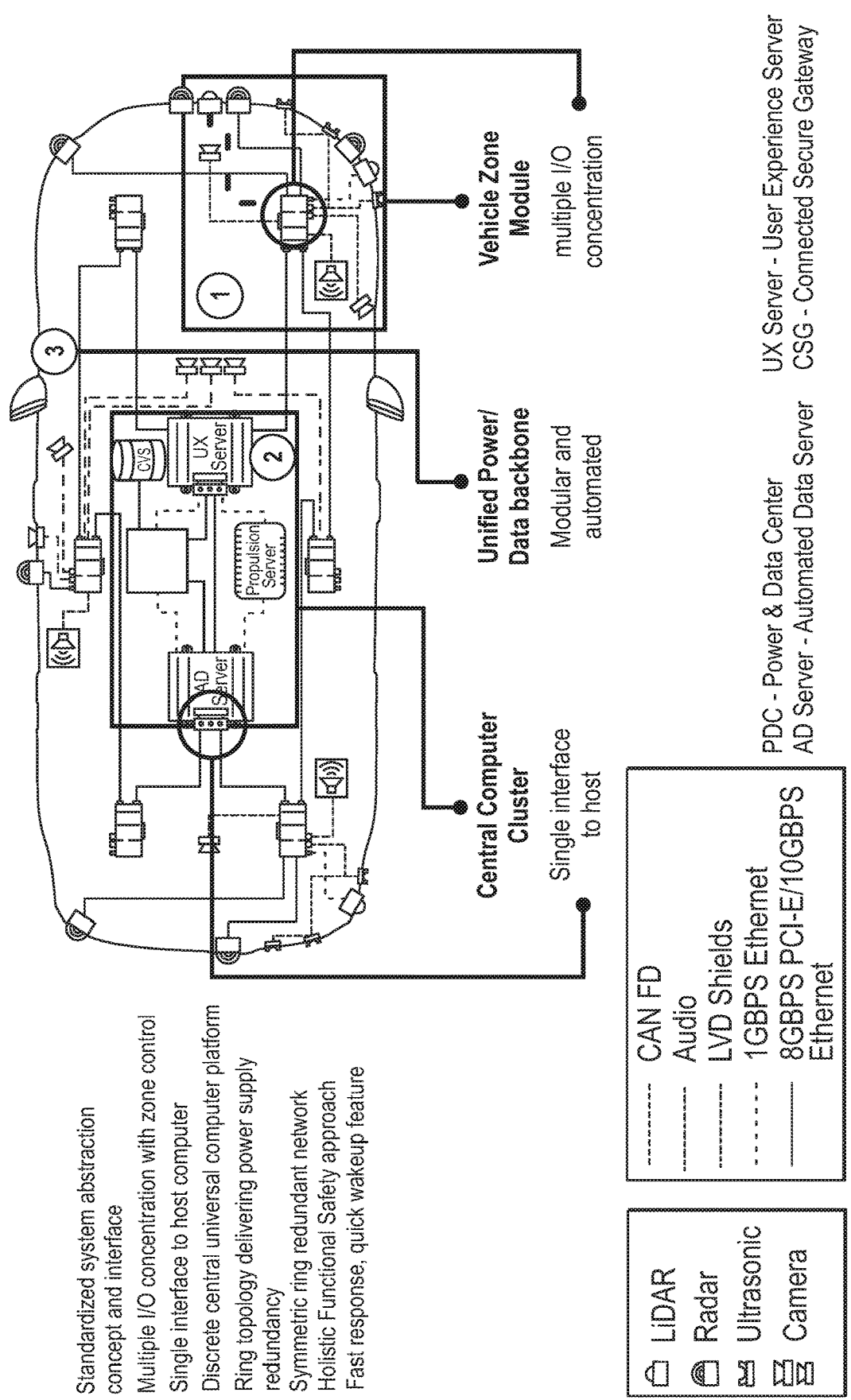
FIG. 20 further illustrates the E/EA system architecture shown in FIG. 19 with a focus on key technical attributes that enables feature growth and redundancy, according to an embodiment.

FIG. 20 further illustrates the E/EA system architecture shown in FIG. 19 with a focus on key technical attributes that enables feature growth and redundancy, according to an embodiment. The key attributes include a standardized system abstraction concept and interfaces, multiple I/O concentration with zone control, single interface to AD server, centralized universal compute cluster implementing an OSP, a power ring topology delivering power supply redundancy, a symmetric, self-healing data ring topology providing a redundant data network, holistic function safety approach, fast response, quick wakeup features and a SCGW for external communications (software updates, audio, V2X communications, WiFi, GPS, etc.) with security features (e.g., implementing a "firewall," "sandbox" or "proxy" server) to guard against malicious attacks on the vehicle.

Figure 21:
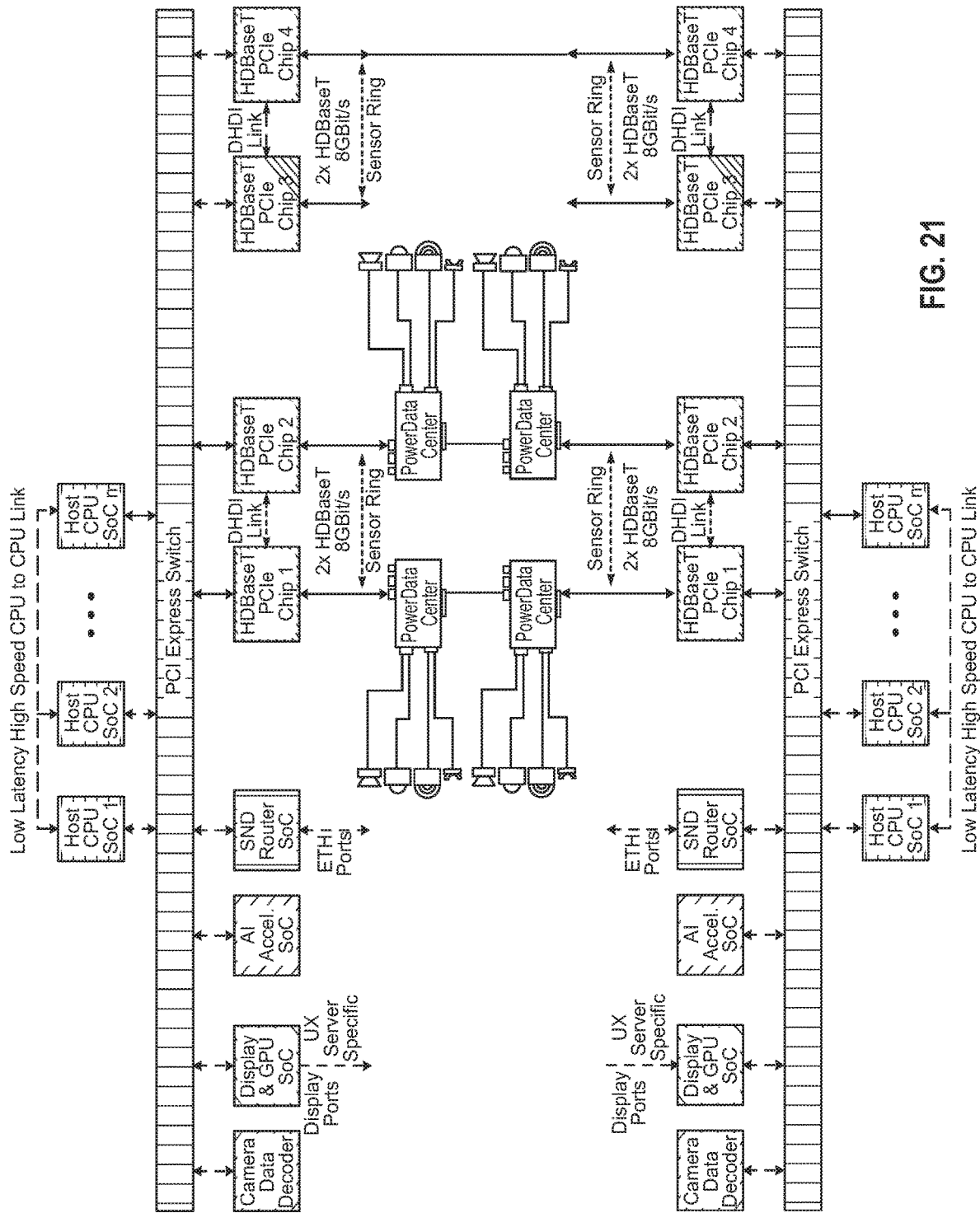
FIG. 21 illustrates an OSP system architecture, according to an embodiment

FIG. 21 illustrates an OSP system architecture, according to an embodiment. The OSP system architecture provides redundant network connections with low overhead. The OSP sensor interface is PCIe-based which uses HDBaseT as a physical layer. The sensors appear as separate PCIe components, enabled by driver software in the PDC and are native to the OSP. The OSP architecture provides low overhead/delay for sensor data from the source to the OSP CPUs. The sensors are available to two redundant server devices without any hardware overhead. In case of a connection error in between PDCs, the sensor data is rerouted via the DHD links in a ring structure.

Figure 22:
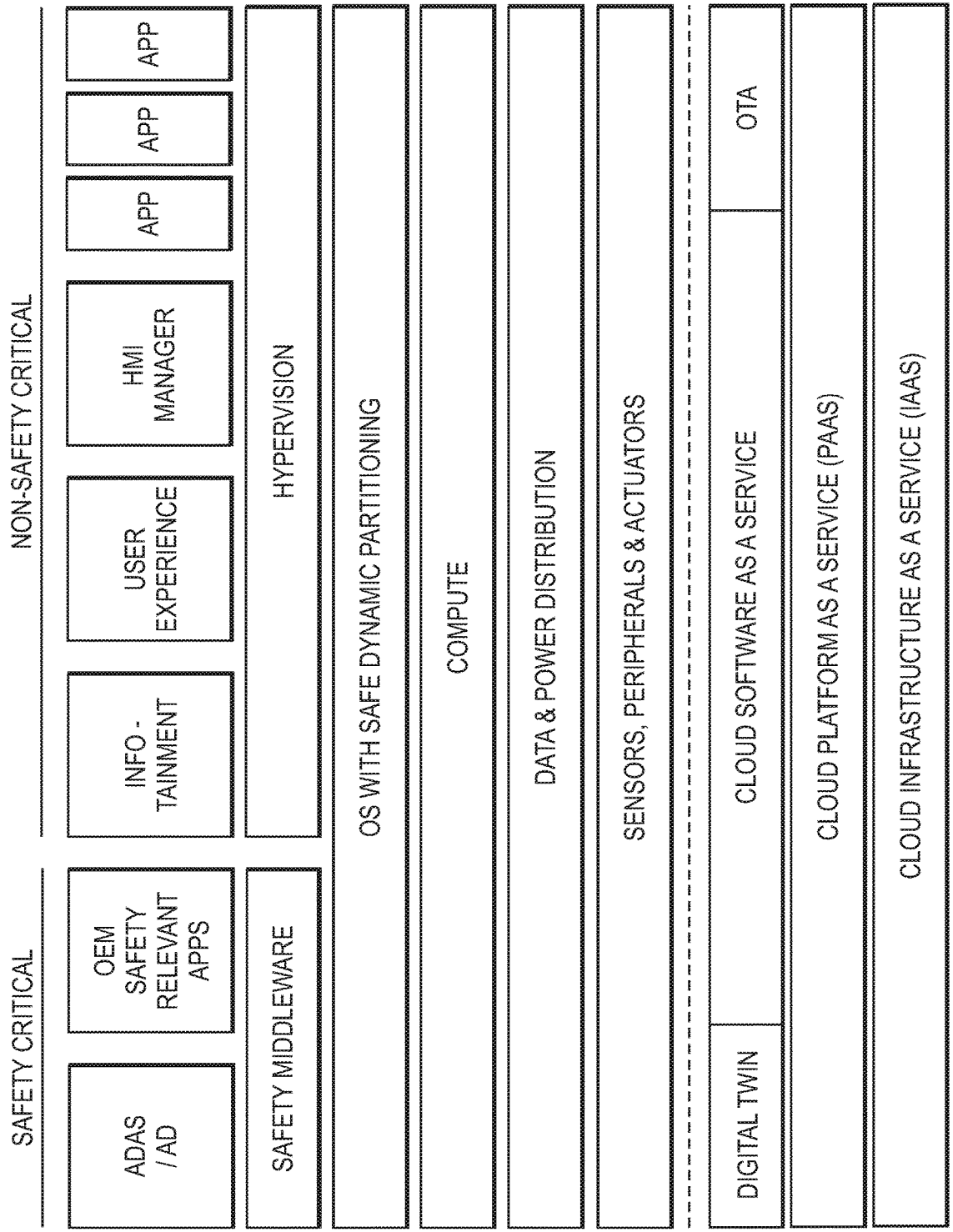
FIG. 22 illustrates an OSP software stack, according to an embodiment.

FIG. 22 illustrates an OSP software stack, according to an embodiment. The OSP software stack installed on the vehicle provides a "data center on wheels." Safety critical applications operate in a different domain than non-safety critical applications. The safety critical applications (e.g., ADAS, OEM safety relevant apps) communicate with lower stack layers through safety middleware. The non-safety critical applications (e.g., infotainment, user experience, HMI manager and other apps) communicate with lower stack layers through a hypervisor. The operating system (O/S) (e.g., Linux) includes safe dynamic partitioning. Also shown is the cloud based platform that provides SaaS, PaaS and IaaS services, including OTA for software updates and a digital twin, which is described in reference to FIGS. 24 and 25.

The OSP is highly scalable to OEM and other third party applications. The hypervisor and safe dynamic partitioning manage safe and unsafe domains on the same hardware. Sharing underlying compute resources allows for silicon optimization, reducing cost and energy consumption, "plug and play" drivers make adding new edge devices effortless.

Figure 23:
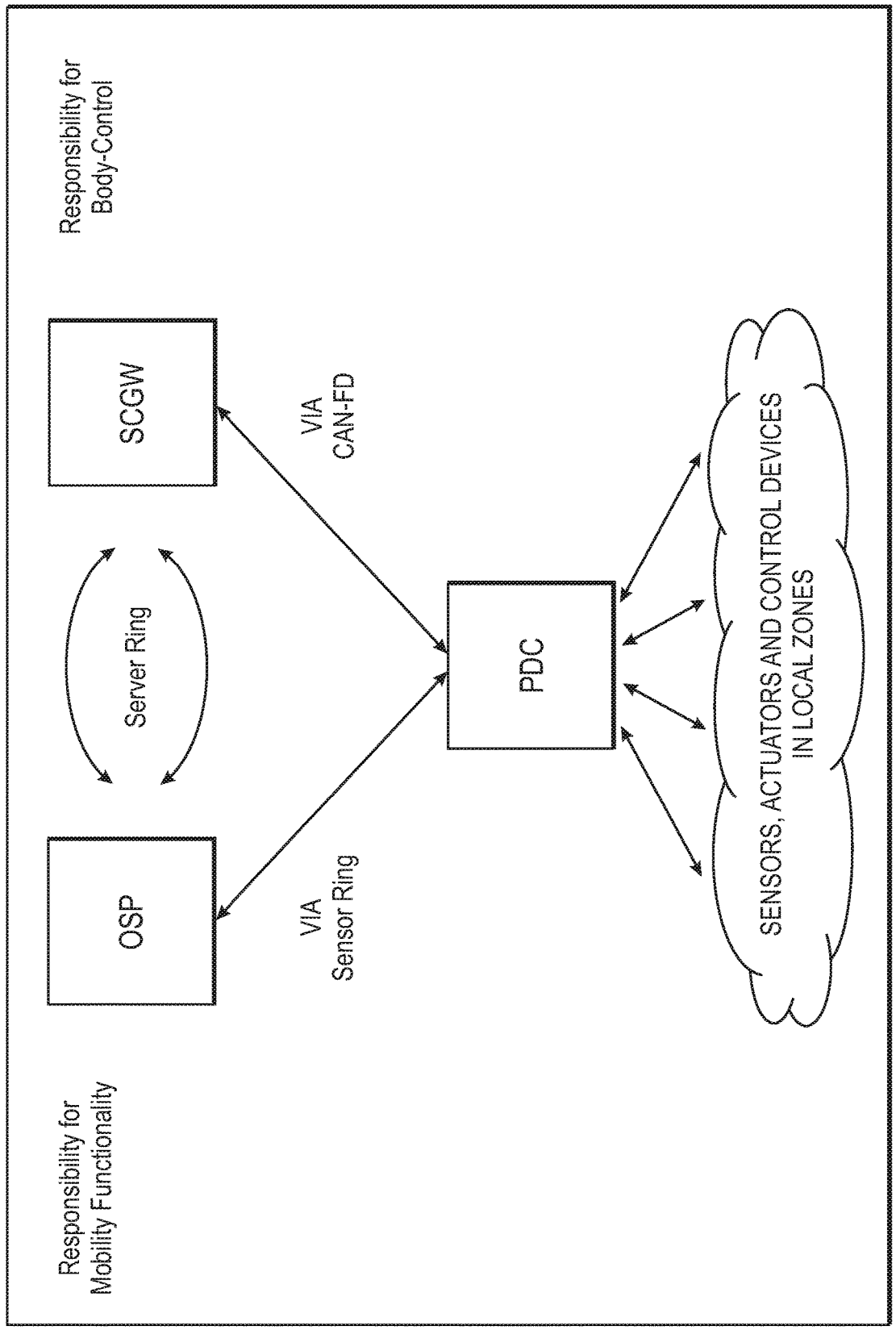
FIG. 23 illustrates PDC functional domains, according to an embodiment.

FIG. 23 illustrates PDC functional domains, according to an embodiment. In an embodiment, the PDC capabilities are split into two functional domains: body-control and mobility. The defining difference between these two functional domains is the way they are controlled. Body-control functions are controlled centrally by the SCGW via CAN-FD connections. Mobility functions are controlled by the OSP via the sensor ring. The OSP and SCGW in turn are linked through the server ring. Multiple PDCs are linked via the sensor ring to the OSP. Each PDC has its own individual CAN-FD connection to the SCGW.

Vehicle Life Cycle Management

Figure 24:
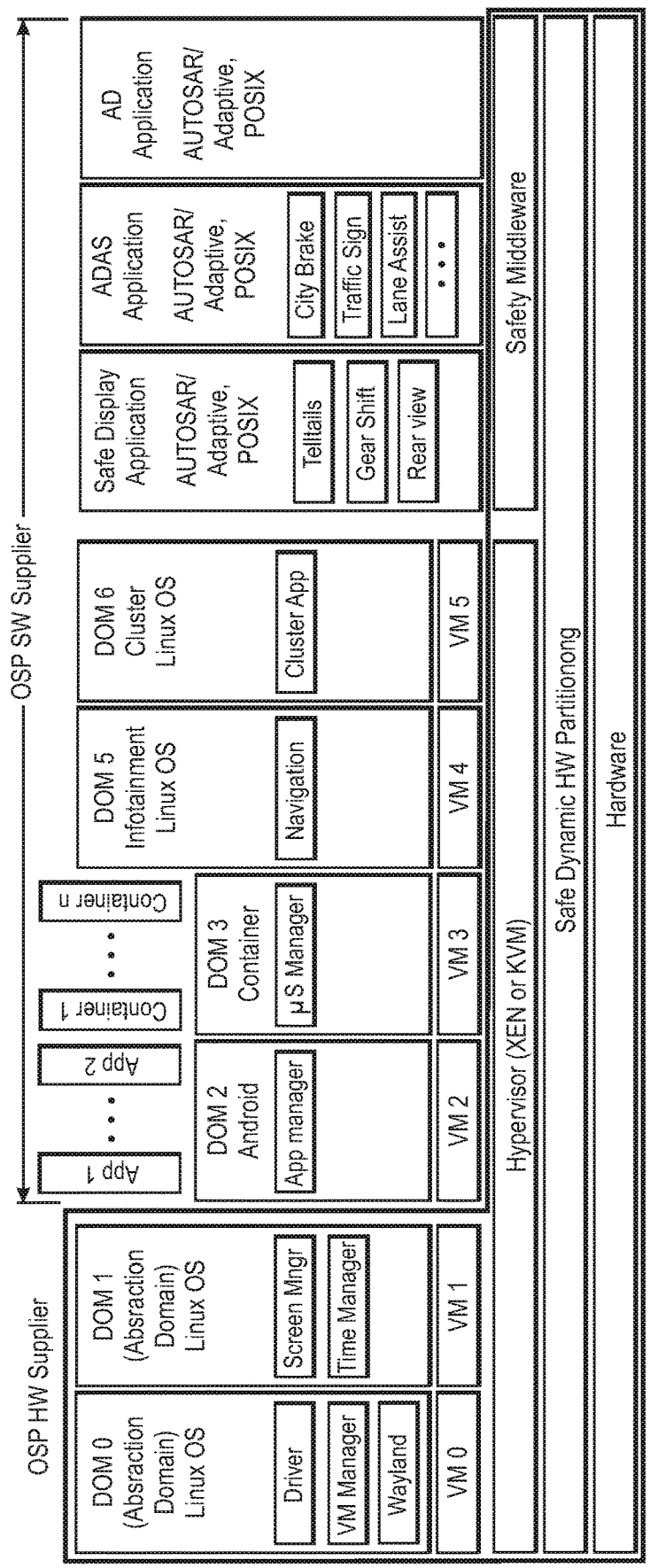
FIG. 24 illustrates OSP mixed criticality for enabling vehicle life cycle management, according to an embodiment.

FIG. 24 illustrates OSP mixed criticality for enabling vehicle life cycle management, according to an embodiment. The open server software architecture shown in FIG. 24 enables vehicle life cycle management. A safe dynamic hardware partitioning layer is used to share the hardware for functional safety relevant software. Safety middleware is used to abstract function safety relevant software from hardware. An open source hypervisor with abstraction and HMI domains is used to abstract other software and hardware.

Figure 25:
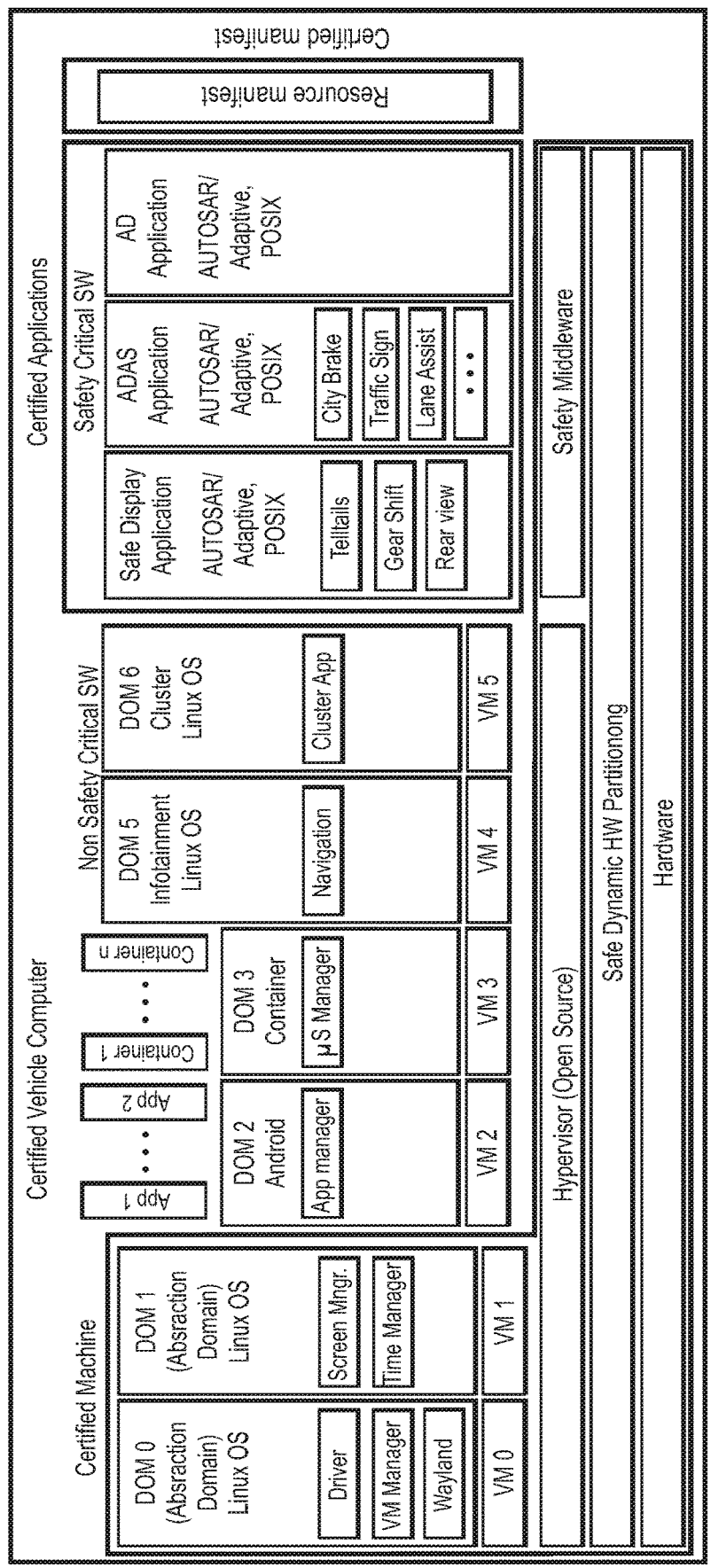
FIG. 25 illustrates OSP functional safety certification for enabling vehicle life cycle management, according to an embodiment.

FIG. 25 illustrates OSP functional safety certification for enabling vehicle life cycle management, according to an embodiment. With this architecture, hardware and machine middleware are certified by certified test cases, applications are certified on code level and reference tested and the machine resource manifest is automatically generated and certified.

More particularly, the hardware and middleware are developed separately from the application software and are tested and certified with a certified test suite. Application software is developed separately from the target hardware and is tested in a simulated environment. The certification is done on code level and by the reference environment. The software integration of required application software is done "end of line" by a cloud application (virtual twin). Software applications are scheduled by the virtual twin application, which has an instance per entire vehicle. Each ECU (like a PDC, an OSP or other ECUs) is configured separately by the virtual twin application. Each ECU requires a resource manifest which includes a time trigger table to run software threads in a multicore environment at the right point of time and in the right sequence. The resource manifest is also used to manage other resources, such as memory, network throughput, interrupt rate, etc. The resource manifest is available in the entire ECU to run all applications without interference. The resource manifest is tested and certified by the cloud application per ECU.

All possible software applications for all possible ECUs in one vehicle line are programmed to the CVS unit, which is connected to the SCGW unit of the vehicle. The SCGW receives software content lists for all ECUs in a vehicle together with the certified resource manifests. The SCGW transfers software applications to the ECUs together with the resource manifests. The SCGW synchronizes the software applications on the CVS unit first with the cloud application to get the latest versions on the CVS unit. After this initial SW programming of the ECUs, the vehicle is ready to use and will perform a self-test to prove that the ECUs have been programmed correctly.

Software updates in the field can be done on the software component level on every ECU in the vehicle. The virtual twin application schedules the new application for an ECU by first generating and certifying the new resource manifest. The virtual twin application then transfers the new application to the CVS unit in the vehicle first together with the resource manifest. The SCGW exchanges the application on the ECU and updates the resource manifest. This process ensures that the certification for the ECU remains valid after the update.

Alternative Level 2 and 3 E/EA Architectures

Figure 26:
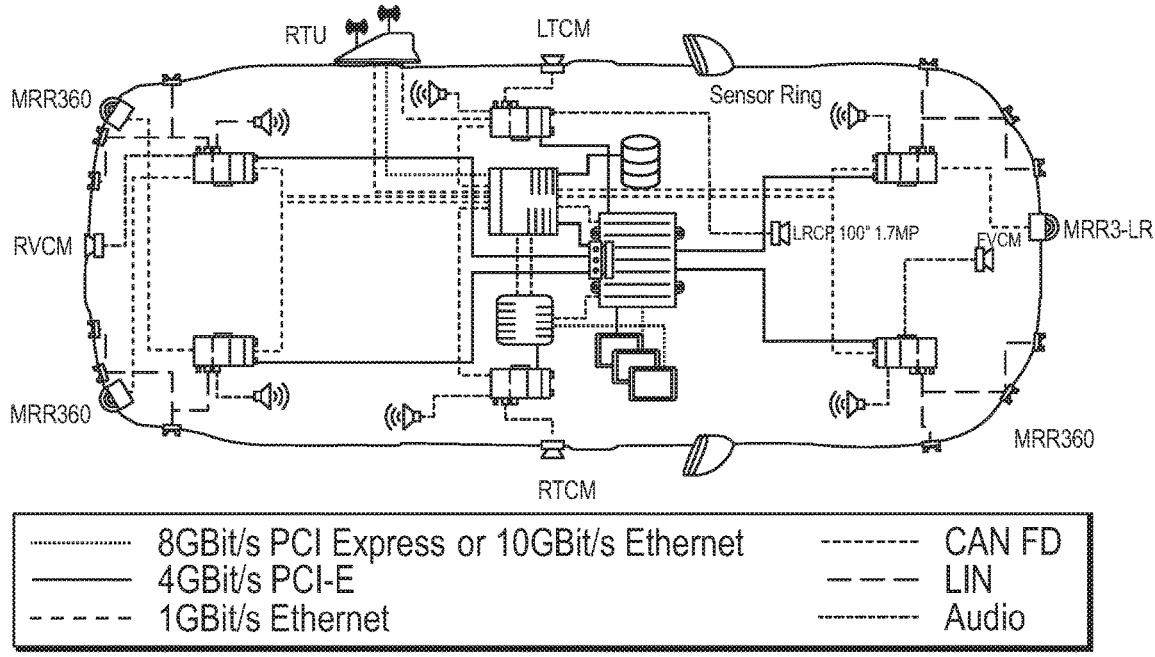
FIG. 26 is a data network view of an alternative scalable E/EA architecture for Level 2 vehicles, according to an embodiment.

FIG. 26 is a data network view of an alternative scalable E/EA architecture for Level 2 vehicles, according to an embodiment. The E/EA architecture includes a sensor ring connecting 6 PDCs and a server ring connecting an OSP UX/ADAS server, PCC and SCGW. The E/EA architecture also includes a CVS unit for storage and RTU for external communications. The four PDCs at the front and rear of the vehicle are each coupled to three ultrasonic sensors and an audio loudspeaker. The front-left PDC is coupled to a front-facing radar. The front-right PDC is coupled to a front-facing camera. The PDCs on the right and left sides of the vehicle are each coupled to a camera. The OSP UX/ADAS server is coupled to one or more output devices (e.g., displays). The SCGW is coupled to the RTU and the CVS unit. In an embodiment, the server ring is implemented using 1 GBit/s Ethernet and the sensor ring is implemented using 4 Gbit/s PCIe. Redundancy in the data network is achieved through CAN-FD links between the PDCs and the SCGW.

Figure 27:
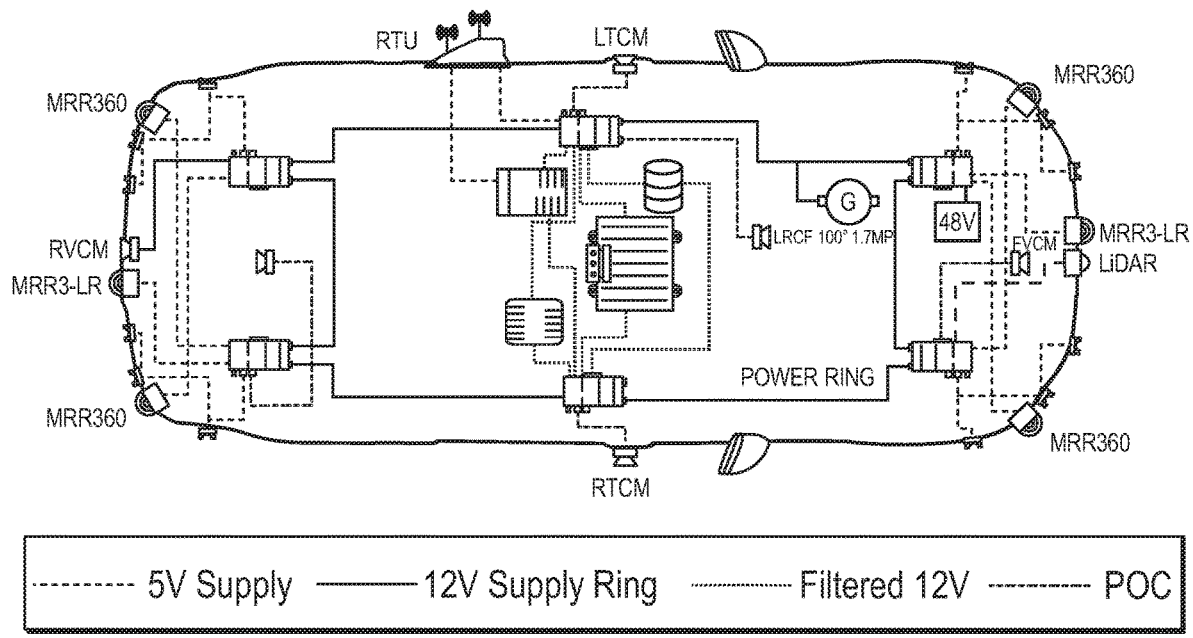
FIG. 27 is a power network view of the alternative scalable E/EA architecture shown in FIG. 26, according to an embodiment.

FIG. 27 is a power network view of the alternative scalable E/EA architecture shown in FIG. 26, according to an embodiment. The six PDCs are coupled to a 12V supply ring. The OSP UX/ADAS server, SCGW, PCC and CVS unit are coupled to a filtered 12V supply ring. The sensors are coupled to the PDCs by a 5V supply. The cameras receive power from their respective PDCs using power over Coax (PoC). A battery is coupled to the front-left PDC.

Figure 28:
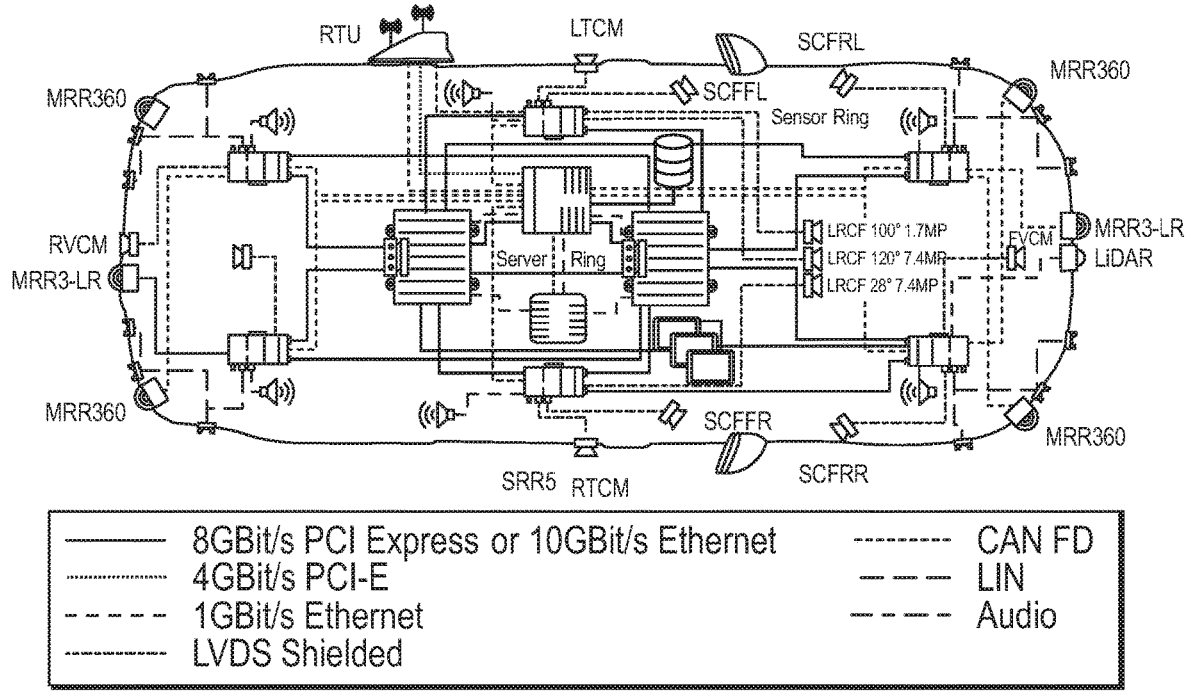
FIG. 28 is a data network view of an alternative scalable E/EA architecture for Level 3 vehicles, according to an embodiment.

FIG. 28 is a data network view of an alternative scalable E/EA architecture for Level 3 vehicles, according to an embodiment. The E/EA architecture includes a sensor ring connecting 6 PDCs and a server ring connecting an OSP UX/ADAS server, OSP AD/UX server, PCC and SCGW. The E/EA architecture also includes a CVS unit for storage and RTU for external communications. The four PDCs at the front and rear of the vehicle are each coupled to three ultrasonic sensors and an audio loudspeaker. The front-left PDC is coupled to a front-facing radar and a camera directed to the left-rear of the vehicle. The front-right PDC is coupled to a camera directed to the right-rear of the vehicle and to a LiDAR sensor. The PDCs on the right and left sides of the vehicle are each coupled to multiple cameras. The OSP AD/UX server is coupled to one or more output devices (e.g., displays). The SCGW is coupled to the RTU and the CVS unit. In an embodiment, the server ring is implemented using 1 GBit/s Ethernet and the sensor ring is implemented using 4 Gbit/s PCIe. Data network redundancy is achieved through CAN-FD links between the PDCs and the SCGW.

Figure 29:
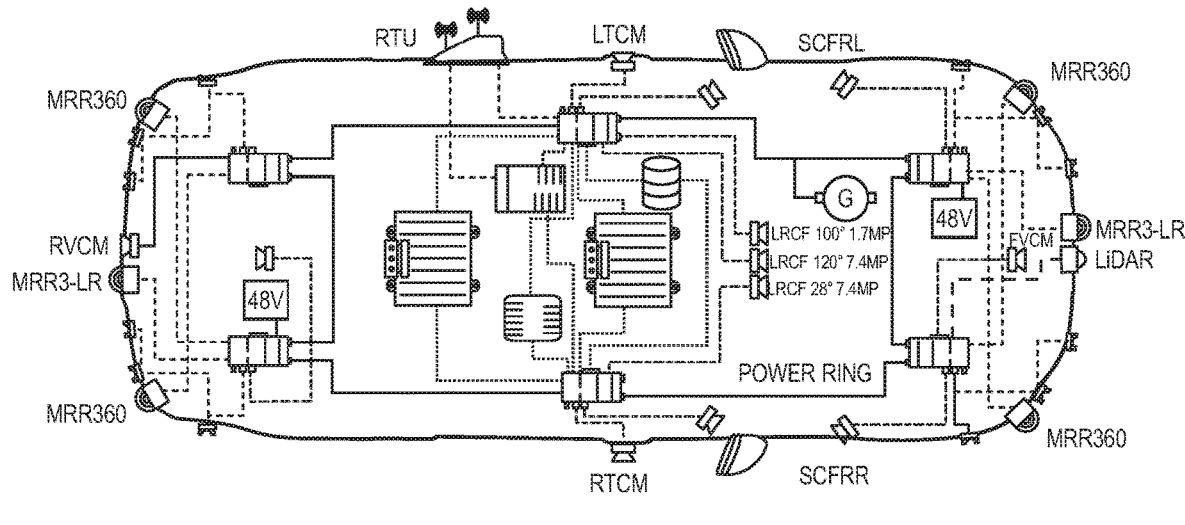
FIG. 29 is a power network view of the alternative scalable E/EA architecture shown in FIG. 28, according to an embodiment.

FIG. 29 is a power network view of the alternative scalable E/EA architecture shown in FIG. 28, according to an embodiment. The six PDCs are coupled to a 12V supply ring. The OSP UX/ADAS and OSP AD/UX servers, SCGW, PCC and CVS unit are coupled to a filtered 12V supply ring. The sensors are coupled to the PDCs by a 5V supply. The cameras receive power from their respective PDCs using PoC. The LiDAR sensor is powered by the front-left PDC using a filtered 12V supply. A battery is coupled to the front-left PDC.

While this document contains many specific implementation details the implementation details should not be construed as limitations on the scope of what may be claimed but rather as a description of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

While logic flows or operations (e.g., the operations in processes 1100, 1200, 1300, 1500, and/or 1700) are depicted in the drawings in a particular order, this should not be understood as requiring that such operations be performed in the particular order shown or in sequential order, or that all illustrated operations be performed, or that other operations cannot be performed, to achieve desirable results. Operations illustrated separately are optionally combined in a single operations, and features illustrated as a single operation are optionally performed as separate operations. Furthermore, processes can be combined such that one or more operations of a process are included in another process or processes. In certain circumstances, multitasking and parallel processing may be advantageous. Moreover, the separation of various software components in the embodiments described above should not be understood as requiring such separation in all embodiments, and it should be understood that the described software components could generally be integrated together in a single software program or multiple software programs.

What is claimed is:

1. A system comprising:
a plurality of computing platforms for a vehicle and coupled together in a ring topology in a ring network of the vehicle;
a plurality of power and data centers (PDCs) coupled together and to the computing platforms in the ring topology of the ring network of the vehicle, the PDCs each including at least one sensor interface and at least one data interface, the sensor interface configured to receive sensor data from one or more sensors, the data interface configured to transmit the sensor data into the ring network for input to at least one of the computing platforms or the PDCs; and
a plurality of power supply rings separate from the ring network, each power supply ring being configured to distribute power from a different power source or source system and to the computing platforms and the PDCs.

2. The system of claim 1, wherein the ring network is a multi-ring, self-healing network.

3. The system of claim 1, wherein at least one computing platform provides autonomous driving functionality.

4. The system of claim 1, wherein each PDC includes, in one or more housings, the at least one data interface, the at least one sensor interface and a power interface that distributes power to the one or more sensors.

5. The system of claim 1, the system further comprising:
a first set of sensors and a first PDC associated with a first zone of a vehicle; and
a second set of sensors and a second PDC associated with a second zone of the vehicle, at least one sensor from the second set of sensors is coupled to a first PDC, and at least one sensor from the first set of sensors is coupled to a second PDC.

6. The system of claim 1, wherein at least one PDC of the plurality of PDCs is configured to:
receive sensor data from at least one sensor;
compress the sensor data; and
transmit the compressed sensor data to the ring network.

7. The system of claim 1, wherein at least one PDC of the plurality of PDCs is configured to:
receive processed sensor data from at least one sensor; and
transmit the processed sensor data to the ring network.

8. The system of claim 1 wherein at least one PDC of the plurality of PDCs is configured to:
receive raw sensor data from two or more sensors;
process the raw sensor data to provide fused sensor data; and
transmit the fused sensor data to the ring network.

9. The system of claim 1, wherein at least one PDC of the plurality of PDCs includes one or more controller-circuits coupled to one or more actuators that is configured to provide a single vehicle function or multiple vehicle functions.

10. The system of claim 1, wherein at least one PDC of the plurality of PDCs is coupled to at least one computing platform or another PDC node by two or more redundant data links, wherein each of the data links is configured to use a protocol or physical layer that is different than used by the other data links.

11. The system of claim 4, wherein at least one PDC of the plurality of PDCs includes circuitry in the power interface that is configured to measure at least one of input or output voltage or current from or to a power supply ring to detect a power failure in at least a portion of the ring network.

12. The system of claim 11, wherein the measuring includes measuring a rate of change of at least one of the input or output voltage or current.

13. The system of claim 1, wherein the system is configured to: in accordance with detecting a failure of a computing node, cause, by switching circuitry, data to travel in an opposite direction of the ring network.

14. The system of claim 1, wherein the system is configured to: in accordance with detection of a failure of a computing node, cause, by a PDC of the plurality of PDCs, the PDC or the one or more sensors to slow their respective output data rates.

15. The system of claim 1, wherein the system is configured to: in accordance with detection of a failure of a computing node, cause, by the at least one computing platform, a vehicle to enter a fail-safe mode.

16. The system of claim 1, wherein a PDC of the plurality of PDCs includes at least two power inputs that are operable to connect inside the PDC and isolate the at least two power inputs against each other in response to failure of a power supply ring or a power supply coupled to the power supply ring.

17. The system of claim 1, wherein the sensor interface of the PDC includes at least one of circuitry or software to receive and process raw or pre-processed sensor data from two or more different sensors using two or more physical layers or protocols.

18. The system of claim 4, wherein the power interface of the PDC includes at least a portion of power circuitry that provides a stabilized and filtered voltage supply to at least one sensor coupled to the PDC.

19. A method comprising:
distributing, from a plurality of power source or source systems each coupled to a different power supply ring and through a power interface of a power and data center (PDC) included in a vehicle, power to one or more sensors of the vehicle;
receiving, through a sensor interface of the PDC, sensor data from the one or more sensors;
transmitting, by output ports of the PDC and according to a ring topology of a multi-ring data network of the vehicle that is separate from each different power supply ring coupled to the PDC and to at least one computing platform the sensor data into the multi-ring data network of the vehicle;
determining, by the at least one computing platform for the vehicle that is coupled to the multi-ring data network of the vehicle, at least one operation associated with autonomous driving of the vehicle, the at least one operation determined at least in part based on the sensor data that is transmitted into the multi-ring data network of the vehicle; and
causing, by the at least one computing platform, the vehicle to perform the at least one operation associated with autonomous driving of the vehicle.

20. The method of claim 19, wherein there are at least two sensors, the method further comprising:
processing, by the PDC, sensor data from the at least two sensors, the processing including fusing, transforming or pre-processing the sensor data.

21. The method of claim 20, wherein the at least two sensors include a camera and a LIDAR, and fusing the sensor data includes generating an object map or list based on object detections by the camera and LIDAR.

22. The method of claim 19, further comprising:
compressing, by the PDC, the sensor data before transmitting the sensor data into the multi-ring data network.

23. The method of claim 19, further comprising:
determining, by the PDC, a failure in the multi-ring data network; and
responsive to the determination of the failure in the multi-ring data network, causing circuitry in the PDC to reconfigure a portion of the multi-ring data network to create a data path that circumvents the failure.

24. The method of claim 23, wherein determining a failure in the multi-ring data network further comprises:
determining that a rate of change in PDC input or output voltage or current exceeds a predetermined threshold value.

25. The method of claim 19, further comprising:
determining, by the PDC, a failure in a first power ring coupled to the PDC; and
responsive to the determination of the failure in the first power ring, causing circuitry in the PDC to reconfigure the PDC to use power from a second, redundant power ring coupled to the PDC.

26. The method of claim 19, further comprising:
distributing, by the PDC, filtered power to the one or more sensors.

27. An automotive data routing ring network, comprising:
at least one compute ring network of a vehicle, the at least one compute ring network including two or more processors for a vehicle and coupled together in a ring topology of the at least one compute ring network of the vehicle;
at least one sensor ring network of the vehicle, the at least one sensor ring network comprising two or more data distribution devices for the vehicle, each data distribution device coupled to at least one sensor and to the at least one compute ring network, each data distribution device monitoring for failure of at least one segment of the at least one sensor ring network, and configured to:
in accordance with detection of a first failure by a first data distribution device in the sensor ring network, redirect data traffic to a second data distribution device in the sensor ring network; and
in accordance with detecting a second failure of at least one segment of the compute ring network, redirect data traffic from a first processor in the compute ring network to a second processor in the compute ring network; and
at least one power ring of the vehicle, the at least one power ring being separate from the at least one compute ring network and the at least one sensor ring network, the at least one power ring including two or more data distribution devices and two or more power supplies, the at least one power ring configured to supply power from the two or more power supplies through the two or more data distribution devices, and to at least one sensor and to the compute ring network.

28. The automotive data routing ring network of claim 27, wherein at least one of the data distribution devices is configured to pass through sensor data unprocessed to the sensor ring network or fuses sensor data from two or more sensors coupled to the data distribution device and to transmit the fused data to the sensor ring network.

29. The automotive data routing ring network of claim 28, wherein the two or more sensors include at least one camera and one LIDAR, and fusing the sensor data from the camera and LIDAR includes creating an object map or object list based on objects detected by the at least one LIDAR and camera.

30. The automotive data routing ring network of claim 28, wherein at least one of the data distribution devices compresses sensor data from the at least one sensor.

31. The automotive data routing ring network of claim 28, each data distribution device being configured to: monitor for failure of at least one segment of the power ring, and in accordance with detection of a first failure of the power ring by a first data distribution device, redirect power from a first power supply of the two or more power supplies to a second power supply of two or more power supplies.

32. A power and data center (PDC) for an automotive electrical and electronic (E/E) system, the PDC comprising:
a sensor interface including redundant sensor data ports for coupling to at least one sensor of a vehicle;
a data network interface including redundant network data ports for coupling to a ring network of the vehicle;

a processor coupled to the sensor interface and the data network interface, the processor configured to: receive sensor data from the redundant sensor data ports, process the sensor data, and output the processed sensor data to the ring network of the vehicle and in accordance with a ring topology on the redundant network data ports; and a power switch coupled to redundant network power supply rails, redundant sensor power supply rails, and the processor, the processor configured to cause the power switch to disconnect a first network power supply rail couples coupled to a first power supply ring configured to supply power from a first power source or source system and to connect a second network power supply rail coupled to a second power supply ring configured to supply power from a second power source or source system.

33. The PDC of claim 32, wherein the processor causes the power switch to galvanically isolate the first and the second network power supply rails from each other.

34. The PDC of claim 32, wherein the processing includes compressing sensor data received at the redundant sensor data ports.

35. The PDC of claim 32, wherein the processing includes fusing raw sensor data received at two or more pairs of redundant sensor data ports.

36. The PDC of claim 32, further comprising a first switch, a second switch, and a third switch, an input of the first switch coupled to an output of the power switch, an input of the second switch coupled to an output of the first switch, and an output of the second switch coupled to a first network power rail, an input of the third switch coupled to the output of the first switch, and an output of the third switch coupled to a second network power rail.

37. The PDC of claim 32, wherein the redundant network data ports support two or more different protocols or physical layers.

38. The PDC of claim 32, where the redundant sensor data ports support two or more different protocols or physical layers.

39. A system comprising:
a plurality of computing platforms for a vehicle and coupled together in a ring topology in a ring network of the vehicle;
a plurality of power and data centers (PDCs) coupled together and to the computing platforms in the ring topology of the ring network of the vehicle, the PDCs each including at least one sensor interface and at least one data interface, the sensor interface configured to receive sensor data from one or more sensors, the data interface configured to transmit the sensor data into the ring network for input to at least one of the computing platforms or the PDCs, wherein at least one PDC of the plurality of PDCs is configured to establish a transparent data link through the ring network with at least one computing platform; and
a plurality of power supply rings separate from the ring network, each power supply ring being configured to distribute power from a different power source or source system and to the computing platforms and the PDCs.

40. The system of claim 39, wherein at least one PDC of the plurality of PDCs is configured to establish a transparent data link with at least one computing platform using a Peripheral Component Interconnect (PCIe) switch.

41. An automotive electrical and electronic system for a partially or fully autonomous vehicle, the system comprising:
a set of sensors for sensing an operating environment of the vehicle; and
an automated driving server coupled to the set of sensors according to a star topology of a star network of a vehicle, the automated driving server configured to perform computations for operating the autonomous vehicle in the environment, the automated driving server configured to detect a failure in the system and to select a level of redundancy for the system, including selecting a subset of the set of sensors in the star network of the vehicle for use in the operating of the vehicle.

42. A method comprising:
detecting a failure in an automotive electrical and electronic system of a vehicle, the system including a plurality of sensors configured to communicate according to a star topology of a star network of a vehicle with an automated driving server for operating the vehicle; and
in accordance with detection of the failure, selecting a level of redundancy for the system, the selecting including selecting a subset of the sensors in the star network of the vehicle for use in the operating of the vehicle.

43. An automotive electrical and electronic system comprising:
a first power and data center (PDC) including a first sensor interface configured to receive sensor data from one or more sensors and a first data interface configured to transmit the sensor data according to a ring topology onto a first ring network of a vehicle;
a first computing platform for the vehicle;
a first data platform for the vehicle, wherein:
the first PDC is connected to the first computing platform via a first path of the first ring network of the vehicle that is configured to transmit the sensor data, the first path including the first data platform,
the first PDC is connected to the first computing platform via a second path of the first ring network of the vehicle, the second path being different from the first path and does not include the first data platform, and
the first data interface of the first PDC is configured to transmit the sensor data according to the ring topology to the first computing platform via the first path and the second path; and
a plurality of power supply rings separate from the first ring network, each power supply ring being configured to distribute power from a different power source or source system and to the first computing platform and the first PDC.

44. The system of claim 43, wherein the first path, the second path, the first PDC, and the first computing platform form the first ring network.

45. The system of claim 43, further comprising:
a second PDC, wherein the second PDC is included in either the first path or the second path.

46. The system of claim 45, further comprising:
a first sensor connected to the first PDC; and
a second sensor connected to the second PDC,
wherein a physical distance from the first sensor to the first PDC is less than a physical distance from the first sensor to the second PDC, and wherein a physical distance from the second sensor to the first PDC is less than a physical distance from the second sensor to the second PDC.

47. The system of claim 45, wherein the first PDC is connected to the second PDC without an intervening PDC or computing platform.

48. The system of claim 45, wherein the first computing platform is configured to:
in accordance with a determination that the first PDC is functioning, receive power via the first PDC; and
in accordance with a determination that the first PDC is not functioning, receive power via the second PDC.

49. The system of claim 43, wherein the first data platform is a second computing platform, the system further comprising a third computing platform, wherein:
the first computing platform is connected to the second computing platform via a third path that includes the third computing platform, and
the first computing platform is connected to the second computing platform via a fourth path, different from the third path, that does not include the third computing platform.

50. The system of claim 49, wherein the third path, the fourth path, the first computing platform, the second computing platform, and the third computing platform form a second ring network.

51. The system of claim 49, wherein the third path does not include the first PDC and the fourth path does not include the first PDC.

52. The system of claim 43, further comprising:
a first power supply ring including the first PDC; and
a first power source connected to the first power supply ring,
wherein the first computing platform is coupled to the first power supply ring.

53. The system of claim 52, further comprising:
a second power source coupled to the first power supply ring.

54. The system of claim 53, wherein the first PDC is configured to:
in accordance with a determination that the first power source is functioning, receive power from the first power source; and
in accordance with a determination that the first power source is not functioning, receive power from the second power source.

55. The system of claim 53, wherein the first computing platform is configured to:
in accordance with a determination that the first power source is functioning, receive power from the first power source; and
in accordance with a determination that the first power source is not functioning, receive power from the second power source.

56. An automotive electrical and electronic system for a vehicle, the system comprising:
a sensor ring network of a vehicle;
a plurality of sensors coupled to the sensor ring network of the vehicle;
a server ring network of the vehicle;
one or more computing platforms of the vehicle coupled to the server ring network of the vehicle, the one or more computing platforms configured to control mobility functions of the vehicle through the sensor ring network of the vehicle;
a plurality of power and data centers (PDCs) of the vehicle coupled to the sensor ring network of the vehicle and configured to aggregate sensor data from one or more of the plurality of sensors;
a gateway coupled to the server ring network of the vehicle and the plurality of PDCs through individual bus connections, the gateway configured to control body-control functions of the vehicle based on sensor data received according to a ring topology and through one or more of the individual bus connections of the server ring network of the vehicle; and
a plurality of power supply rings separate from the sensor ring and separate from the server ring network of the vehicle, each power supply ring being configured to distribute power from a different power source or source system and to the one or more computing platforms and the plurality of PDCs.

57. The system of claim 56, wherein at least one PDC of the plurality of PDCs is configured to establish a transparent data link with at least one computing platform using a Peripheral Component Interconnect (PCIe) switch.

58. The system of claim 56, wherein the one or more computing platforms are configured to implement: a dynamic hardware partitioning layer to share hardware for safety relevant software; a middleware to abstract safety relevant software from the hardware; and a hypervisor to abstract other software and hardware.

* * * * *